US012674706B2

(12) United States Patent
Sakai et al.

(10) Patent No.: US 12,674,706 B2
(45) Date of Patent: Jul. 7, 2026

(54) LIGHTING DEVICE

(71) Applicant: UNIVERSITY PUBLIC CORPORATION OSAKA, Osaka (JP)

(72) Inventors: Hideki Sakai, Osaka (JP); Hiroyuki Iyota, Osaka (JP)

(73) Assignee: UNIVERSITY PUBLIC CORPORATION OSAKA, Osaka (JP)

( * ) Notice: Subject to any disclaimer, the term of this patent is extended or adjusted under 35 U.S.C. 154(b) by 86 days.

(21) Appl. No.: 18/833,171

(22) PCT Filed: Jan. 10, 2023

(86) PCT No.: PCT/JP2023/000291
§ 371 (c)(1),
(2) Date: Jul. 25, 2024

(87) PCT Pub. No.: WO2023/145413
PCT Pub. Date: Aug. 3, 2023

(65) Prior Publication Data
US 2025/0109991 A1     Apr. 3, 2025

(30) Foreign Application Priority Data
Jan. 27, 2022     (JP) ................................. 2022-010926

(51) Int. Cl.
*G01J 3/50*     (2006.01)
(52) U.S. Cl.
CPC ..................................... *G01J 3/50* (2013.01)

(58) Field of Classification Search
CPC .................................. G01J 3/50; G01N 21/84
See application file for complete search history.

(56) References Cited

FOREIGN PATENT DOCUMENTS

| | | | |
|---|---|---|---|
| JP | H07301565 A | * | 11/1995 |
| JP | 2020202119 A | * | 12/2020 |

OTHER PUBLICATIONS

International Search Report for International Application No. PCT/JP2023/000291 dated Feb. 14, 2023, 2 pages.
International Preliminary Report on Patentability dated Aug. 8, 2024, for International Application No. PCT/JP2023/000291, 5 pages.

* cited by examiner

*Primary Examiner* — Michelle M Iacoletti
*Assistant Examiner* — Mohamed Doumbia
(74) *Attorney, Agent, or Firm* — Squire Patton Boggs (US) LLP

(57)     ABSTRACT
A lighting device according to one aspect of the present invention includes a plurality of thin plates whose surfaces facing a center are configured to absorb light. By rearranging the at least one thin plate by moving the at least one thin plate at an angle smaller than 360 degrees about an axis, it is possible to form a curved plate having a double right-angled spherical triangular shape by all of the plurality of thin plates.

15 Claims, 23 Drawing Sheets

(ZEROTH CYCLE)     (FIRST CYCLE)     (SECOND CYCLE)

(ZEROTH CYCLE)

(FIRST CYCLE)

LIGHTING DEVICE

CROSS-REFERENCE TO RELATED APPLICATIONS

This application is a National Stage filing under 35 U.S.C. § 371 of International Patent Application No. PCT/JP2023/000291, filed Jan. 10, 2023, which claims the benefit of and priority to Japanese Patent Application No. 2022-010926, filed Jan. 27, 2022.

TECHNICAL FIELD

The present invention relates to a lighting device.

BACKGROUND ART

In order to measure the color or gloss of an object, it is desirable to satisfy lighting and light receiving conditions defined by Japanese Industrial Standards, and many contact colorimeters and gloss meters conforming to the Japanese Industrial Standards are commercially available. In the case of an object capable of creating a flat and uniform sample surface, the color and gloss of a target object can be measured by a commercially available contact colorimeter and gloss meter. However, in order to measure a sample having a complicated shape as it is, a target object is observed in a non-contact manner using a color luminance meter and a camera, and illumination is separately provided. In this case, variations are likely to occur in illumination and light receiving conditions, and thus it is difficult to ensure measurement accuracy.

The present inventors have proposed a lighting device capable of achieving both high measurement accuracy and improvement in measurement convenience in Patent Literature 1 described below. Specifically, an example of the lighting device according to the proposal includes a casing, a plurality of plate members, and a light source. The inner surface of the casing defines a hemispherical internal space and is made of a material that diffusely reflects light, and the observation unit is circumferentially spaced along the inner surface from an apex. Each plate member is disposed in the internal space and covers a part of the inner surface when viewed from the center. The surface facing the center of each plate member is made of a material that absorbs light. The plurality of plate members include a first plate member, a second plate member arranged symmetrically with the first plate member with respect to the center, and a third plate member not arranged symmetrically with any other plate member with respect to the center. Each of the second plate member and the third plate member has a transmission port disposed at a position corresponding to the observation unit.

CITATION LIST

Patent Literature

Patent Literature 1: Japanese Unexamined Patent Publication No. 2020-202119 A

SUMMARY OF INVENTION

Technical Problem

The inventors of the present application have further studied and found that the lighting device proposed in Patent Literature 1 has a problem that the measurement accuracy may decrease due to the causes described below.

As a first cause, in the proposed lighting device, as an example of a light trap (optical absorber), a light trap having a double right-angled spherical triangular shape in which the entire surface facing the center is configured to absorb light is used. However, such a light trap blocks all the diffused light from an azimuth angle at which the light trap is disposed regardless of the magnitude of an apex angle of a double right-angled spherical triangle. For this reason, in a case where the light trap having the double right-angled spherical triangular shape is used, depending on the shape of the measurement object, a shadow/shade may appear, and the measurement error may be enlarged and the measurement accuracy may be lowered.

As a second cause, in a case where a part of a bottom surface of a hemispherical internal space is blocked by a reflecting mirror, a portion where a specular reflection component (halation) cannot be removed occurs depending on the shape of the measurement object, and there is a possibility that the measurement accuracy for this portion is deteriorated.

FIG. 17 is a diagram illustrating an example in which a portion from which the specular reflection component cannot be removed occurs when a part of the bottom surface of the hemispherical internal space is blocked by the reflecting mirror in the conventional lighting device. As illustrated in FIG. 17, in a case where a part of the bottom surface of the hemispherical internal space is closed by the reflecting mirror, the specular reflection component indicated by an alternate long and short dash line has reached an observation unit, that is, the portion where the specular reflection component cannot be removed occurs in a convex measurement object.

The present invention has been made in view of such circumstances in one aspect, and an object of the present invention is to provide a lighting device that prevents a decrease in measurement accuracy due to at least one of generation of shadow/shade of a measurement object and remaining of a specular reflection component and realizes highly accurate measurement.

Solution to Problem

In order to solve the above-described problem, the present invention adopts the following configuration.

That is, a lighting device according to one aspect of the present invention includes a casing having an outer surface, an inner surface, a spherical or hemispherical internal space, and an observation unit, the inner surface being made of a material configured to define the internal space and reflect light, the internal space having a center, a zenith, and an axis, the axis passing through the center and the zenith, the observation unit being provided for observing an object arranged in the internal space, and being arranged at the zenith or at a position spaced apart from the zenith in a circumferential direction along the inner surface; a plate member arranged to face the inner surface in the internal space, the plate member covering a part of the inner surface as viewed from the center, being configured to be adjustable in position around the axis, and including a first surface facing the inner surface and a second surface facing the center; and a light source arranged to irradiate the internal space with light, in which an upper portion of the plate member that is a portion on a side where the observation unit is disposed with respect to an equatorial plane includes a plurality of thin plates disposed so as not to overlap each other, the plurality of thin plates are configured such that the second surface absorbs light, and by rearranging at least one of the plurality of thin plates disposed so as not to overlap each other in the upper portion by moving the at least one thin plate at an angle smaller than 360 degrees about the axis, it is possible to form one curved plate having a double right-angled spherical triangular shape corresponding to a region of the inner surface connecting three points including a point corresponding to the zenith of the inner surface and two points on an intersection line between the equatorial plane and the inner surface, by all of the plurality of thin plates.

In this configuration, the plurality of thin plates are configured such that the second surface absorbs light, and are disposed so as not to overlap each other in the upper portion. Then, by rearranging at least one of the plurality of thin plates by moving the position of the thin plate at an angle smaller than 360 degrees about the axis, one curved plate can be formed by all of the plurality of thin plates. That is, an area of each of the plurality of thin plates included in the upper portion and configured such that the second surface absorbs light is smaller than an area of the curved plate. When the upper portion and the curved plate are disposed such that one side (for example, the lower side) of each of the upper portion and the curved plate overlaps each other, an area of an overlapping portion of the upper portion and the curved plate is smaller than an area of the curved plate.

Therefore, in the upper portion, diffused light from an azimuth angle corresponding to the curved plate easily reaches the object, and shadow/shade is less likely to occur in the object, as compared with the conventional light trap in which the entire second surface of the curved plate having the double right-angled spherical triangular shape is configured to absorb light. Therefore, the lighting device according to one aspect of the present invention can realize highly accurate measurement while preventing a decrease in measurement accuracy due to generation of shadow/shade.

In the lighting device according to the one aspect, an area of each of the plurality of thin plates may be less than or equal to half of an area of the curved plate. In this configuration, the upper portion can secure twice or more the amount of diffused light reaching the object from the azimuth angle corresponding to the curved plate as compared with a conventional light trap configured to absorb light on the entire second surface of the curved plate having the double right-angled spherical triangular shape.

In the lighting device according to the one aspect, the plurality of thin plates may not be in contact with each other. In this configuration, the upper portion including the plurality of thin plates not in contact with each other can be configured.

The lighting device according to the one aspect may further include, an extraction unit configured to extract, from among a plurality of pieces of measurement data each indicating the object observed while the plate member is moved around the axis in the observation unit, measurement data in which the object in a brightest state is observed and measurement data in which the object in a darkest state is observed; and a storage unit configured to store the two pieces of measurement data extracted by the extraction unit as an observation result of the object. In the configuration, the measurement data in which the object in the brightest state is observed and the measurement data in which the object in the darkest state is observed are extracted from the plurality of pieces of measurement data, and the two pieces of measurement data are stored as the observation result of the object. Therefore, as compared with a case where all of the plurality of pieces of measurement data are stored as the observation result of the object, the amount of data to be stored can be reduced, and the amount of measurement data to be stored as the observation result of the object can be kept constant. This is particularly effective in a case where the number of measurements is increased or measurement is performed at a high speed, and by adopting this configuration, for example, it is possible to easily measure an object in water while suppressing specular reflection of a wavy water surface.

In the lighting device according to the one aspect, the internal space may be spherical, the plate member may include the upper portion and a lower portion that is a portion extending to a side opposite to a side where the observation unit is disposed with respect to the equatorial plane, and the second surface of the lower portion may be configured to absorb light. In this configuration, the second surface of the lower portion is configured to absorb light. Therefore, for example, even when the object has a convex shape, the specular reflection component can be removed by the second surface of the lower portion. Therefore, the lighting device according to one aspect of the present invention can realize highly accurate measurement while preventing a decrease in measurement accuracy due to the residual specular reflection component.

In the lighting device according to the one aspect, the lighting device may further include a reflecting mirror having a surface facing the internal space, the surface being configured to specularly reflect light, the internal space being hemispherical, the reflecting mirror being arranged to close a part of a bottom surface of the internal space, and the plate member may include the upper portion, and a horizontal portion that is a portion extending along the equatorial plane so that the second surface is configured to absorb light and covers a part of a surface of the reflecting mirror facing the internal space. In this configuration, the horizontal portion extends along the equatorial plane so as to cover a part of a surface of the reflecting mirror facing the internal space, and the second surface of the horizontal portion is configured to absorb light. Therefore, for example, even when the object has a convex shape, the specular reflection component can be removed by the second surface of the horizontal portion. Therefore, the lighting device according to one aspect of the present invention can realize highly accurate measurement while preventing a decrease in measurement accuracy due to the residual specular reflection component.

The lighting device according to the one aspect may further include a correction unit configured to correct measurement data acquired by observing the object by the observation unit, using reference measurement data that is measurement data acquired in advance by observing a white diffusion object having a shape identical to the object in the observation unit. In this configuration, the measurement data is corrected using the reference measurement data. Therefore, even in a case where shadow/shade occurs in the object for some reason, it is possible to perform highly accurate measurement by performing correction using the reference measurement data for a portion where shadow/shade occurs.

In the lighting device according to the one aspect, the casing and the plate member may be integrated by forming a part of the inner surface with a material configured to absorb light. In this configuration, the casing and the plate member are integrated by forming a part of the inner surface with the material that absorbs light. Therefore, the lighting device according to one aspect of the present invention can be miniaturized as compared with a lighting device in which the casing and the plate member are separate members, and can be installed in an environment with a limited space, for example, a production line of a factory.

In the lighting device according to the one aspect, the plurality of thin plates may be formed by dividing one curved plate having a double right-angled spherical triangular shape by a plane parallel or inclined to the equatorial plane. As described above, by rearranging at least one of the plurality of thin plates by moving the at least one thin plate at an angle smaller than 360 degrees about the axis, it is possible to form one curved plate having the double right-angled spherical triangular shape by all of the plurality of thin plates. Therefore, the plurality of thin plates may be formed by dividing one curved plate having the double right-angled spherical triangular shape by a plane parallel or inclined to the equatorial plane. Therefore, the lighting device according to one aspect of the present invention can easily prepare the plurality of thin plates that can be rearranged to form one curved plate having the double right-angled spherical triangular shape.

Further, a lighting device according to one aspect of the present invention includes a casing having an outer surface, an inner surface, a spherical internal space, and an observation unit, the inner surface being made of a material configured to define the internal space and reflect light, the internal space having a center, a zenith, and an axis, the axis passing through the center and the zenith, the observation unit being provided for observing an object arranged in the internal space, and being arranged at the zenith or at a position spaced apart from the zenith in a circumferential direction along the inner surface; a plate member arranged to face the inner surface in the internal space, the plate member covering a part of the inner surface as viewed from the center, being configured to be adjustable in position around the axis, the plate member including a first surface facing the inner surface and a second surface facing the center, an upper portion that is a portion on a side where the observation unit is disposed with respect to an equatorial plane and a lower portion that is a portion extending to a side opposite to a side where the observation unit is disposed with respect to the equatorial plane; and a light source arranged to irradiate the internal space with light, in which the second surface of the lower portion is configured to absorb light.

In this configuration, the second surface of the lower portion is configured to absorb light. Therefore, for example, even when the object has a convex shape, the specular reflection component can be removed by the second surface of the lower portion. Therefore, the lighting device according to one aspect of the present invention can realize highly accurate measurement while preventing a decrease in measurement accuracy due to the residual specular reflection component.

The lighting device according to the one aspect may further include an extraction unit configured to extract, from among a plurality of pieces of measurement data each indicating the object observed while the plate member is moved around the axis in the observation unit, measurement data in which the object in a brightest state is observed and measurement data in which the object in a darkest state is observed; and a storage unit configured to store the two pieces of measurement data extracted by the extraction unit as an observation result of the object.

The lighting device according to the one aspect may further include a correction unit configured to correct measurement data acquired by observing the object by the observation unit, using reference measurement data that is measurement data acquired in advance by observing a white diffusion object having a shape identical to the object in the observation unit.

In the lighting device according to the one aspect, the casing and the plate member may be integrated by forming a part of the inner surface with a material configured to absorb light.

In the lighting device according to the one aspect, the upper portion may include a plurality of thin plates disposed so as not to overlap each other, the plurality of thin plates may be configured such that the second surface absorbs light, and by rearranging at least one of the plurality of thin plates disposed so as not to overlap each other in the upper portion by moving the at least one thin plate at an angle smaller than 360 degrees about the axis, it is possible to form one curved plate having a double right-angled spherical triangular shape corresponding to a region of the inner surface connecting three points including a point corresponding to the zenith of the inner surface and two points on an intersection line between the equatorial plane and the inner surface, by all of the plurality of thin plates.

In the lighting device according to the one aspect, the plurality of thin plates may be formed by dividing one curved plate having a double right-angled spherical triangular shape by a plane parallel or inclined to the equatorial plane. As described above, by rearranging at least one of the plurality of thin plates by moving the at least one thin plate at an angle smaller than 360 degrees about the axis, it is possible to form one curved plate having the double right-angled spherical triangular shape by all of the plurality of thin plates. Therefore, the plurality of thin plates may be formed by dividing one curved plate having the double right-angled spherical triangular shape by a plane parallel or inclined to the equatorial plane. Therefore, the lighting device according to one aspect of the present invention can easily prepare the plurality of thin plates that can be rearranged to form one curved plate having the double right-angled spherical triangular shape.

Advantageous Effects of Invention

According to the present invention, it is possible to provide a lighting device that realizes highly accurate measurement by preventing a decrease in measurement accuracy due to at least one of generation of shadow/shade of a measurement object and remaining of a specular reflection component.

DESCRIPTION OF EMBODIMENTS

Figure 1:
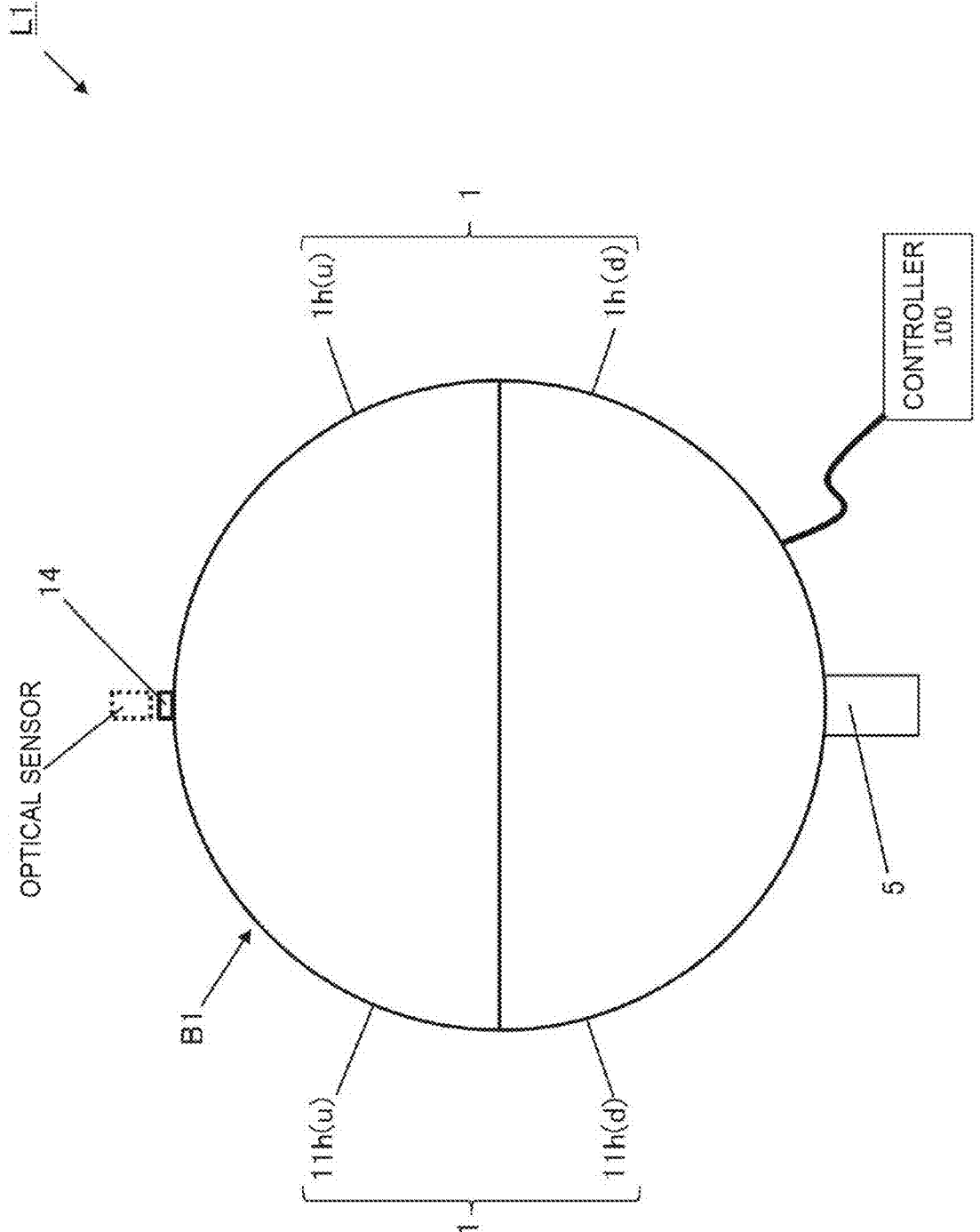
FIG. 1 is a side view schematically illustrating a lighting device according to a first embodiment.

Hereinafter, an embodiment (hereinafter, also referred to as "the present embodiment") according to one aspect of the present invention will be described with reference to the drawings. However, the present embodiment described below is merely an example of the present invention in all respects. It goes without saying that various improvements and modifications can be made without departing from the scope of the present invention. That is, in carrying out the present invention, a specific configuration according to the embodiment may be appropriately adopted. Note that, in the following description, for convenience of description, description will be made with reference to an orientation in the drawings.

First Embodiment

Conventional lighting devices use a light trap having a double right-angled spherical triangular shape in which the entire surface facing the center is configured to absorb light. However, such a conventional light trap blocks all the diffused light from an azimuth angle at which the light trap is disposed regardless of the magnitude of an apex angle of the double right-angled spherical triangle. Therefore, in a case where the light trap having a double right-angled spherical triangular shape in which the entire surface facing the center is configured to absorb light is used, depending on the shape of a measurement object, a shadow/shade may appear, and a measurement error may be enlarged and the measurement accuracy may be deteriorated.

Meanwhile, in the lighting device according to the present embodiment, a plurality of thin plates whose surfaces facing the center absorb light are disposed so as not to overlap each other and used as light traps. By moving and rearranging at least one of the plurality of thin plates at an angle smaller than 360 degrees about an axis passing through the zenith and the center of a spherical observation space (internal space), one curved plate having the following shape can be formed by all of the plurality of thin plates. That is, by rearranging at least one thin plate, it is possible to form one curved plate having a double right-angled spherical triangular shape in which the entire surface facing the center of the conventional lighting device absorbs light by all of the plurality of thin plates.

That is, an area of each of the plurality of thin plates is smaller than the area of the above-described one curved plate having a double right-angled spherical triangular shape. Therefore, in the light trap included in the lighting device according to the present embodiment, diffused light from an azimuth angle corresponding to the curved plate easily reaches the object, as compared with a conventional light trap configured to absorb light on the entire second surface of the curved plate having the double right-angled spherical triangular shape. That is, the light trap included in the lighting device according to the present embodiment hardly causes shadow/shade in the object. Therefore, the lighting device according to the present embodiment can realize highly accurate measurement while preventing a decrease in measurement accuracy due to generation of shadow/shade.

The plurality of thin plates are obtained, for example, by dividing the above-described one curved plate having a double right-angled spherical triangular shape. Hereinafter, an example of a lighting device having such a configuration will be described.

§ 1 Configuration Example

Figure 2:
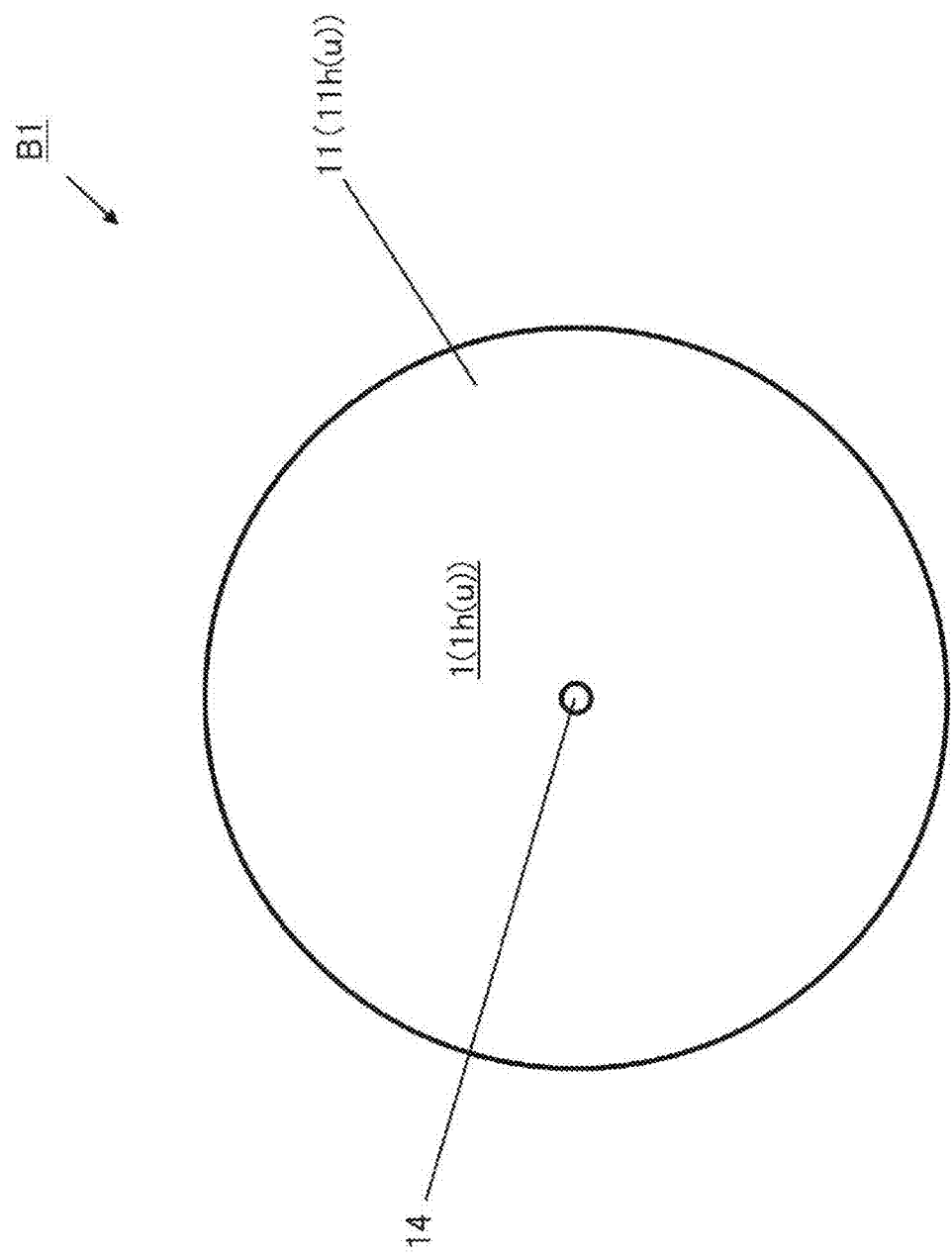
FIG. 2 is a plan view schematically illustrating a main body according to the first embodiment.
Figure 3:
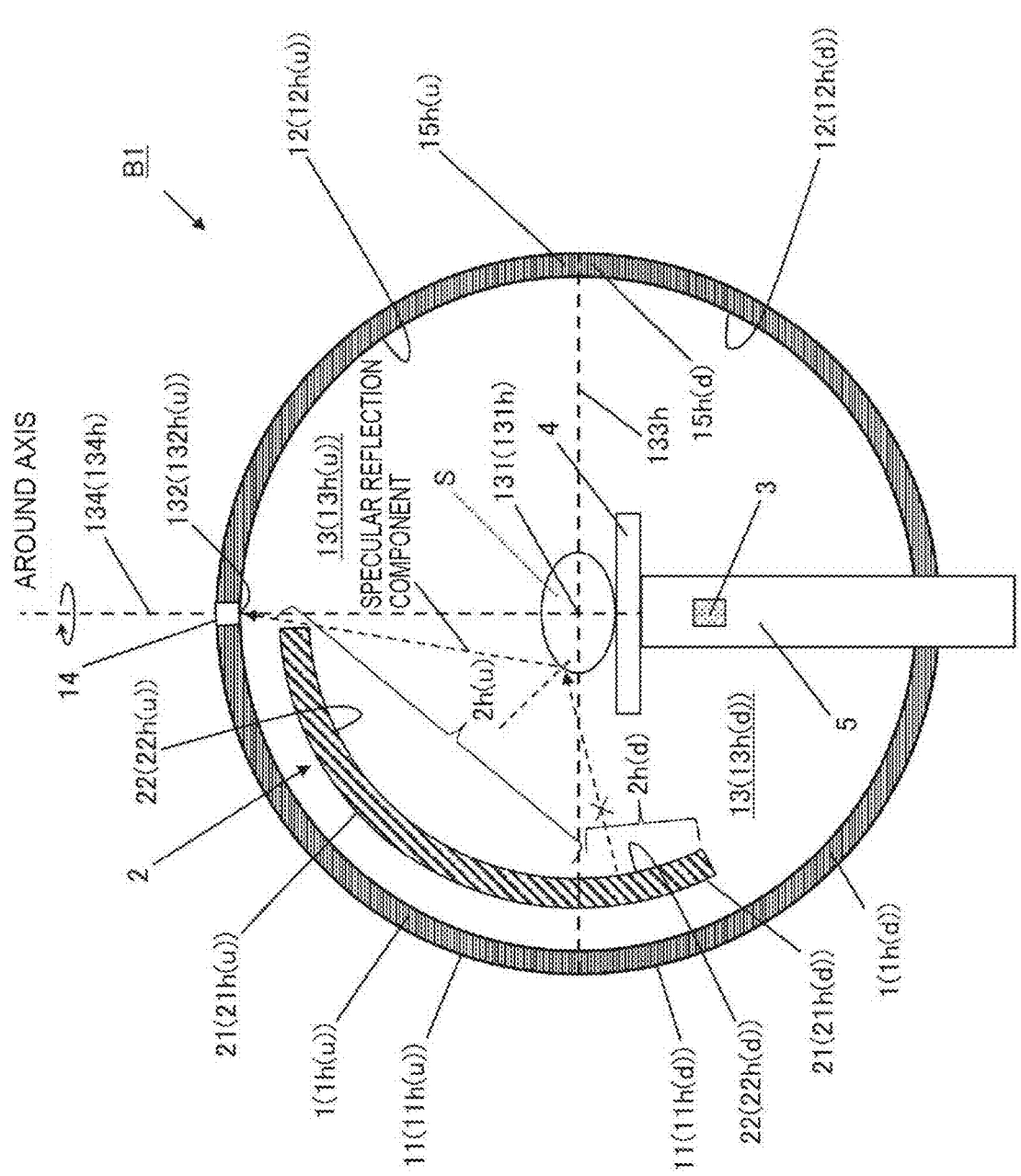
FIG. 3 is a cross-sectional view schematically illustrating the main body according to the first embodiment.

An example of a configuration of a lighting device L1 according to the present embodiment will be described with reference to FIGS. 1 to 11. FIG. 1 is a side view schematically illustrating an example of a configuration of the lighting device L1 according to the present embodiment. The lighting device L1 according to the present embodiment is used for colorimetry of an object S. As illustrated in FIG. 1, the lighting device L1 includes a spherical main body B1, a support column 5, and a controller 100 communicably connected to main body B1. FIGS. 2 and 3 are a plan view and a cross-sectional view schematically illustrating an example of the configuration of the main body B1. As illustrated in each drawing, the main body B1 includes a casing 1, a plate member 2, a light source 3, and a sample stage 4.

(Casing)

The casing 1 according to the present embodiment has a spherical shape, and includes, for example, a hemispherical upper casing 1h(u) and a hemispherical lower casing 1h(d) having substantially the same shape as illustrated in FIGS. 1 and 3. In the following description, when the upper casing 1h(u) and the lower casing 1h(d) are collectively referred to without distinction, a term "hemispherical casing 1h" is simply used. When the configuration of the upper casing 1h(u) is distinguished from the configuration of the lower casing 1h(d), the configuration of the upper casing 1h(u) is distinguished by adding "(u)" after the member number, and the configuration of the lower casing 1h(d) is distinguished by adding "(d)" after the member number.

The hemispherical casing 1h includes a hemispherical outer surface 11h, a hemispherical inner surface 12h, and a hemispherical internal space 13h.

The hemispherical outer surface 11h faces the outside of the hemispherical casing 1h, and the hemispherical inner surface 12h faces the inside of the hemispherical casing 1h. In the present embodiment, the hemispherical inner surface 12h is made of a material that diffusely reflects light. The material that diffusely reflects light is not particularly limited as long as it can diffusely reflect light, and may be, for example, a member painted white, a member made of a white material, or the like. As a specific example, the material that diffusely reflects light may be, for example, barium sulfate, a porous PTFE resin, or the like. The hemispherical inner surface 12h is formed in a hemispherical shape, thereby defining a hemispherical internal space 13h having a hemispherical shape.

The hemispherical internal space 13h has a center 131h, an apex 132h, a bottom surface 133h, and an axis 134h. The center 131h is located at the center of a sphere including a hemisphere of the hemispherical internal space 13h. The apex 132h is positioned vertically upward (or vertically downward) with respect to the center 131h. The axis 134h passes through the center 131h and the apex 132h. The bottom surface 133h includes a center 131h and is formed in a circular shape. The hemispherical casing 1h is open to the bottom surface 133h side of the hemispherical internal space 13h and has an open end 15h formed in an annular shape. Hereinafter, the apex 132h of the upper hemispherical internal space 13h(u) defined by the hemispherical inner surface 12h(u) of the upper casing 1h(u) may be particularly referred to as the zenith 132. Note that the shape of the hemispherical internal space 13h may not be a complete hemisphere as long as it does not have a fatal influence on the colorimetry of the object S.

Here, the hemispherical casing 1h may be integrally formed. Alternatively, the hemispherical casing 1h may be divided into a plurality of portions around the axis. The material of the hemispherical casing 1h is not particularly limited, and may be appropriately selected according to the embodiment. For the hemispherical casing 1h, for example, an acrylic resin, a stainless steel material, or the like may be used. As the material of the hemispherical casing 1h, a material having excellent workability and capable of securing strength is desirable.

The spherical casing 1 is formed by arranging the two hemispherical casings 1h described so far such that the centers 131h coincide with each other and the open ends 15h face each other. Specifically, the upper casing 1h(u) and the lower casing 1h(d) are arranged such that the centers 131h coincide with each other and the open ends 15h face each other, thereby forming the spherical casing 1.

Therefore, as illustrated in FIG. 3 and the like, the casing 1 includes a spherical outer surface 11, a spherical inner surface 12, and a spherical internal space 13. The spherical internal space 13 has a center 131, a zenith 132, and an axis 134. The center 131 is located at the center of the spherical internal space 13. The zenith 132 is positioned vertically above the center 131. The axis 134 passes through the center 131 and the zenith 132. Note that the shape of the internal space 13 may not be a perfect sphere as long as it does not have a fatal influence on the colorimetry of the object S. When performing colorimetry, the object S is disposed near the center 131 in the internal space 13.

An example in which the spherical casing 1 is constituted by the hemispherical upper casing 1h(u) and the hemispherical lower casing 1h(d) has been described so far. However, it is not essential to use the upper casing 1h(u) and the lower casing 1h(d) to constitute the casing 1. The casing 1 may, for example, be divided into a plurality of parts around the axis, i.e. divided into a plurality of parts by a plurality of planes passing through the axis 134. The lighting device L1 (main body B1) only needs to include the casing 1 defining the spherical internal space 13 and having the inner surface 12 made of a material that reflects light.

As illustrated in FIG. 3 and the like, the casing 1 (in particular, the upper casing 1h(u)) includes a light receiving port 14. The light receiving port 14 is provided to observe the object S arranged in the internal space 13. The light receiving port 14 is an example of an "observation unit" of the present invention. In the example illustrated in FIGS. 1 to 3, the light receiving port 14 is disposed at a position corresponding to the zenith 132 of the internal space 13. However, the position of the light receiving port 14 is not particularly limited, and may be appropriately set according to the embodiment. For example, the light receiving port 14 may be circumferentially spaced apart from the zenith 132 along the inner surface 12. Specifically, in order to be suitable for measurement of specular reflection, the light receiving port 14 may be disposed such that an angle between a line connecting the light receiving port 14 and the center 131 and the axis 134 is 20 degrees, 45 degrees, 60 degrees, or 85 degrees. Furthermore, for example, the light receiving port 14 may be arranged such that an angle between a line connecting the light receiving port 14 and the center 131 and the axis 134 is 45 degrees so as to be suitable for measurement of diffuse reflection. Furthermore, for example, the light receiving port 14 may be arranged such that an angle between a line connecting the light receiving port 14 and the center 131 and the axis 134 is 5 degrees, 30 degrees, or 40 degrees so as to be suitable for measuring retroreflection.

In the present embodiment, the light receiving port 14 is configured to transmit light from the inner surface 12 to the outer surface 11. The configuration of the light receiving port 14 is not particularly limited as long as light can be transmitted, and may be appropriately determined according to the embodiment. For example, the light receiving port 14 may be made of a transparent material such as a resin material. Furthermore, for example, the light receiving port 14 may include a through hole penetrating from the inner surface 12 to the outer surface 11. The through hole may be filled with a transparent material such as a resin material.

In addition, the light receiving port 14 may be configured to be able to take an open state in which light is transmitted and a closed state in which light transmission is blocked. The configuration for enabling the light receiving port 14 to be opened and closed is not particularly limited, and may be appropriately determined according to the embodiment. For example, a closing member (not illustrated) such as a cap configured to be attachable to the light receiving port 14 may be prepared. By closing the light receiving port 14 with the closing member, the light receiving port 14 may be in a closed state. Meanwhile, the light receiving port 14 may be opened by removing the closing member from the light receiving port 14.

The outer surface 11 of the casing 1 described above is formed in a spherical shape similarly to the internal space 13. However, the shape of the outer surface 11 of the casing 1 is not limited to such an example, and may be appropriately selected according to the embodiment.

(Light Source, Sample Stage, and Support Column)

Next, the light source 3 will be described. As illustrated in FIG. 3, the light source 3 is disposed so as to irradiate the internal space 13 with light. In the present embodiment, the light source 3 is attached to the support column 5. The support column 5 is a member that supports the sample stage 4 on which the object S is placed, and has, for example, an elongated rod shape extending along a longitudinal direction (axial direction), and is configured such that the axis thereof coincides with an axis 134 passing through the center 131 of the spherical internal space 13. As illustrated in FIG. 3, the height of the support column 5 may be adjustable such that the object S placed on the sample stage 4 is disposed near the center 131 of the internal space 13.

(Plate Member)

The plate member 2 is disposed facing the inner surface 12 in the internal space 13. In particular, as illustrated in FIG. 3, in the lighting device L1 (main body B1), the plate member 2 includes an upper plate member 2h(u) facing the hemispherical inner surface 12h(u) of the upper casing 1h(u), and a lower plate member 2h(d) facing the hemispherical inner surface 12h(d) of the lower casing 1h(d). As will be described in detail later, the upper plate member 2h(u) includes a plurality of thin plates 210 each facing the hemispherical inner surface 12h(u) of the upper casing 1h(u) and arranged so as not to overlap each other.

In the plate member 2 exemplified in FIG. 3, the upper plate member 2h(u) and the lower plate member 2h(d) are in contact with each other on an equatorial plane (a plane passing through the center 131 and orthogonal to the axis 134). That is, in the plate member 2, a portion extending from the equatorial plane to the side where the light receiving port 14 is disposed with respect to the equatorial plane is the upper plate member 2h(u), and a portion extending from the equatorial plane to the side opposite to the side where the light receiving port 14 is disposed with respect to the equatorial plane is the lower plate member 2h(d). For example, the upper plate member 2h(u) and the lower plate member 2h(d) have the same length in contact with the equatorial plane (the length of the arc on the equatorial plane), and are disposed such that the plane in which the upper plate member 2h(u) is in contact with the equatorial plane and the plane in which the lower plate member 2h(d) is in contact with the equatorial plane face each other. In the plate member 2, the upper plate member 2h(u) and the lower plate member 2h(d) may be integrally formed, that is, they may be connected to each other. For example, by rotating the upper plate member 2h(u) about the axis 134, the lower plate member 2h(d) also rotates about the axis 134.

In the following description, when the upper plate member 2h(u) and the lower plate member 2h(d) are collectively referred to without distinction, the term "plate member 2" is simply used. The plate member 2 covers a part of the inner surface 12 when viewed from the center 131, and is configured to be adjustable in position around the axis 134. The plate member 2 includes a first surface 21 facing the inner surface 12 and a second surface 22 facing the center 131. Hereinafter, first, the upper plate member 2h(u) will be described with reference to FIG. 4.

(Upper Plate Member)

Figure 4:
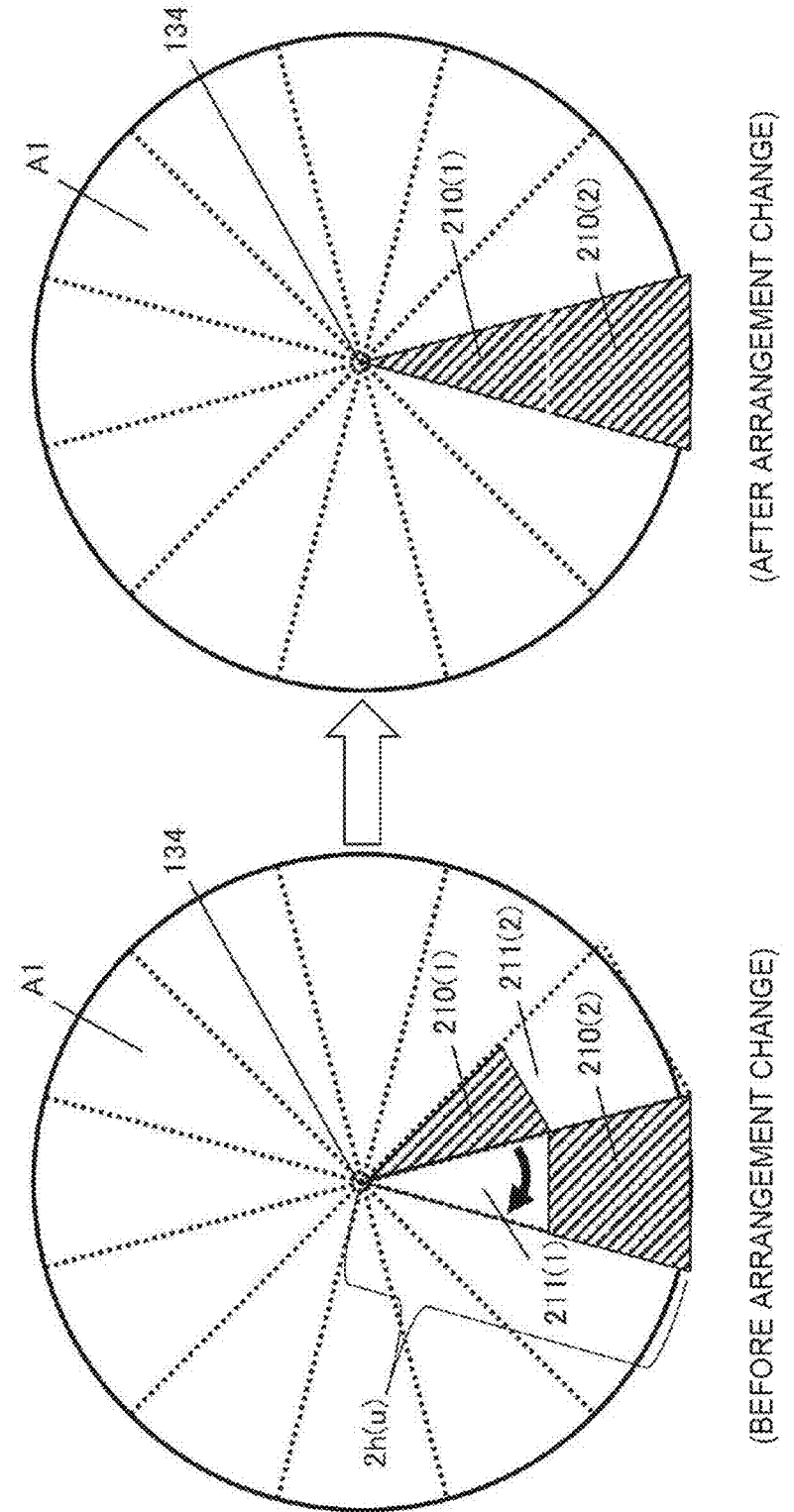
FIG. 4 is a view for explaining how a plurality of thin plates included in an upper plate member according to the first embodiment are arranged in the upper plate member.

FIG. 4 is a view schematically illustrating a relationship between the upper plate member 2h(u) and the hemispherical inner surface 12h(u) as viewed from the center 131, and is a view for explaining how the plurality of thin plates 210 included in the upper plate member 2h(u) are arranged in the upper plate member 2h(u). The upper plate member 2h(u) includes the plurality of thin plates 210, and includes a thin plate 210(1) and a thin plate 210(2) in the example illustrated in FIG. 4. In the following description, when the plurality of thin plates 210 are collectively referred to without distinction, the term "thin plate 210" is simply used. In distinguishing each of the plurality of thin plates 210, "(1)", "(2)", . . . , "(n)" ("n" is a natural number of 2 or more), and the like are added to distinguish each.

The surface (second surface 22h(u)) of the thin plate 210 facing the center 131 is made of a material that absorbs light. The light absorbing material is not particularly limited as long as it can absorb light, and may be, for example, a member painted black, a member made of a black material, or the like. As a specific example, the material that absorbs light may be, for example, carbon black, a non-reflective raised fabric, or the like. Meanwhile, the configuration of the surface (first surface 21h(u)) of the thin plate 210 facing the inner surface 12 is not particularly limited, and may be appropriately selected according to the embodiment. The first surface 21h(u) of the thin plate 210 may be made of a material that diffusely reflects light, similarly to the inner surface 12 (hemispherical inner surface 12h). Alternatively, the first surface 21h(u) of the thin plate 210 may be made of another material.

The material of the thin plate 210 is not particularly limited, and may be appropriately selected according to the embodiment. For the thin plate 210, for example, an acrylic resin, a stainless steel material, or the like may be used. The material of the thin plate 210 is desirably a material having excellent workability and capable of securing strength.

An example of how the thin plate 210(1) and the thin plate 210(2) are arranged in the upper plate member 2h(u) is illustrated on the left side of FIG. 4. In addition, an example after the thin plate 210(1) is moved around the axis 134 and rearranged from the arrangement of the thin plate 210(1) and the thin plate 210(2) illustrated on the left side of FIG. 4 is illustrated on the right side of FIG. 4. That is, an example of the arrangement of the thin plate 210(1) and the thin plate 210(2) in the upper plate member 2h(u) before the arrangement change is illustrated on the left side of FIG. 4. In addition, an example of the arrangement of the thin plate 210(1) and the thin plate 210(2) after the arrangement change is illustrated on the right side of FIG. 4.

Here, as illustrated in FIG. 4, in the present embodiment, the hemispherical inner surface 12h(u) is virtually evenly divided into a plurality of regions A1 having a double right-angled spherical triangular shape around the axis 134 in a plane passing through the zenith 132 and the center 131h. In the example of FIG. 4, the hemispherical inner surface 12h(u) is equally divided into 12, and an angle of an apex angle of each of the 12 regions A1 is "30" degrees.

However, the number of divisions is not limited to such an example, and may be appropriately determined according to the embodiment.

The thin plate 210(1) and the thin plate 210(2) are disposed so as not to overlap each other in the upper plate member 2h(u). In particular, as illustrated on the left side of FIG. 4, the thin plate 210(1) and the thin plate 210(2) before the change in arrangement are each arranged so as not to overlap each other so as to face only one region A1 of the plurality of ("two" in the example illustrated in FIG. 4) regions A1. That is, the plurality of thin plates 210 included in the upper plate member 2h(u) are arranged so as not to overlap each other in the upper plate member 2h(u) so as to face only one region A1 of the plurality of regions A1 having the same area virtually provided on the hemispherical inner surface 12h(u).

As illustrated on the right side of FIG. 4, at least one thin plate 210 (in the example of FIG. 4, the thin plate 210(1)) among the plurality of thin plates 210 included in the upper plate member 2h(u) is moved around the axis 134 and rearranged, whereby one curved plate described below can be formed. That is, it is possible to form one curved plate having a shape corresponding to the region A1 having a virtual double right-angled spherical triangular shape that equally divides the inner surface 12. On the right side of FIG. 4, an example is illustrated in which the thin plate 210(1) is moved around the axis 134 at an angle smaller than 360 degrees and rearranged to form one curved plate having a double right-angled spherical triangular shape corresponding to the region A1 by the thin plate 210(1) and the thin plate 210(2). Specifically, an example is illustrated in which the thin plate 210(1) (the thin plate 210(1) before arrangement change) illustrated on the left side of FIG. 4 is moved clockwise by 30 degrees around the axis 134 to form one curved plate having a double right-angled spherical triangular shape corresponding to the region A1.

As described with reference to FIG. 4, the plurality of thin plates 210 included in the upper plate member 2h(u) is obtained by, for example, dividing the "one curved plate having a double right-angled spherical triangular shape corresponding to the region A1". Specifically, the plurality of thin plates 210 included in the upper plate member 2h(u) is obtained by dividing the "one curved plate having a double right-angled spherical triangular shape corresponding to the region A1" by the "one or more planes parallel to an equatorial plane (a plane passing through the center 131 and orthogonal to the axis 134)". The upper plate member 2h(u) is configured by arranging the plurality of thin plates 210 thus obtained so as not to overlap each other such that each of the thin plates faces only one region A1 in the plurality of regions A1. That is, the thin plate 210(1) and the thin plate 210(2) illustrated in FIG. 4 are obtained by dividing the "one curved plate having a double right-angled spherical triangular shape corresponding to the region A1" by "one plane parallel to the equatorial plane". The thin plate 210(1) and the thin plate 210(2) thus obtained are arranged so as not to overlap each other such that each of the thin plates faces only one region A1 of the plurality of regions A1, whereby the upper plate member 2h(u) illustrated on the left side of FIG. 4 is configured.

As described above with reference to FIGS. 1 to 4, the lighting device L1 includes the casing 1, the plate member 2, and the light source 3. The casing 1 has the outer surface 11, the inner surface 12, the spherical internal space 13, and the light receiving port 14 (observation unit). The inner surface 12 defines the internal space 13 and is formed of a material that reflects light. The internal space 13 has the center 131, the zenith 132, and the axis 134, with the axis 134 passing through the center 131 and the zenith 132. The light receiving port 14 is provided for observing the object S arranged in the internal space 13, and is arranged at a position corresponding to the zenith 132 or a position spaced apart from the zenith 132 in the circumferential direction along the inner surface 12.

The light source 3 is disposed so as to irradiate the internal space 13 with light. The plate member 2 is disposed facing the inner surface 12 in the internal space 13, covers a part of the inner surface 12 when viewed from the center 131, and is configured to be adjustable in position around the axis 134. The plate member 2 includes the first surface 21 facing the inner surface 12 and the second surface 22 facing the center 131.

The upper plate member 2h(u) (upper portion), which is a portion of the plate member 2 on the side where the light receiving port 14 is disposed with respect to the equatorial plane, includes the plurality of thin plates 210 disposed so as not to overlap each other. The plurality of thin plates 210 are configured such that the second surface 22h(u) absorbs light.

At least one thin plate 210 among the plurality of thin plates 210 arranged so as not to overlap each other on the upper plate member 2h(u) is moved around the axis 134 at an angle smaller than 360 degrees and rearranged, whereby the following curved plate can be formed by all of the plurality of thin plates 210. That is, by rearranging at least one thin plate 210, it is possible to form one curved plate having a double right-angled spherical triangular shape corresponding to the "region A1 of inner surface 12 connecting three points consisting of a point corresponding to zenith 132 of inner surface 12 and two points on an intersection line between an equatorial plane and inner surface 12" by all of the plurality of thin plates 210.

In this configuration, the plurality of thin plates 210 are configured such that the second surface 22h(u) absorbs light, and are arranged so as not to overlap each other in the upper plate member 2h(u). At least one thin plate 210 among the plurality of thin plates 210 is rearranged by being moved at an angle smaller than 360 degrees about the axis 134, whereby one "curved plate having a double right-angled spherical triangular shape corresponding to the region A1" can be formed by all of the plurality of thin plates 210. That is, the area of each of the plurality of thin plates 210 included in the upper plate member 2h(u) and configured such that the second surface 22h(u) absorbs light is smaller than the area of the "curved plate having a double right-angled spherical triangular shape corresponding to the region A1". In addition, when the upper plate members 2h(u) and the "curved plate having a double right-angled spherical triangular shape corresponding to the region A1" are arranged such that one side (for example, the lower side) of each thereof overlaps with each other, the area of the overlapping portion of both is smaller than the area of the "curved plate having a double right-angled spherical triangular shape corresponding to the region A1".

Therefore, in the upper plate member 2h(u), diffused light from the azimuth angle corresponding to the "curved plate having a double right-angled spherical triangular shape corresponding to the region A1" easily reaches the object S, and shadow/shade is less likely to occur in the object S, as compared with a conventional light trap configured to absorb light on the entire second surface (surface facing the center 131) of the "curved plate having a double right-angled spherical triangular shape corresponding to the region A1". Therefore, the lighting device L1 can realize highly accurate measurement while preventing a decrease in measurement accuracy due to generation of shadow/shade.

In the upper plate member 2h(u), the plurality of thin plates 210 may be connected to each other via a frame or the like. In addition, in the upper plate member 2h(u), the plurality of thin plates 210 may be connected to each other via a "white plate in which the first surface and the second surface are configured to reflect light" or may be connected to each other via a "transparent plate that transmits light".

In the upper plate member 2h(u) illustrated on the left side of FIG. 4, the thin plate 210(1) and the thin plate 210(2) are connected to each other via a frame. That is, in the upper plate member 2h(u) illustrated on the left side of FIG. 4, no member such as a thin plate is disposed in either the region 211(1) or the region 211(2). However, a "white plate configured such that the first surface and the second surface reflect light" or a "transparent plate that transmits light" may be disposed in the region 211(1) and the region 211(2) on the left side of FIG. 4. That is, the thin plate 210(1) and the thin plate 210(2) may be connected to each other via a "white plate in which the first surface and the second surface are configured to reflect light" or a "transparent plate that transmits light" arranged in the region 211(1) and the region 211(2) on the left side of FIG. 4.

(Lower Plate Member)

As illustrated in FIG. 3, in the lighting device L1 (main body B1), the plate member 2 includes the lower plate member 2h(d) facing the hemispherical inner surface 12h(d) of the lower casing 1h(d). That is, the plate member 2 includes the lower plate member 2h(d) (lower portion) which is a portion extending to the side opposite to the side where the light receiving port 14 is disposed with respect to the equatorial plane. As described above, the upper plate member 2h(u) (in particular, the thin plate 210(2)) and the lower plate member 2h(d) have the same length (arc length on the equatorial plane) in contact with the equatorial plane. The thin plate 210(2) and the lower plate member 2h(d) are disposed such that a surface of the thin plate 210(2) in contact with the equatorial plane and a surface of the lower plate member 2h(d) in contact with the equatorial plane face each other.

The lower plate member 2h(d) has a shape corresponding to (facing) at least a part of one region A1 among the plurality of regions A1 having equal areas virtually provided on the hemispherical inner surface 12h(d) of the lower casing 1h(d). For example, the lower plate member 2h(d) is configured as a belt-shaped (substantially trapezoidal) plate member (curved plate) formed by removing the curved plate having a double right-angled spherical triangular shape in a predetermined range from the apex angle from the curved plate having a double right-angled spherical triangular shape corresponding to (facing) the entire region A1. That is, the lower plate member 2h(d) is configured as a belt-shaped curved plate formed by removing the curved plate having a double right-angled spherical triangular shape below a predetermined longitude (a predetermined surface parallel to the equatorial plane) from the curved plate having a double right-angled spherical triangular shape corresponding to the entire region A1.

However, it is not essential that the lower plate member 2h(d) is configured as a belt-shaped plate member, and the lower plate member 2h(d) may be a plate member (curved plate) having a double right-angled spherical triangular shape corresponding to the entire region A1. The lower plate member 2h(d) only needs to have a shape (area) capable of absorbing the "specular reflection component that reaches the object S from the inner surface 12 (in particular, the hemispherical inner surface 12h(d)), is reflected by the object S, and reaches the light receiving port 14 (observation unit)" illustrated in FIG. 3. The shape of the lower plate member 2h(d) may be appropriately selected according to the embodiment. The lower plate member 2h(d) may be configured such that the latitude (the angle between the axis 134 and the straight line from the lower end to the center 131) of the lower end of the lower plate member 2h(d) extending toward the apex 132h(d) along the hemispherical inner surface 12h(d) can be adjusted according to the shape and size of the object S.

The surface (second surface 22h(d)) of the lower plate member 2h(d) facing the center 131 is made of a material that absorbs light. The light absorbing material is not particularly limited as long as it can absorb light, and may be, for example, a member painted black, a member made of a black material, or the like. As a specific example, the material that absorbs light may be, for example, carbon black, a non-reflective raised fabric, or the like. Meanwhile, the configuration of the surface (first surface 21h(d)) of the lower plate member 2h(d) facing the inner surface 12 is not particularly limited, and may be appropriately selected according to the embodiment. Similarly to the inner surface 12 (hemispherical inner surface 12h), the first surface 21h(d) of the lower plate member 2h(d) may be made of a material that diffusely reflects light. Alternatively, the first surface 21h(d) of the lower plate member 2h(d) may be made of another material.

In this configuration, the second surface 22h(d) of the lower plate member 2h(d) is configured to absorb light. Therefore, as illustrated in FIG. 3, the specular reflection component can be removed by the second surface 22h(d) of the lower plate member 2h(d), for example, even when the object S has a convex shape. Therefore, the lighting device L1 can realize highly accurate measurement while preventing a decrease in measurement accuracy due to the residual specular reflection component.

Similarly to the thin plate 210, the material of the lower plate member 2h(d) is not particularly limited, and may be appropriately selected according to the embodiment. For example, an acrylic resin, a stainless material, or the like may be used for the lower plate member 2h(d). The material of the lower plate member 2h(d) is desirably a material having excellent workability and capable of securing strength.

(Controller)

Next, functions of the controller 100 will be described in detail. The controller 100 controls the operation of each unit (in particular, the plate member 2) of the lighting device L1, and executes colorimetry of the object S based on measurement data such as each reflection component of the object S measured in the lighting device L1. The controller 100 is realized by a general-purpose or dedicated computer, and includes at least the following functional units illustrated in FIG. 5 as functional components realized by the CPU, the memory, and the like. That is, the controller 100 includes at least a position control unit 110, a drive unit 120, a data acquisition unit 130, and a storage unit 140.

Figure 5:
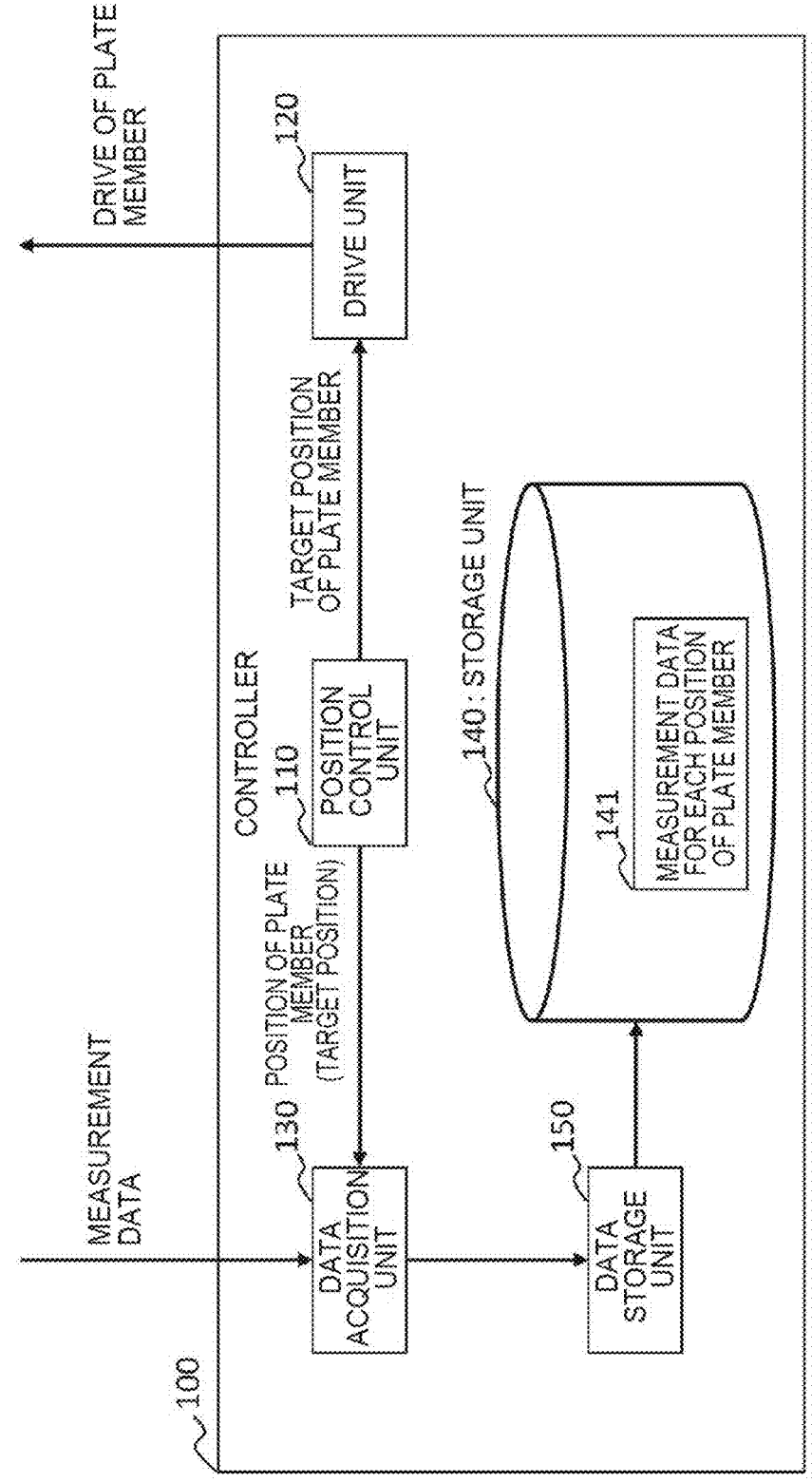
FIG. 5 is a diagram schematically illustrating an example of a software configuration of a controller according to the first embodiment.

FIG. 5 is a diagram schematically illustrating an example of a software configuration of the controller 100. The position control unit 110 controls the position (position around the axis 134) of the plate member 2. That is, the position control unit 110 controls the position of the plate member 2 so that the plate member 2 moves clockwise (or counterclockwise) around the axis 134 by a predetermined angle (for example, 30 degrees) at a predetermined cycle. For example, the position control unit 110 grasps the position of the plate member 2 at the present (current cycle) and determines the position (target position) of the plate member 2 in the next cycle. The target position is a position moved clockwise (or counterclockwise) around the axis 134 by a predetermined angle from the current position of the plate member 2. The position control unit 110 notifies the drive unit 120 and the data acquisition unit 130 of the position (for example, the current position and the target position in the next cycle) of the plate member 2 in each cycle.

The drive unit 120 changes the position (position around the axis 134) of the plate member 2 according to the position (in particular, the target position in the next cycle) of the plate member 2 in each cycle notified from the position control unit 110. That is, the drive unit 120 changes the position of the plate member 2 so that the plate member 2 reaches the target position in the next cycle. The drive unit 120 may be realized by a servomotor or the like.

The data acquisition unit 130 acquires, from a sensor or the like arranged in the light receiving port 14 (observation unit), "various types of measurement data regarding the object S" measured by the sensor or the like at the time point the plate member 2 reaches the "position of the plate member 2 in each cycle" notified from the position control unit 110. That is, the data acquisition unit 130 acquires measurement data in each cycle for the object S. The data acquisition unit 130 notifies the data storage unit 150 of the acquired measurement data of each cycle together with the "position of the plate member 2 in each cycle" notified from the position control unit 110.

The data storage unit 150 stores the measurement data of each cycle acquired by the data acquisition unit 130 in the storage unit 140 in association with the position of the plate member 2 in each cycle. That is, the data storage unit 150 stores "the measurement data 141 for each position of the plate member 2" in the storage unit 140. By analyzing the "measurement data 141 for each position of the plate member 2", colorimetry of the object S can be executed.

§ 2 Method of Use

Figure 6:
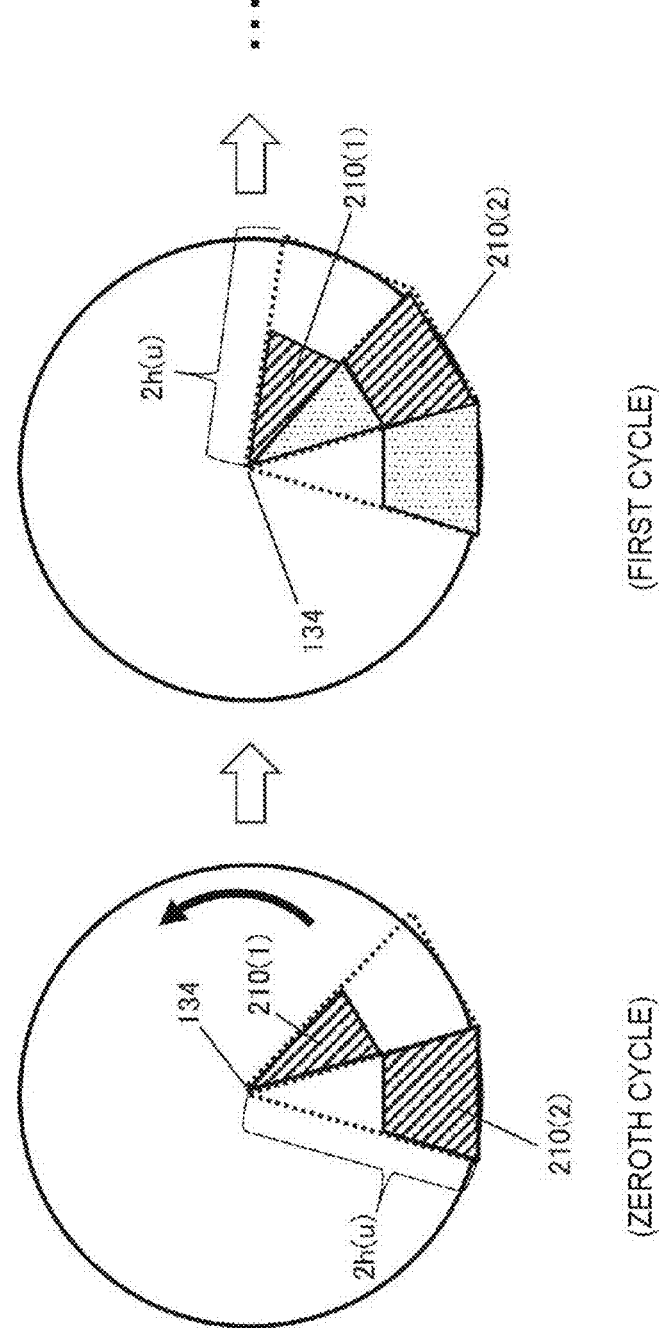
FIG. 6 is a view illustrating a state of movement of a plate member whose position is controlled by the controller in FIG. 5.

Next, a method of using the lighting device L1 according to the present embodiment will be described with reference to FIG. 6. FIG. 6 is a diagram illustrating a state of movement of the plate member 2 whose position (position around the axis 134) is controlled by the controller 100. In particular, FIG. 6 schematically illustrates the relationship between the upper plate member 2$h$(u) and the hemispherical inner surface 12$h$(u) as viewed from the center 131, and illustrates how the position of the upper plate member 2$h$(u) moves as viewed from the center 131.

First, as preparation for colorimetry, the user disposes a measurement object S (hereinafter, abbreviated as "object S") near the center 131 of the internal space 13 of the casing 1. Next, the user turns on the light source 3 to cause the light source 3 to irradiate the internal space 13 with light. As a result, the light is diffused and reflected by the inner surface 12 of the casing 1 in the internal space 13. Then, the user disposes the optical sensor on the outer surface 11 side of the casing 1 in accordance with the light receiving port 14, and starts measurement of each reflected component of the object S disposed in the internal space 13 by the optical sensor.

Note that the type of the object S is not particularly limited, and may be appropriately selected according to the embodiment. In addition to the flat and uniform sample surface, the object S may be, for example, an uneven building material (for example, tiles, stones, and the like), a food or ingredient (for example, bread, chocolate, and the like), a plant, a living thing (for example, insects and the like), or the like. In addition, the type of the optical sensor is not particularly limited as long as the colorimetry of the object S is possible, and may be appropriately selected according to the embodiment. As the optical sensor, for example, a color brightness meter, a digital camera, a charge coupled device (CCD), a complementary metal-oxide-semiconductor (CMOS), or the like may be used.

For example, in the zeroth cycle (that is, the start time point), the plate member 2 (upper plate member 2$h$(u)) is at a position illustrated on the left side of FIG. 6. Specifically, at the start time point, the thin plate 210(2) of the upper plate member 2$h$(u) is at the 6:00 position (the lower side of FIG. 6). The position control unit 110 grasps that "in the zeroth cycle, the thin plate 210(2) is at the 6:00 position" and notifies the data acquisition unit 130 that "in the zeroth cycle, the thin plate 210(2) is at the 6:00 position". In addition, each reflection component of the object S in the zeroth cycle is measured by the optical sensor, and the measurement result, that is, the measurement data is sent to the data acquisition unit 130. The data storage unit 150 stores the "measurement data in the zeroth cycle" acquired by the data acquisition unit 130 in the storage unit 140 as "measurement data 141 for each position of the plate member 2" in association with the "position of the plate member 2 (upper plate member 2$h$(u)) in the zeroth cycle".

In addition, the position control unit 110 determines the position (target position) of the plate member 2 (upper plate member 2$h$(u)) in the next cycle (that is, the first cycle), and notifies the drive unit 120 and the data acquisition unit 130 of the determined "target position of the plate member 2 in the first cycle". In the example of FIG. 6, a position moved by 30 degrees counterclockwise around the axis 134 from the plate member 2 in the zeroth cycle is the "target position of the plate member 2 in the first cycle".

The drive unit 120 changes the position of the plate member 2 according to the "target position of the plate member 2 in the first cycle" notified from the position control unit 110. As a result, in the first cycle, the plate member 2 (upper plate member 2$h$(u)) is at a position moved counterclockwise by 30 degrees about the axis 134 from the plate member 2 in the zeroth cycle. A region indicated in gray in the upper plate member 2$h$(u) of the first cycle indicates a region of the inner surface 12 (hemispherical inner surface 12$h$(u)) facing the thin plate 210(1) or the thin plate 210(2) by that time (cycle).

Then, each reflection component of the object S in the first cycle is measured by the optical sensor, and the measurement result, that is, the measurement data is sent to the data acquisition unit 130. The data storage unit 150 stores the "measurement data in the first cycle" acquired by the data acquisition unit 130 in the storage unit 140 as the "measurement data 141 for each position of the plate member 2" in association with the "position of the plate member 2 (upper plate member 2$h$(u)) in the first cycle".

In this manner, the measurement data in each cycle is associated with the position of the plate member 2 in each cycle and stored in the storage unit 140 as the "measurement data 141 for each position of the plate member 2". When the entire inner surface 12 (the hemispherical inner surface 12$h$(u)) faces at least one of the thin plate 210(1) and the thin plate 210(2) at least once, acquisition of measurement data necessary for colorimetry of the object S is completed. In the example illustrated in FIG. 6, the measurement data in each cycle from the zeroth cycle to the eleventh cycle is associated with the position of the plate member 2 in each cycle and stored in the storage unit 140 as "measurement data 141 for each position of the plate member 2", whereby the acquisition of the measurement data necessary for colorimetry of the object S is completed.

§ 3 Features

As described above, in the lighting device L1 according to the present embodiment, the plurality of thin plates 210 included in the upper plate member 2$h$(u) are configured such that the second surface 22$h$(u) absorbs light. At least one thin plate 210 among the plurality of thin plates 210 arranged so as not to overlap each other on the upper plate member 2$h$(u) is moved around the axis 134 at an angle smaller than 360 degrees and rearranged, whereby the following curved plate can be formed by all of the plurality of thin plates 210. That is, one "curved plate having a double right-angled spherical triangular shape corresponding to the region A1" can be formed. In the upper plate member 2$h$(u), for example, the plurality of thin plates 210 are arranged so as not to overlap each other so as to face only one region A1 in the plurality of regions A1.

That is, in the lighting device L1, the area of each of the plurality of thin plates 210 included in the upper plate member 2$h$(u) and configured such that the second surface 22$h$(u) absorbs light is smaller than the area of the "curved plate having a double right-angled spherical triangular shape corresponding to the region A1". Therefore, in the upper plate member 2$h$(u), diffused light from the azimuth angle corresponding to the "curved plate having a double right-angled spherical triangular shape corresponding to the region A1" easily reaches the object S, and shadow/shade is less likely to occur in the object S, as compared with a conventional light trap configured to absorb light on the entire second surface (surface facing the center 131) of the "curved plate having a double right-angled spherical triangular shape corresponding to the region A1". Therefore, the lighting device L1 can realize highly accurate measurement while preventing a decrease in measurement accuracy due to generation of shadow/shade.

In addition, in the lighting device L1 according to the present embodiment, the plate member 2 includes the lower plate member 2$h$(d) which is a portion extending to the side opposite to the side where the light receiving port 14 is disposed with respect to the equatorial plane, and the second surface 22$h$(d) of the lower plate member 2$h$(d) is made of a material that absorbs light. Therefore, for example, even when the object S has a convex shape, the specular reflection component can be removed by the second surface 22$h$(d) of the lower plate member 2$h$(d). Therefore, the lighting device L1 can realize highly accurate measurement while preventing a decrease in measurement accuracy due to the residual specular reflection component.

As is clear from the above description, in a case where attention is paid only to the viewpoint of suppressing the occurrence of shadow/shade in order to prevent a decrease in measurement accuracy, it is not essential that the lighting device L1 according to the present embodiment includes the lower plate member 2$h$(d) as the light trap (plate member 2). That is, in order to suppress the occurrence of shadow/shade, the lighting device L1 only needs to include the upper plate member 2$h$(u) as the light trap (plate member 2). Since the lighting device L1 includes the upper plate member 2$h$(u) as the light trap (plate member 2), it is possible to suppress the occurrence of shadow/shade, to prevent a decrease in measurement accuracy due to the occurrence of shadow/shade, and to realize highly accurate measurement. In addition, since the lighting device L1 includes the lower plate member 2$h$(d) as the light trap (plate member 2) in addition to the upper plate member 2$h$(u), it is possible to further prevent a decrease in measurement accuracy due to the residual specular reflection component and realize highly accurate measurement.

§ 4 Modifications

Although one embodiment of the present invention has been described above, the above description is merely an example of the present invention in all respects. It goes without saying that various improvements and modifications can be made without departing from the scope of the present invention. For example, the following modifications are possible. In the following description, the same reference numerals are used for the same components as those of the above embodiment, and the description of the same points as those of the above embodiment is appropriately omitted. The following modifications can be appropriately combined.

<4.1> Configuration of Observation Unit

In the above embodiment, the casing 1 includes the light receiving port 14 as an example of the observation unit. However, the configuration of the observation unit is not limited to such an example, and may be appropriately selected according to the embodiment. For example, the observation unit may be constituted by the optical sensor itself.

<4.2> Shape of Upper Portion of Plate Member

In the above embodiment, the upper portion (upper plate member 2$h$(u)) of the plate member functioning as the light trap includes the thin plate 210(1) and the thin plate 210(2). However, the upper portion of the plate member included in the lighting device according to the present embodiment is not limited to such an example, and may be appropriately selected according to the embodiment. The upper portion of the plate member included in the lighting device according to the present embodiment may include a plurality of thin plates that can form a "curved plate having a double right-angled spherical triangular shape corresponding to the region A1" by all of the plurality of thin plates by moving and rearranging at least one thin plate at an angle smaller than 360 degrees around the axis 134.

Figure 7A:
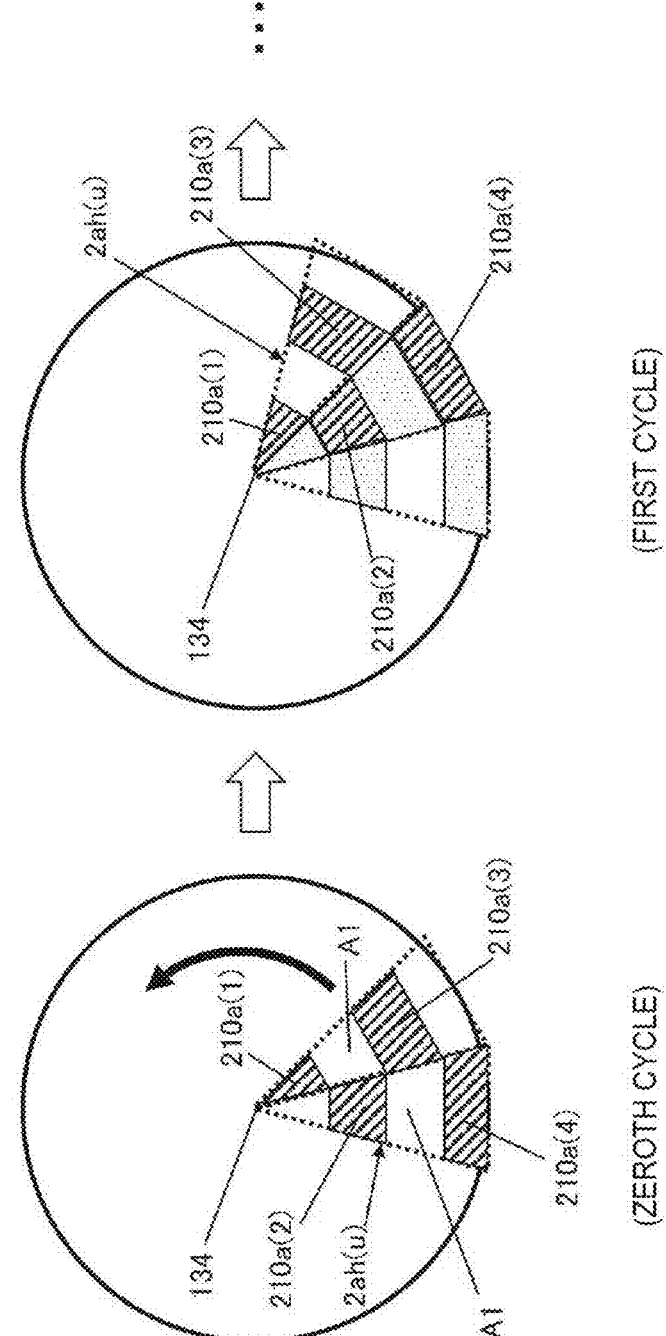
FIG. 7A is a view for explaining how a plurality of thin plates included in an upper plate member according to a modification are arranged in the upper plate member according to the modification.

FIG. 7A is a diagram illustrating a configuration of an upper portion (that is, the upper plate member 2$ah$(u)) of a plate member 2$a$ in a lighting device L1$a$ (main body B1$a$) according to a modification. In other words, FIG. 7A is a view schematically illustrating the relationship between the upper plate member 2$ah$(u) and the hemispherical inner surface 12$h$(u) as viewed from the center 131, and is a view for explaining how the plurality of thin plates 210 included in the upper plate member 2$ah$(u) are arranged in the upper plate member 2$ah$(u). The lighting device L1$a$ is similar to the lighting device L1 except that the plate member 2$a$ is provided instead of the plate member 2.

In the plate member 2$a$, the upper plate member 2$ah$(u) (in particular, a thin plate 210$a$(4) to be described later) and the lower plate member 2$h$(d) are in contact with each other at the equatorial plane. That is, in the plate member 2$a$, a portion extending from the equatorial plane to the side where the light receiving port 14 is arranged with respect to the equatorial plane is the upper plate member 2$ah$(u), and a portion extending from the equatorial plane to the side opposite to the side where the light receiving port 14 is arranged with respect to the equatorial plane is the lower plate member 2$h$(d). For example, the upper plate member 2$ah$(u) (in particular, a thin plate 210$a$(4) to be described later) and the lower plate member 2*h*(d) have the same length in contact with the equatorial plane, and are disposed such that a surface of the thin plate 210*a*(4) in contact with the equatorial plane and a surface of the lower plate member 2*h*(d) in contact with the equatorial plane face each other. In the plate member 2*a*, the upper plate member 2*ah*(u) and the lower plate member 2*h*(d) may be integrally formed, that is, the upper plate member 2*ah*(u) and the lower plate member 2*h*(d) may be connected to each other. For example, by rotating the upper plate member 2*ah*(u) about the axis 134, the lower plate member 2*h*(d) also rotates about the axis 134.

The plate member 2*a* is disposed facing the inner surface 12 in the internal space 13. The plate member 2*a* includes an upper plate member 2*ah*(u) facing the hemispherical inner surface 12*h*(u) of the upper casing 1*h*(u), and a lower plate member 2*h*(d) facing the hemispherical inner surface 12*h*(d) of the lower casing 1*h*(d). Since the lower plate member 2*h*(d) included in the plate member 2*a* is similar to the lower plate member 2*h*(d) included in the plate member 2, the description thereof will be omitted.

As illustrated in FIG. 7A, the upper plate member 2*ah*(u) includes a plurality of thin plates 210*a*, and in the example illustrated in FIG. 7A, the upper plate member 2*ah*(u) includes a thin plate 210*a*(1), a thin plate 210*a*(2), a thin plate 210*a*(3), and a thin plate 210*a*(4). In the following description, when the plurality of thin plates 210*a* are collectively referred to without distinction, the term "thin plate 210*a*" is simply used. In distinguishing each of the plurality of thin plates 210*a*, "(1)", "(2)", . . . , "(n)", and the like are added to distinguish each. The thin plate 210*a* included in the upper plate member 2*ah*(u) is the same as the thin plate 210 included in the upper plate member 2*h*(u) except for the number and arrangement positions thereof. For example, the surface (second surface 22*h*(u)) of the thin plate 210*a* facing the center 131 is made of a material that absorbs light, similarly to the second surface 22*h*(u) of the thin plate 210.

As illustrated in FIG. 7A, the thin plate 210*a*(1), the thin plate 210*a*(2), the thin plate 210*a*(3), and the thin plate 210*a*(4) included in the upper plate member 2*ah*(u) are arranged so as not to overlap each other in the upper plate member 2*ah*(u). In particular, as illustrated in FIG. 7A, these four thin plates 210*a* are arranged so as not to overlap each other so as to face only one region A1 of the plurality of ("two" in the example illustrated in FIG. 7A) regions A1 in the upper plate member 2*ah*(u). That is, the plurality of thin plates 210*a* included in the upper plate member 2*ah*(u) are arranged not to overlap each other so as to face only one region A1 of the plurality of regions A1 virtually provided on the hemispherical inner surface 12*h*(u) in the upper plate member 2*ah*(u).

By rearranging at least one thin plate 210*a* among the plurality of thin plates 210*a* included in the upper plate member 2*ah*(u) by moving at an angle smaller than 360 degrees around the axis 134, one "curved plate having a double right-angled spherical triangular shape corresponding to the region A1" can be formed. In the example illustrated in FIG. 7A, by moving the thin plate 210*a*(1) and the thin plate 210*a*(3) of the upper plate member 2*ah*(u) clockwise by 30 degrees around the axis 134, it is possible to form one curved plate having a double right-angled spherical triangular shape corresponding to the region A1.

In the upper plate member 2*ah*(u), the plurality of thin plates 210*a* may be connected to each other via a frame or the like. In addition, in the upper plate member 2*ah*(u), the plurality of thin plates 210*a* may be connected to each other via a "white plate in which the first surface and the second surface are configured to reflect light" or may be connected to each other via a "transparent plate that transmits light".

Figure 7B:
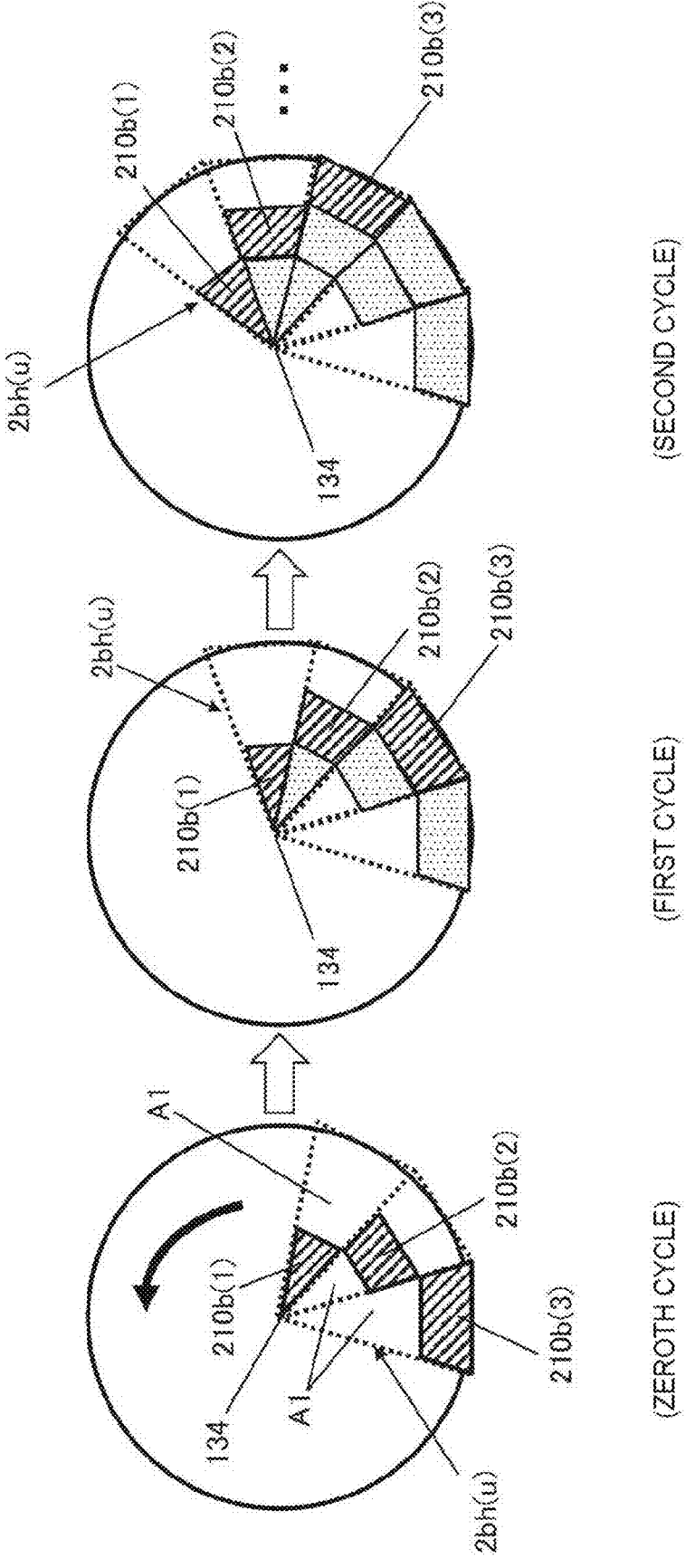
FIG. 7B is a view for explaining how the plurality of thin plates included in the upper plate member according to the modification are arranged in the upper plate member according to the modification.

FIG. 7B is a diagram illustrating a configuration of an upper portion (that is, the upper plate member 2*bh*(u)) of the plate member 2*b* in the lighting device L1*b* (main body B1*b*) according to the modification. In other words, FIG. 7B is a view schematically illustrating the relationship between the upper plate member 2*bh*(u) and the hemispherical inner surface 12*h*(u) as viewed from the center 131, and is a view for explaining how the plurality of thin plates 210 included in the upper plate member 2*bh*(u) are arranged in the upper plate member 2*bh*(u). The lighting device L1*b* is similar to the lighting device L1 except that the plate member 2*b* is provided instead of the plate member 2.

In the plate member 2*b*, the upper plate member 2*bh*(u) (in particular, a thin plate 210*b*(3) to be described later) and the lower plate member 2*h*(d) are in contact with each other in the equatorial plane. That is, in the plate member 2*b*, a portion extending from the equatorial plane to the side where the light receiving port 14 is disposed with respect to the equatorial plane is the upper plate member 2*bh*(u), and a portion extending from the equatorial plane to the side opposite to the side where the light receiving port 14 is disposed with respect to the equatorial plane is the lower plate member 2*h*(d). For example, the upper plate member 2*bh*(u) (in particular, a thin plate 210*b*(3) to be described later) and the lower plate member 2*h*(d) have the same length in contact with the equatorial plane, and are disposed such that a surface of the thin plate 210*b*(3) in contact with the equatorial plane and a surface of the lower plate member 2*h*(d) in contact with the equatorial plane face each other. In the plate member 2*b*, the upper plate member 2*bh*(u) and the lower plate member 2*h*(d) may be integrally formed, that is, they may be connected to each other. For example, by rotating the upper plate member 2*bh*(u) about the axis 134, the lower plate member 2*h*(d) also rotates about the axis 134.

The plate member 2*b* is disposed facing the inner surface 12 in the internal space 13. The plate member 2*b* includes an upper plate member 2*bh*(u) facing a hemispherical inner surface 12*h*(u) of the upper casing 1*h*(u), and a lower plate member 2*h*(d) facing a hemispherical inner surface 12*h*(d) of the lower casing 1*h*(d). Since the lower plate member 2*h*(d) included in the plate member 2*b* is similar to the lower plate member 2*h*(d) included in the plate member 2, the description thereof will be omitted.

As illustrated in FIG. 7B, the upper plate member 2*bh*(u) includes a plurality of thin plates 210*b*, and in the example illustrated in FIG. 7B, the upper plate member 2*bh*(u) includes a thin plate 210*b*(1), a thin plate 210*b*(2), and a thin plate 210*b*(3). In the following description, when the plurality of thin plates 210*b* are collectively referred to without distinction, the term "thin plate 210*b*" is simply used. In distinguishing each of the plurality of thin plates 210*b*, "(1)", "(2)", . . . , "(n)", and the like are added to distinguish each.

The thin plate 210*b* included in the upper plate member 2*bh*(u) is the same as the thin plate 210 included in the upper plate member 2*h*(u) except for the number and arrangement positions thereof. For example, the surface (second surface 22*h*(u)) of the thin plate 210*b* facing the center 131 is made of a material that absorbs light, similarly to the second surface 22*h*(u) of the thin plate 210. As illustrated in FIG. 7B, the thin plate 210*b*(1), the thin plate 210*b*(2), and the thin plate 210*b*(3) included in the upper plate member 2*bh*(u) are disposed so as not to overlap each other in the upper plate member 2*bh*(u). In particular, as illustrated in FIG. 7B, these three thin plates 210*b* are arranged so as not to overlap each other so as to face only one region A1 of a plurality of ("three" in the example illustrated in FIG. 7B) regions A1 in the upper plate member 2*bh*(u). That is, the plurality of thin plates 210*b* included in the upper plate member 2*bh*(u) are arranged not to overlap each other so as to face only one region A1 of the plurality of regions A1 virtually provided on the hemispherical inner surface 12*h*(u) in the upper plate member 2*bh*(u).

By rearranging at least one thin plate 210*b* among the plurality of thin plates 210*b* included in the upper plate member 2*bh*(u) by moving at an angle smaller than 360 degrees about the axis 134, one "curved plate having a double right-angled spherical triangular shape corresponding to the region A1" can be formed. In the example illustrated in FIG. 7B, by moving the thin plate 210*b*(1) of the upper plate member 2*bh*(u) clockwise by 60 degrees and moving the thin plate 210*b*(2) clockwise by 30 degrees around the axis 134, one curved plate having a double right-angled spherical triangular shape corresponding to the region A1 can be formed.

In the upper plate member 2*bh*(u), the plurality of thin plates 210*b* may be connected to each other via a frame or the like. In the upper plate member 2*bh*(u), the plurality of thin plates 210*b* may be connected to each other via a "white plate in which the first surface and the second surface are configured to reflect light" or may be connected to each other via a "transparent plate that transmits light".

Figure 7C:
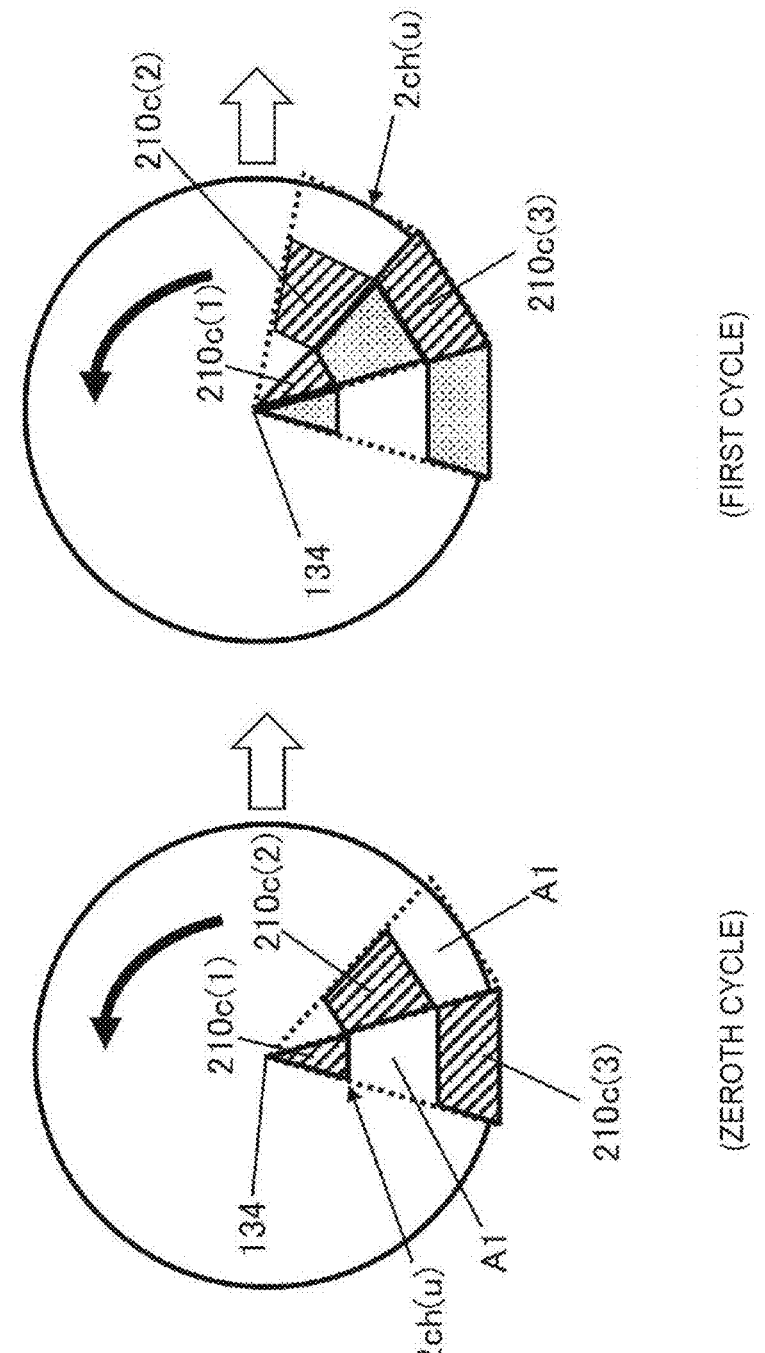
FIG. 7C is a view for explaining how the plurality of thin plates included in the upper plate member according to the modification are arranged in the upper plate member according to the modification.

FIG. 7C is a diagram illustrating a configuration of an upper portion (that is, the upper plate member 2*ch*(u)) of the plate member 2*c* in the lighting device L1*c* (main body B1*c*) according to the modification. In other words, FIG. 7C is a view schematically illustrating the relationship between the upper plate member 2*ch*(u) and the hemispherical inner surface 12*h*(u) as viewed from the center 131, and is a view for explaining how the plurality of thin plates 210 included in the upper plate member 2*ch*(u) are arranged in the upper plate member 2*ch*(u). The lighting device L1*c* is similar to the lighting device L1 except that a plate member 2*c* is provided instead of the plate member 2.

In the plate member 2*c*, the upper plate member 2*ch*(u) (in particular, a thin plate 210*c*(3) to be described later) and the lower plate member 2*h*(d) are in contact with each other in the equatorial plane. That is, in the plate member 2*c*, a portion extending from the equatorial plane to the side where the light receiving port 14 is disposed with respect to the equatorial plane is the upper plate member 2*ch*(u), and a portion extending from the equatorial plane to the side opposite to the side where the light receiving port 14 is disposed with respect to the equatorial plane is the lower plate member 2*h*(d). For example, the upper plate member 2*ch*(u) (in particular, a thin plate 210*c*(3) to be described later) and the lower plate member 2*h*(d) have the same length in contact with the equatorial plane, and are disposed such that a surface of the thin plate 210*c*(3) in contact with the equatorial plane and a surface of the lower plate member 2*h*(d) in contact with the equatorial plane face each other. In the plate member 2*c*, the upper plate member 2*ch*(u) and the lower plate member 2*h*(d) may be integrally formed, that is, the upper plate member 2*ch*(u) and the lower plate member 2*h*(d) may be connected to each other. For example, by rotating the upper plate member 2*ch*(u) about the axis 134, the lower plate member 2*h*(d) also rotates about the axis 134.

The plate member 2*c* is disposed facing the inner surface 12 in the internal space 13. The plate member 2*c* includes an upper plate member 2*ch*(u) facing the hemispherical inner surface 12*h*(u) of the upper casing 1*h*(u), and a lower plate member 2*h*(d) facing the hemispherical inner surface 12*h*(d)

of the lower casing 1*h*(d). Since the lower plate member 2*h*(d) included in the plate member 2*c* is similar to the lower plate member 2*h*(d) included in the plate member 2, the description thereof will be omitted.

As illustrated in FIG. 7C, the upper plate member 2*ch*(u) includes a plurality of thin plates 210*c*, and in the example illustrated in FIG. 7C, the upper plate member 2*ch*(u) includes a thin plate 210*c*(1), a thin plate 210*c*(2), and a thin plate 210*c*(3). In the following description, when the plurality of thin plates 210*c* are collectively referred to without distinction, the term "thin plate 210*c*" is simply used. In distinguishing each of the plurality of thin plates 210*c*, "(1)", "(2)", . . . , "(n)", and the like are added to distinguish each.

The thin plate 210*c* included in the upper plate member 2*ch*(u) is the same as the thin plate 210 included in the upper plate member 2*h*(u) except for the number and arrangement positions thereof. For example, the surface (second surface 22*h*(u)) of the thin plate 210*c* facing the center 131 is made of a material that absorbs light, similarly to the second surface 22*h*(u) of the thin plate 210. As illustrated in FIG. 7C, the thin plate 210*c*(1), the thin plate 210*c*(2), and the thin plate 210*c*(3) included in the upper plate member 2*ch*(u) are arranged so as not to overlap each other in the upper plate member 2*ch*(u). In particular, as illustrated in FIG. 7C, these three thin plates 210*c* are arranged so as not to overlap each other so as to face only one region A1 of a plurality of ("two" in the example illustrated in FIG. 7C) regions A1 in the upper plate member 2*ch*(u). That is, the plurality of thin plates 210*c* included in the upper plate member 2*ch*(u) are arranged not to overlap each other so as to face only one region A1 of the plurality of regions A1 virtually provided on the hemispherical inner surface 12*h*(u) in the upper plate member 2*ch*(u).

By rearranging at least one thin plate 210*c* among the plurality of thin plates 210*c* included in the upper plate member 2*ch*(u) by moving at an angle smaller than 360 degrees around the axis 134, one "curved plate having a double right-angled spherical triangular shape corresponding to the region A1" can be formed. In the example illustrated in FIG. 7C, by moving the thin plate 210*c*(2) of the upper plate member 2*ch*(u) clockwise by 30 degrees around the axis 134, it is possible to form one curved plate having a double right-angled spherical triangular shape corresponding to the region A1.

In the upper plate member 2*ch*(u), the plurality of thin plates 210*c* may be connected to each other via a frame or the like. In the upper plate member 2*ch*(u), the plurality of thin plates 210*c* may be connected to each other via a "white plate configured such that the first surface and the second surface reflect light" or may be connected to each other via a "transparent plate that transmits light".

Figure 7D:
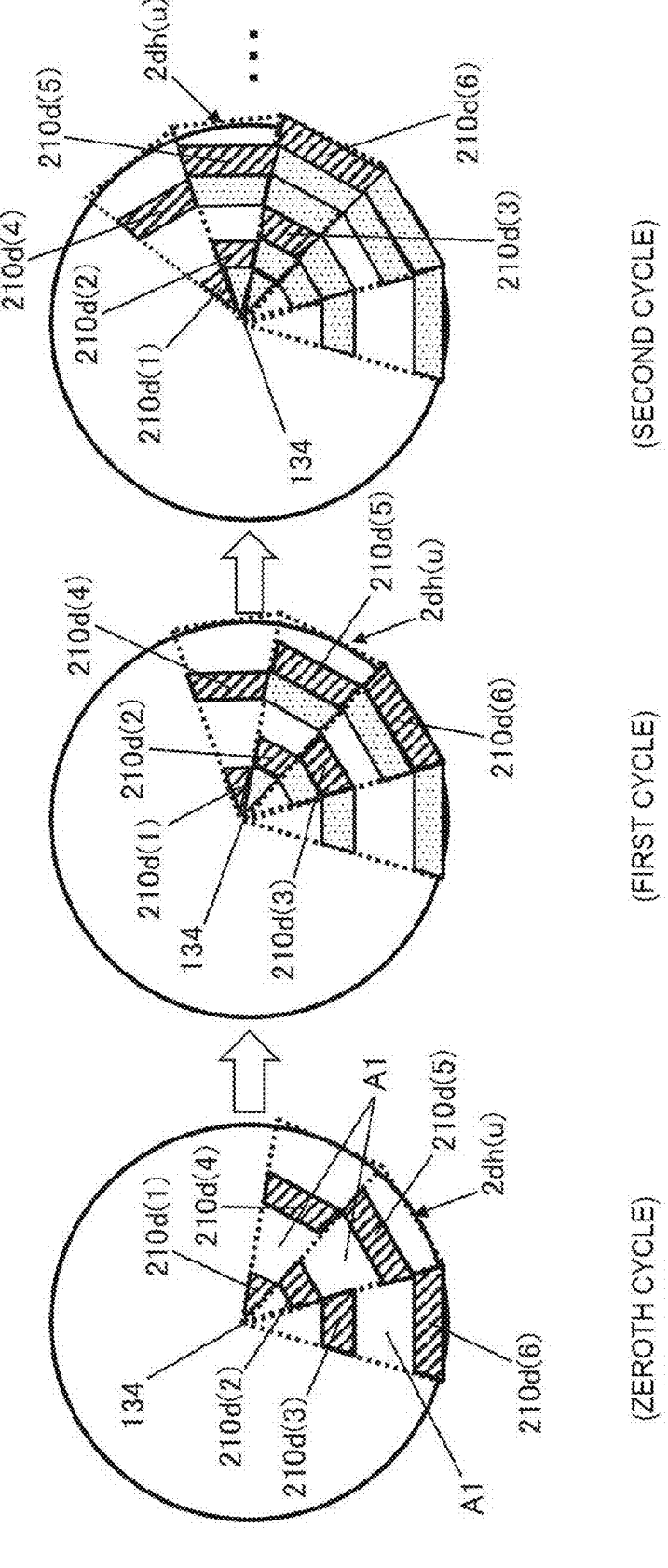
FIG. 7D is a view for explaining how the plurality of thin plates included in the upper plate member according to the modification are arranged in the upper plate member according to the modification.

FIG. 7D is a diagram illustrating a configuration of an upper portion (that is, an upper plate member 2*dh*(u)) of the plate member 2*d* in the lighting device L1*d* (main body B1*d*) according to the modification. In other words, FIG. 7D is a view schematically illustrating the relationship between the upper plate member 2*dh*(u) and the hemispherical inner surface 12*h*(u) as viewed from the center 131, and is a view for explaining how the plurality of thin plates 210 included in the upper plate member 2*dh*(u) are arranged in the upper plate member 2*dh*(u). The lighting device L1*d* is similar to the lighting device L1 except that a plate member 2*d* is provided instead of the plate member 2. The plate member 2*d* is disposed facing the inner surface 12 in the internal space 13. The plate member 2*d* includes the upper plate member 2*dh*(u) facing a hemispherical inner surface 12*h*(u) of the upper casing 1*h*(u), and the lower plate member 2*h*(d)

facing a hemispherical inner surface $12h$(d) of the lower casing $1h$(d). Since the lower plate member $2h$(d) included in the plate member $2d$ is similar to the lower plate member $2h$(d) included in the plate member $2$, the description thereof will be omitted.

In the plate member $2d$, the upper plate member $2dh$(u) (in particular, a thin plate $210d(6)$ to be described later) and the lower plate member $2h$(d) are in contact with each other in the equatorial plane. That is, in the plate member $2d$, a portion extending from the equatorial plane to the side where the light receiving port $14$ is disposed with respect to the equatorial plane is the upper plate member $2dh$(u), and a portion extending from the equatorial plane to the side opposite to the side where the light receiving port $14$ is disposed with respect to the equatorial plane is the lower plate member $2h$(d). For example, the upper plate member $2dh$(u) (in particular, a thin plate $210d(6)$ to be described later) and the lower plate member $2h$(d) have the same length in contact with the equatorial plane, and are disposed such that a surface of the thin plate $210d(6)$ in contact with the equatorial plane and a surface of the lower plate member $2h$(d) in contact with the equatorial plane face each other. In the plate member $2d$, the upper plate member $2dh$(u) and the lower plate member $2h$(d) may be integrally formed, that is, they may be connected to each other. For example, by rotating the upper plate member $2dh$(u) about the axis $134$, the lower plate member $2h$(d) also rotates about the axis $134$.

As illustrated in FIG. 7D, the upper plate member $2dh$(u) includes a plurality of thin plates $210d$, and in the example illustrated in FIG. 7D, the upper plate member $2dh$(u) includes a thin plate $210d(1)$, a thin plate $210d(2)$, a thin plate $210d(3)$, a thin plate $210d(4)$, a thin plate $210d(5)$, and a thin plate $210d(6)$. In the following description, when the plurality of thin plates $210d$ are collectively referred to without distinction, the term "thin plate $210d$" is simply used. In distinguishing each of the plurality of thin plates $210d$, "(1)", "(2)", . . . , "(n)", and the like are added to distinguish each.

The thin plate $210d$ included in the upper plate member $2dh$(u) is the same as the thin plate $210$ included in the upper plate member $2h$(u) except for the number and arrangement positions thereof. For example, the surface of the thin plate $210d$ facing the center $131$ (second surface $22h$(u)) is made of a material that absorbs light, similarly to the second surface $22h$(u) of the thin plate $210$. As illustrated in FIG. 7D, the thin plate $210d(1)$ and the thin plates $210d(2)$ to $210d(6)$ included in the upper plate member $2dh$(u) are arranged so as not to overlap each other in the upper plate member $2dh$(u). In particular, as illustrated in FIG. 7D, these six thin plates $210d$ are arranged so as not to overlap each other so as to face only one region A1 of a plurality of ("three" in the example illustrated in FIG. 7D) regions A1 in the upper plate member $2dh$(u). That is, the plurality of thin plates $210d$ included in the upper plate member $2dh$(u) are arranged not to overlap each other so as to face only one region A1 of the plurality of regions A1 virtually provided on the hemispherical inner surface $12h$(u) in the upper plate member $2dh$(u).

By rearranging at least one thin plate $210d$ among the plurality of thin plates $210d$ included in the upper plate member $2dh$(u) by moving at an angle smaller than 360 degrees around the axis $134$, one "curved plate having a double right-angled spherical triangular shape corresponding to the region A1" can be formed. In the example illustrated in FIG. 7D, the thin plate $210d(1)$ and the thin plate $210d(4)$ of the upper plate member $2dh$(u) are moved clockwise by 60 degrees and the thin plate $210d(2)$ and the thin plate $210d(5)$ are moved clockwise by 30 degrees around the axis $134$, whereby one curved plate having a double right-angled spherical triangular shape corresponding to the region A1 can be formed.

In the upper plate member $2dh$(u), the plurality of thin plates $210d$ may be connected to each other via a frame or the like. Further, in the upper plate member $2dh$(u), the plurality of thin plates $210d$ may be connected to each other via a "white plate in which the first surface and the second surface are configured to reflect light" or may be connected to each other via a "transparent plate that transmits light".

The area of each of the plurality of thin plates (the thin plates $210a$ to $210d$) included in the upper portions (the upper plate members $2ah$(u) to $2dh$(u)) of the plate members (the plate members $2a$ to $2d$) described with reference to FIGS. 7A to 7D is less than or equal to half of the area of the "curved plate having a double right-angled spherical triangular shape corresponding to the region A1". In this configuration, the upper portion can secure twice or more of the amount of diffused light reaching the object S from the azimuth angle corresponding to the "curved plate having a double right-angled spherical triangular shape corresponding to the region A1" as compared with the conventional light trap configured to absorb light on the entire second surface (surface facing the center $131$) of the "curved plate having a double right-angled spherical triangular shape corresponding to the region A1".

<4.3> Necessity of Contact between Thin Plates

In the above embodiment, the plurality of thin plates (the thin plates $210$ to $210d$) included in the upper portion (the upper plate members $2h$(u) to $2dh$(u)) of the plate member (the plate member $2$ to $2d$) are in contact with each other. For example, the thin plate $210(1)$ and the thin plate $210(2)$ included in the upper plate member $2h$(u) are disposed so as not to overlap each other and in contact with each other in the upper plate member $2h$(u). However, in the lighting device according to the present embodiment, it is not essential that each of the plurality of thin plates included in the upper portion of the plate member is in contact with another thin plate. In the lighting device according to the present embodiment, the plurality of thin plates included in the upper portion of the plate member may be arranged without being in contact with each other in the upper portion of the plate member, that is, may be arranged apart from each other.

Figure 7E:
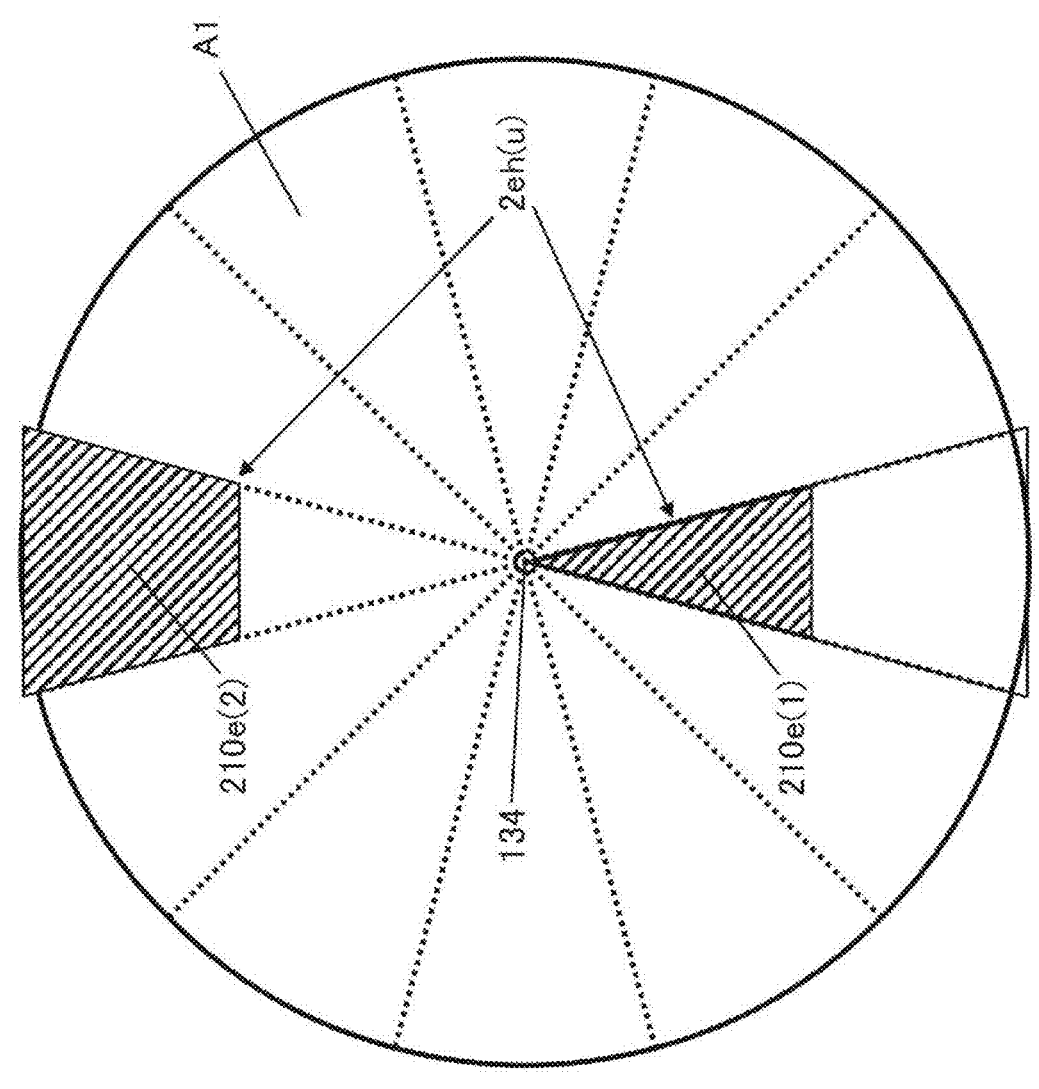
FIG. 7E is a view for explaining how the plurality of thin plates included in the upper plate member according to the modification are arranged in the upper plate member according to the modification.

FIG. 7E is a view illustrating a configuration of an upper portion (that is, the upper plate member $2eh$(u)) of the plate member $2e$ in the lighting device L1$e$ (main body B1$e$) according to the modification. In other words, FIG. 7E is a view schematically illustrating the relationship between the upper plate member $2eh$(u) and the hemispherical inner surface $12h$(u) as viewed from the center $131$, and is a view for explaining how the plurality of thin plates $210e$ included in the upper plate member $2eh$(u) are arranged in the upper plate member $2eh$(u). The lighting device L1$e$ is similar to the lighting device L1 except that a plate member $2e$ is provided instead of the plate member $2$. The plate member $2e$ is disposed facing the inner surface $12$ in the internal space $13$. The plate member $2e$ includes the upper plate member $2eh$(u) facing the hemispherical inner surface $12h$(u) of the upper casing $1h$(u), and the lower plate member $2h$(d) facing the hemispherical inner surface $12h$(d) of the lower casing $1h$(d). Since the lower plate member $2h$(d) included in the plate member $2e$ is similar to the lower plate member $2h$(d) included in the plate member $2$, the description thereof will be omitted.

In the plate member 2e, the upper plate member 2eh(u) (in particular, a thin plate 210e(2) to be described later) and the lower plate member 2h(d) are in contact with each other in the equatorial plane. That is, in the plate member 2e, a portion extending from the equatorial plane to the side where the light receiving port 14 is arranged with respect to the equatorial plane is the upper plate member 2eh(u), and a portion extending from the equatorial plane to the side opposite to the side where the light receiving port 14 is arranged with respect to the equatorial plane is the lower plate member 2h(d). For example, the upper plate member 2eh(u) (in particular, a thin plate 210e(2) to be described later) and the lower plate member 2h(d) have the same length in contact with the equatorial plane, and are disposed such that a surface of the thin plate 210e(2) in contact with the equatorial plane and a surface of the lower plate member 2h(d) in contact with the equatorial plane face each other. In the plate member 2e, the upper plate member 2eh(u) and the lower plate member 2h(d) may be integrally formed, that is, they may be connected to each other. For example, by rotating the upper plate member 2eh(u) about the axis 134, the lower plate member 2h(d) also rotates about the axis 134.

As illustrated in FIG. 7E, the upper plate member 2eh(u) includes a plurality of thin plates 210e, and includes a thin plate 210e(1) and a thin plate 210e(2) in the example illustrated in FIG. 7E. In the following description, when the plurality of thin plates 210e are collectively referred to without distinction, the term "thin plate 210e" is simply used. In distinguishing each of the plurality of thin plates 210e, "(1)", "(2)", . . . , "(n)", and the like are added to distinguish each.

The thin plate 210e included in the upper plate member 2eh(u) is the same as the thin plate 210 included in the upper plate member 2h(u) except for the arrangement position thereof. For example, the surface (second surface 22h(u)) of the thin plate 210e facing the center 131 is made of a material that absorbs light, similarly to the second surface 22h(u) of the thin plate 210. As illustrated in FIG. 7E, the thin plate 210e(1) and the thin plate 210e(2) included in the upper plate member 2eh(u) are disposed so as not to overlap each other in the upper plate member 2eh(u). In particular, as illustrated in FIG. 7E, these two thin plates 210e are arranged so as not to overlap each other so as to face only one region A1 of a plurality of ("two" in the example illustrated in FIG. 7E) regions A1 in the upper plate member 2eh(u). That is, the plurality of thin plates 210e included in the upper plate member 2eh(u) are arranged not to overlap each other so as to face only one region A1 of the plurality of regions A1 virtually provided on the hemispherical inner surface 12h(u) in the upper plate member 2eh(u).

By rearranging at least one thin plate 210e among the plurality of thin plates 210e included in the upper plate member 2eh(u) by moving at an angle smaller than 360 degrees around the axis 134, one "curved plate having a double right-angled spherical triangular shape corresponding to the region A1" can be formed. In the example illustrated in FIG. 7E, by moving the thin plate 210e(1) of the upper plate member 2eh(u) clockwise by 180 degrees around the axis 134, one curved plate having a double right-angled spherical triangular shape corresponding to the region A1 can be formed. In the upper plate member 2eh(u), the plurality of thin plates 210e may be connected to each other via a frame or the like.

As described with reference to FIG. 7E, in the lighting device L1e, the plurality of thin plates (thin plates 210e) included in the upper portion (upper plate member 2eh(u)) of the plate member (plate member 2e) may not be in contact with each other. In this configuration, the upper portion including the plurality of thin plates not in contact with each other can be configured.

<4.4> Number of Plate Members

So far, an example has been described in which each of the lighting devices L1 to L1e (main bodies B1 to B1e) includes one plate member (specifically, each of the plate members 2 to 2e). However, it is not essential that the lighting device according to each of the above embodiments includes one plate member, and a plurality of plate members may be provided. For example, the lighting device according to each of the above embodiments may include two plate members (a first plate member and a second plate member) arranged symmetrically with respect to the center 131, similarly to the lighting device according to Patent Literature 1 (Japanese Patent Application Laid-Open No. 2020-202119) described above. In addition, the lighting device according to each of the above embodiments may further include, in addition to the two plate members, a third plate member that is not disposed at a position symmetrical to any of the two plate members with respect to the center 131. Furthermore, the lighting device according to each of the above embodiments may include a fourth plate member that is not disposed at a position symmetrical to any of the first plate member, the second plate member, and the third plate member with respect to the center 131. The upper portion (that is, the upper plate member facing the hemispherical inner surface 12h(u) of the upper casing 1h(u)) of at least one of the plurality of plate members may be any one of the upper plate members 2h(u) to 2eh(u) described above.

The contents described so far can be organized as follows. That is, in the lighting device according to each of the above embodiments, the upper portion of the plate member used as the light trap includes a plurality of thin plates. In the upper portion, the plurality of thin plates are disposed so as not to overlap each other such that each of the thin plates faces only any one of two or more regions A1 (a part of any one region A1), and thus ½ or more of diffused light is secured from an azimuth direction corresponding to each region A1. For example, "one curved plate having a double right-angled spherical triangular shape corresponding to the region A1" is divided into a plurality of thin plates in one or more planes parallel to the equator, and each of the plurality of thin plates is disposed so as to face any one of two or more regions A1, thereby forming the upper portion. Therefore, ½ or more of diffused light can be secured from the azimuth direction corresponding to each region A1 by the upper portion.

For example, the upper plate members 2h(u) and 2eh(u) are formed by arranging two thin plates obtained by dividing "one curved plate having a double right-angled spherical triangular shape corresponding to the region A1" into upper and lower two stages so that each of the two thin plates faces only one of the two regions A1. For example, the upper plate members 2ah(u) and 2ch(u) are formed by arranging three or more thin plates obtained by dividing "one curved plate having a double right-angled spherical triangular shape corresponding to the region A1" into three or more upper and lower stages so that each of the three or more thin plates faces only one of the two regions A1. As a result, the upper portion according to each of the above embodiments can efficiently block the entire hemispherical inner surface 12h(u) by a simple moving operation of rotating the upper portion about the axis 134, which is similar to the conventional light trap (curved plate having a double right-angled spherical triangular shape).

Here, in a case where the number of times of photographing (the number of cycles) until the entire inner surface 12 is blocked using the conventional "one curved plate having a double right-angled spherical triangular shape corresponding to the region A1" is a multiple of 2, the following relationship holds. That is, the number of cycles until the entire inner surface 12 is blocked using the upper portion in which "a plurality of thin plates obtained by dividing the "one curved plate having a double right-angled spherical triangular shape corresponding to the region A1" are arranged so that each of the thin plates faces only one of the two regions A1" is the same as the conventional number of cycles. In addition, similarly to the lighting device according to Patent Literature 1 described above, the lighting device according to each of the above embodiments may include a plurality of plate members (in particular, a plurality of upper portions). By including the plurality of upper portions, the lighting device according to each of the above-described embodiments can reduce the number of times of photographing (the number of cycles) until the entire hemispherical inner surface 12*h*(u) is blocked by the upper portion while preventing a decrease in diffusion.

When the number of times of photographing (the number of cycles) until the entire inner surface 12 is blocked using the conventional "one curved plate having a double right-angled spherical triangular shape corresponding to the region A1" is a multiple of 3, the upper portion in which "a plurality of thin plates obtained by dividing the "one curved plate having a double right-angled spherical triangular shape corresponding to the region A1" are arranged so that each of the thin plates faces only one of the three regions A1" may be used. By the upper portion including the plurality of thin plates arranged so as to face only any one of the three regions A1, ⅔ or more of the diffused light can be secured from the azimuth direction corresponding to each region A1. That is, in the lighting device according to each of the above embodiments, the upper portion of the plate member used as the light trap may be configured such that a plurality of thin plates obtained by dividing the "one curved plate having a double right-angled spherical triangular shape corresponding to the region A1" is arranged so as to face only any one of the "n" regions A1. By adopting such a configuration (arrangement), "(n−1)/n" or more of diffused light can be secured from the azimuth direction corresponding to each region A1 by the upper portion.

<4.5> Controller (Reduction in Amount of Data to Be Stored)

The lighting device according to each of the above embodiments may include a controller 100A as described below with reference to FIG. 8 instead of the controller 100. Note that a lighting device L1*f* according to the modification described below has components having the same function and function as the components of the lighting device L1 described with reference to FIG. 1 and the like. Such components are denoted by the same reference numerals as the corresponding components illustrated in FIG. 1 and the like, and detailed description thereof is omitted unless necessary.

Figure 8:
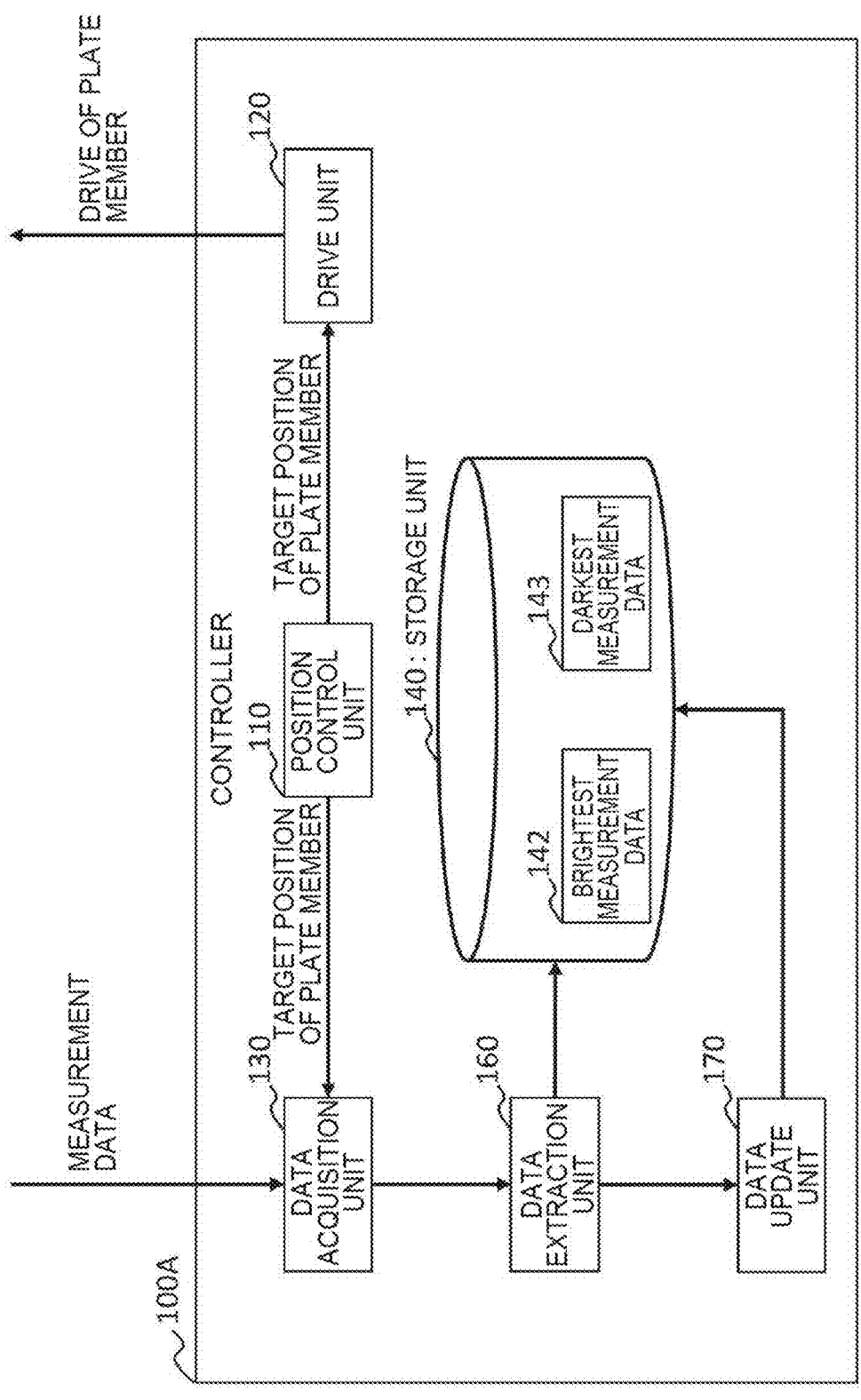
FIG. 8 is a diagram schematically illustrating an example of a software configuration of a controller according to a modification.

Similarly to the controller 100, the controller 100A is realized by a general-purpose or dedicated computer, and includes at least the following functional units illustrated in FIG. 8 as functional components realized by the CPU, the memory, and the like. That is, similarly to the controller 100, the controller 100A includes at least a position control unit 110, a drive unit 120, a data acquisition unit 130, and a storage unit 140, and further includes a data extraction unit 160 (extraction unit) and a data update unit 170 (storage unit).

FIG. 8 is a diagram schematically illustrating an example of a software configuration of the controller 100A included in the lighting device L1*f* according to the modification. The position control unit 110 included in the controller 100A controls the position (position around the axis 134) of the plate member (plate members 2 to 2*e*) in each cycle similarly to the position control unit 110 included in the controller 100. In order to facilitate understanding, an example in which the plate member is the "plate member 2" will be described below. Similarly to the drive unit 120 included in the controller 100, the drive unit 120 included in the controller 100A changes the position (position around the axis 134) of the plate member 2 in each cycle according to the target position in each cycle notified from the position control unit 110. The data acquisition unit 130 included in the controller 100A acquires measurement data in each cycle similarly to the data acquisition unit 130 included in the controller 100. The data acquisition unit 130 included in the controller 100A notifies the data extraction unit 160 of the acquired "measurement data in each cycle" together with the "position (target position) of the plate member 2 in each cycle" notified from the position control unit 110.

The storage unit 140 stores "darkest data (for example, data indicating one color of black)" as an initial value of the brightest measurement data 142 and "brightest data (for example, data indicating one white color)" as an initial value of the darkest measurement data 143 in advance. When notified of the "measurement data in a certain cycle C(x)" and the "position of the plate member 2 in the certain cycle C(x)" from the data acquisition unit 130, the data extraction unit 160 executes the following processing. That is, the data extraction unit 160 first refers to the storage unit 140 to acquire the brightest measurement data 142 and the darkest measurement data 143. Then, the data extraction unit 160 compares the "measurement data of a certain cycle C(x)" notified from the data acquisition unit 130 with each of the brightest measurement data 142 and the darkest measurement data 143. The data extraction unit 160 determines whether "measurement data of a certain cycle C(x)" is "brighter" than "the brightest measurement data 142". In addition, the data extraction unit 160 determines whether "measurement data of a certain cycle C(x)" is "darker" than "the darkest measurement data 143". For example, the data extraction unit 160 may perform the above-described determination using "brightness, luminance, light amount, and the like" of each of "measurement data of a certain cycle C(x)", "brightest measurement data 142", and "darkest measurement data 143".

When determining that the "measurement data of a certain cycle C(x)" is "brighter" than the "brightest measurement data 142", the data extraction unit 160 notifies the data update unit 170 of the determination result of the "measurement data of a certain cycle C(x)" and the "position of the plate member 2 in the certain cycle C(x)". When determining that the "measurement data of a certain cycle C(x)" is "darker" than the "darkest measurement data 143", the data extraction unit 160 notifies the data update unit 170 of the determination result of the "measurement data of a certain cycle C(x)" and the "position of the plate member 2 in a certain cycle C(x)".

The data update unit 170 updates at least one of the "brightest measurement data 142" and the "darkest measurement data 143" stored in the storage unit 140 according to the notification content from the data extraction unit 160.

That is, when acquiring the determination result that the "measurement data of a certain cycle C(x)" is brighter than the "brightest measurement data 142", the data update unit 170 updates the "brightest measurement data 142" stored in the storage unit 140 with the "measurement data of a certain cycle C(x)". When acquiring the determination result that the "measurement data of a certain cycle C(x)" is darker than the "darkest measurement data 143", the data update unit 170 updates the "darkest measurement data 143" stored in the storage unit 140 with the "measurement data of a certain cycle C(x)".

When the entire inner surface 12 (hemispherical inner surface 12h(u)) faces any one of the plurality of thin plates (thin plates 210) included in the upper portion (upper plate member 2h(u)) of the plate member 2 at least once, acquisition of measurement data necessary for colorimetry of the object S is completed. When the acquisition of the measurement data is completed, only the "brightest measurement data 142" and the "darkest measurement data 143" are stored in the storage unit 140. By analyzing the "brightest measurement data 142" and the "darkest measurement data 143", colorimetry of the object S can be executed.

As described above, the lighting device L If includes the data extraction unit 160 (extraction unit) and the data update unit 170 (storage unit). The data extraction unit 160 extracts measurement data in which the object S in the brightest state is observed and measurement data in which the object S in the darkest state is observed from the measurement data of each cycle. The measurement data of each cycle is measurement data indicating the object S observed at the light receiving port 14 (observation unit) while the plate member (plate members 2 to 2e) is moved around the axis 134. The data update unit 170 stores the "measurement data in which the object S in the brightest state is observed" and the "measurement data in which the object S in the darkest state is observed" extracted by the data extraction unit 160 as observation results of the object S.

In this configuration, the measurement data in which the brightest object S is observed and the measurement data in which the darkest object S is observed are extracted from the plurality of pieces of measurement data, and the two pieces of measurement data are stored as the observation result of the object S. Therefore, as compared with the case where all the plurality of pieces of measurement data are stored as the observation result of the object S, the amount of data to be stored can be reduced, and the amount of measurement data to be stored as the observation result of the object S can be kept constant. This is particularly effective in a case where the number of measurements is increased or measurement is performed at a high speed, and by adopting this configuration, for example, it is possible to easily measure an object in water while suppressing specular reflection of a wavy water surface.

For example, as described above, in the controller 100 that stores the measurement data in each cycle in the storage unit 140 in association with the position of the plate member 2 in each cycle, the following measurement data is stored in the storage unit 140 in order to execute colorimetry of the object S. That is, "measurement data in each cycle associated with position of plate member in each cycle" is stored in the storage unit 140 by the number of cycles required for "all of the inner surfaces 12 face any of the plurality of thin plates 210 at least once". Therefore, as the number of cycles required for "all of the inner surfaces 12 face any of the plurality of thin plates 210 at least once" increases, the capacity of data stored in the storage unit 140 becomes enormous.

Meanwhile, in the controller 100A, only the following data is stored in the storage unit 140 in order to execute the colorimetry of the object S regardless of the number of cycles required for "all of the inner surfaces 12 face any of the plurality of thin plates 210 at least once". That is, only the "brightest measurement data 142 (measurement data in which the object S in the brightest state is observed)" and the "darkest measurement data 143 (measurement data in which the object S in the darkest state is observed)" are stored in the storage unit 140.

(Correction by Pre-Measurement of Mock-Up)

The lighting device according to each of the above embodiments may include a controller 100B as described below with reference to FIG. 9 instead of the controller 100 or the controller 100A. Note that a lighting device L1g according to the modification described below has components having the same function and function as the components of the lighting device L1 described with reference to FIG. 1 and the like. Such components are denoted by the same reference numerals as the corresponding components illustrated in FIG. 1 and the like, and detailed description thereof is omitted unless necessary.

Figure 9:
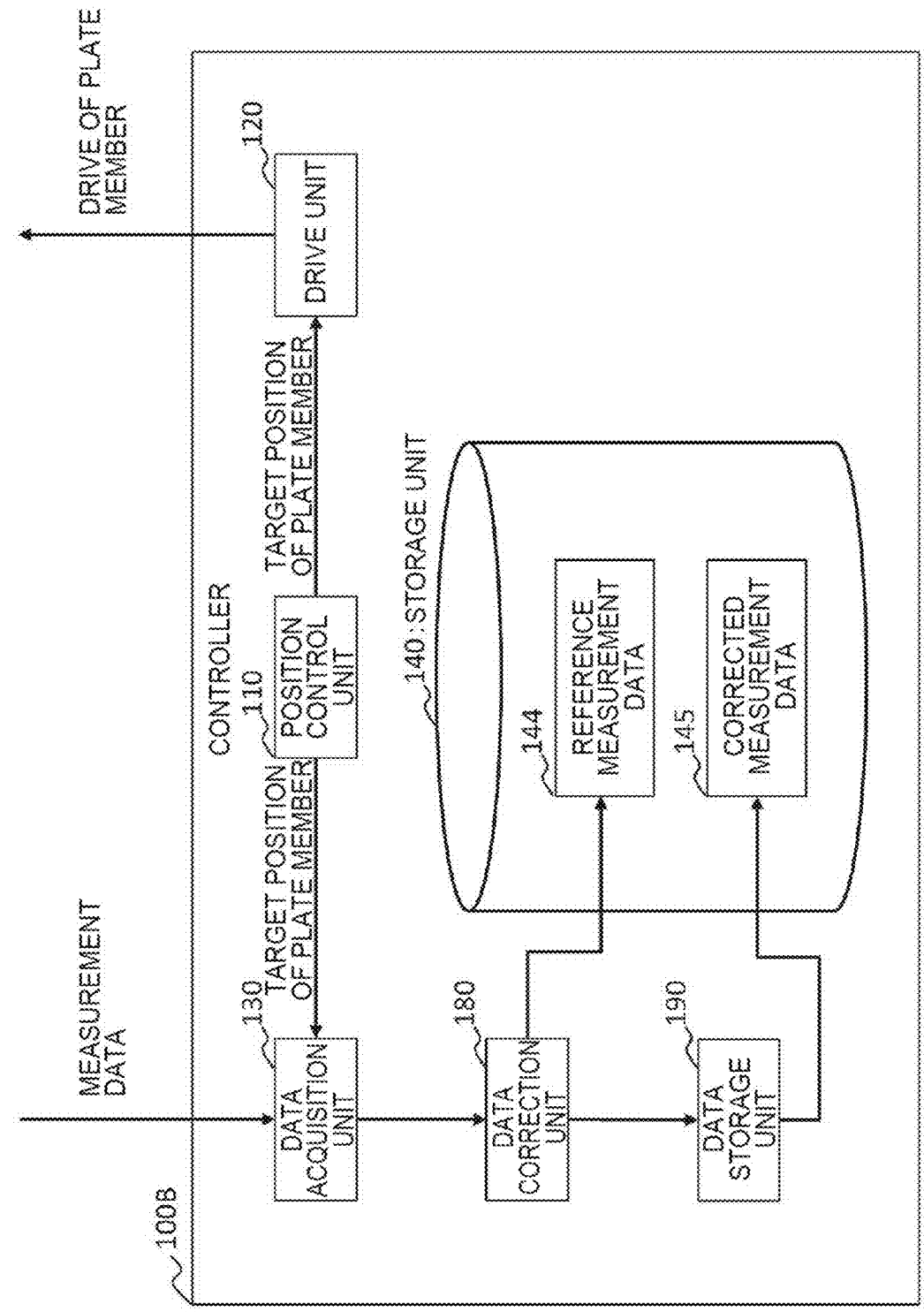
FIG. 9 is a diagram schematically illustrating an example of a software configuration of a controller according to a modification.

Similarly to the controller 100, the controller 100B is realized by a general-purpose or dedicated computer, and includes at least the following functional units illustrated in FIG. 9 as functional components realized by the CPU, the memory, and the like. That is, similarly to the controller 100, the controller 100B includes at least a position control unit 110, a drive unit 120, a data acquisition unit 130, and a storage unit 140, and further includes a data correction unit 180 (correction unit) and a data storage unit 190.

FIG. 9 is a diagram schematically illustrating an example of a software configuration of the controller 100B included in a lighting device L1g according to a modification. The position control unit 110 included in the controller 100B controls the position (position around the axis 134) of the plate member (plate members 2 to 2e) in each cycle similarly to the position control unit 110 included in the controller 100. In order to facilitate understanding, an example in which the plate member is the "plate member 2" will be described below. The drive unit 120 included in the controller 100B changes the position (position around the axis 134) of the plate member 2 in each cycle according to the target position in each cycle notified from the position control unit 110, similarly to the drive unit 120 included in the controller 100. The data acquisition unit 130 included in the controller 100B acquires measurement data in each cycle similarly to the data acquisition unit 130 included in the controller 100. The data acquisition unit 130 included in the controller 100B notifies the data correction unit 180 of the acquired "measurement data in each cycle" together with the "position (target position) of the plate member 2 in each cycle" notified from the position control unit 110.

When notified of the "measurement data of each cycle" and the "position of the plate member 2 in each cycle" from the data acquisition unit 130, the data correction unit 180 executes the following processing. That is, the data correction unit 180 first refers to the storage unit 140 and acquires the reference measurement data 144 stored in advance in the storage unit 140. The reference measurement data 144 is measurement data acquired in advance by observing a white diffusion object (mock-up) having a shape identical to the object S in the light receiving port 14 (observation unit). The reference measurement data 144 may be, for example, measurement data acquired in advance by observing the above-described mock-up in each cycle.

Then, the data correction unit 180 corrects the "measurement data of each cycle" notified from the data acquisition unit 130 using the reference measurement data 144. When the measurement data is luminance, the correction may be performed by an operation of "(corrected measurement data)={(measurement data of each cycle)/(reference measurement data 144)}×(white luminance)". For example, the data correction unit 180 may correct the "measurement data of a certain cycle C(x)" notified from the data acquisition unit 130 using the "reference measurement data 144 of a certain cycle C(x)". That is, the data correction unit 180 may correct the "measurement data acquired by observing the object S in a certain cycle C(x)" using "measurement data obtained by observing the above-described mock-up in a certain cycle C(x)". The data correction unit 180 notifies the data storage unit 190 of the corrected measurement data of each cycle together with the position of the plate member 2 in each cycle.

The data storage unit 190 stores the "measurement data after correction in each cycle" and the "position of the plate member 2 in each cycle" notified from the data correction unit 180 in the storage unit 140 as the "measurement data after correction 145". That is, the data storage unit 190 stores "corrected measurement data 145", which is "corrected measurement data of each cycle" associated with "position of the plate member 2 in each cycle", in the storage unit 140. By analyzing the "corrected measurement data 145", the colorimetry of the object S can precisely be performed.

As described above, the lighting device L1g includes the data correction unit 180 that corrects the measurement data acquired by observing the object S at the light receiving port 14 using the reference measurement data 144. The reference measurement data 144 is measurement data acquired in advance by observing a white diffusion object having a shape identical to the object S in the light receiving port 14 (observation unit). In this configuration, the measurement data acquired by observing the object S is corrected using the reference measurement data 144. Therefore, even when the shadow/shade occurs on the object S for some reason, it is possible to perform highly accurate measurement by performing correction using the reference measurement data 144 for the portion where the shadow/shade occurs.

<4.6> Relationship Between Casing and Plate Member

In the lighting device according to each of the above embodiments, the inner surface 12 of the casing 1 is made of a material that diffusely reflects light, and the second surface 22 of the plate member (plate members 2 to 2e) is made of a material that absorbs light. That is, in each of the above embodiments, the inner surface 12 of the casing 1 serves to diffuse and reflect light, and the second surface 22 of the plate member (plate members 2 to 2e) serves to trap light. However, the configuration of the lighting device according to each of the above embodiments is not limited to such an example.

For example, in the lighting device according to the modification, the casing 1 and the plate member (plate members 2 to 2e) may be integrated by forming a part of the inner surface 12 with a material that absorbs light. The light absorbing material is not particularly limited as long as it can absorb light, and may be, for example, a member painted black, a member made of a black material, or the like. As a specific example, the material that absorbs light may be, for example, carbon black, a non-reflective raised fabric, or the like. In this configuration, the casing 1 and the plate member (plate members 2 to 2e) are integrated by forming a part of the inner surface 12 with a light absorbing material. Therefore, the lighting device according to such a modification can be downsized as compared with a lighting device in which the casing 1 and the plate member (plate members 2 to 2e) are separate members, and can be installed in an environment with a limited space such as a production line of a factory, for example. When the casing 1 and the plate member (plate members 2 to 2e) are integrated, the casing 1 may be rotated about the axis 134 instead of rotating the plate member about the axis 134. That is, instead of controlling the position (position around the axis 134) of the plate member (plate members 2 to 2e), the rotation of the casing 1 around the axis 134 may be controlled.

<4.7> Light Source

Further, in each of the above embodiments, the light source 3 is attached to the support column 5. However, the arrangement of the light source 3 is not limited to such an example as long as the internal space 13 can be irradiated with light, and may be appropriately determined according to the embodiment.

In each of the above embodiments, an example in which the light source 3 and the plate member (plate members 2 to 2e) are separately provided has been described. However, it is not essential for the lighting device according to each of the above embodiments to separately provide the light source 3 and the plate member. For example, the light source 3 may be integrated with the plate member (plate members 2 to 2e) by disposing the light source 3 on the first surface 21 (surface facing the inner surface 12) of the plate member. By adopting such a configuration, downsizing can be realized as compared with a lighting device in which the light source 3 and the plate member (plate members 2 to 2e) are formed as separate members.

<4.8> Shape of Thin Plate

Figure 18:
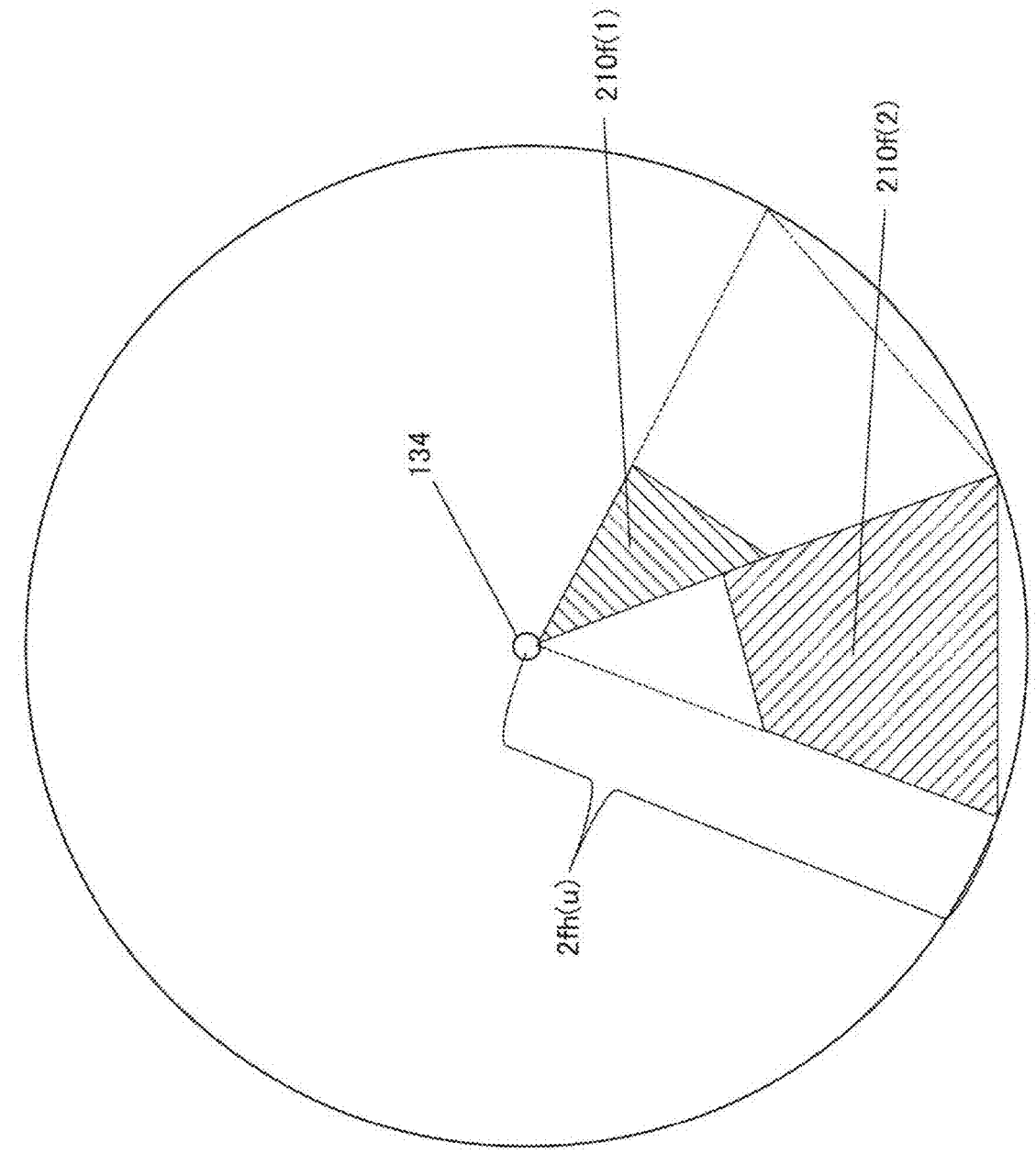
FIG. 18 is a view illustrating a configuration of an upper plate member according to still another modification.

FIG. 18 is a diagram illustrating a configuration of an upper plate member 2fh(u) according to a modification. In other words, FIG. 18 is a view schematically illustrating the relationship between the upper plate member 2fh(u) and the hemispherical inner surface 12h(u) as viewed from the center 131, and is a view for explaining how the plurality of thin plates 210 (in the example illustrated in FIG. 18, thin plate 210f(1) and thin plate 210f(2)) included in the upper plate member 2fh(u) are arranged in the upper plate member 2fh(u). The lighting device L1f (the entire image is not illustrated) is similar to the lighting device L1 except that an upper plate member 2fh(u) is provided instead of the upper plate member 2h(u).

For example, the plurality of thin plates (the thin plates 210a to 210e) included in the upper portions (the upper plate members 2ah(u) to 2eh(u)) of the plate members (the plate members 2a to 2e) described with reference to FIGS. 7A to 7E are formed as follows. That is, each of the thin plates 210a to 210e is formed by dividing one curved plate (for example, "one curved plate having a double right-angled spherical triangular shape corresponding to one region A1") having a double right-angled spherical triangular shape by a plane parallel to the equatorial plane. For example, the thin plate 210a(1), the thin plate 210a(2), the thin plate 210a(3), and the thin plate 210a(4) are formed by dividing the "one curved plate having a double right-angled spherical triangular shape corresponding to one region A1" into four in a plane parallel to the equatorial plane. Similarly, the thin plate 210b(1), the thin plate 210b(2), and the thin plate 210b(3) are formed by dividing the "one curved plate having a double right-angled spherical triangular shape corresponding to one region A1" into three in a plane parallel to the equatorial plane. That is, each of the thin plates 210a to 210e is formed by dividing the "one curved plate having a double right-angled spherical triangular shape corresponding to one region A1" into a plurality of portions on a plane parallel to the equatorial plane.

However, in the lighting device according to the present embodiment, it is not essential that the plurality of thin plates included in the upper portion (upper plate member) of the plate member is formed by dividing one curved plate having a double right-angled spherical triangular shape by a plane "parallel" to the equatorial plane. In the lighting device according to the present embodiment, the plurality of thin plates included in the upper portion of the plate member may be formed by dividing one curved plate having a double right-angled spherical triangular shape by a plane parallel or inclined to the equatorial plane. As described above, by rearranging at least one of the plurality of thin plates by moving the at least one thin plate at an angle smaller than 360 degrees around the axis, it is possible to form one curved plate having a double right-angled spherical triangular shape by all of the plurality of thin plates. Therefore, the plurality of thin plates may be formed by dividing one curved plate having a double right-angled spherical triangular shape by a plane parallel or inclined to the equatorial plane. Therefore, the lighting device according to one aspect of the present invention can easily prepare the plurality of thin plates that can be rearranged to form one curved plate having a double right-angled spherical triangular shape.

In the lighting device according to the present embodiment, the plurality of thin plates included in the upper portion of the plate member may be formed by dividing one curved plate having a double right-angled spherical triangular shape by a plane "inclined" with respect to the equatorial plane. For example, as illustrated in FIG. 18, the upper plate member 2$fh$(u) includes a plurality of thin plates 210*f*, and includes a thin plate 210*f*(1) and a thin plate 210*f*(2) in the example illustrated in FIG. 18. In the following description, when the plurality of thin plates 210*f* are collectively referred to without distinction, the term "thin plate 210*f*" is simply used. In distinguishing each of the plurality of thin plates 210*f*, "(1)", "(2)", . . . , "(n)", and the like are added to distinguish each.

The thin plate 210*f* included in the upper plate member 2$fh$(u) is similar to the thin plate 210 included in the upper plate member 2*h*(u) except that the thin plate 210*f* is formed by dividing one curved plate having a double right-angled spherical triangular shape by a plane "inclined" to the equatorial plane. For example, the surface (second surface 22*h*(u)) of the thin plate 210*f* facing the center 131 is made of a material that absorbs light, similarly to the second surface 22*h*(u) of the thin plate 210. As illustrated in FIG. 18, the thin plate 210*f*(1) and the thin plate 210*f*(2) included in the upper plate member 2$fh$(u) are arranged so as not to overlap each other in the upper plate member 2$fh$(u). In particular, as illustrated in FIG. 18, these two thin plates 210*f* are arranged so as not to overlap each other so as to face only one region A1 of the plurality of ("2" in the example illustrated in FIG. 18) regions A1 in the upper plate member 2$fh$(u). That is, the plurality of thin plates 210*f* included in the upper plate member 2$fh$(u) are arranged not to overlap each other so as to face only one region A1 of the plurality of regions A1 virtually provided on the hemispherical inner surface 12*h*(u) in the upper plate member 2$fh$(u).

By rearranging at least one thin plate 210*f* among plurality of thin plates 210*f* included in the upper plate member 2$fh$(u) by moving at an angle smaller than 360 degrees about the axis 134, one "curved plate having a double right-angled spherical triangular shape corresponding to the region A1" can be formed. In the example illustrated in FIG. 18, by moving the thin plate 210*f*(1) of the upper plate member 2$fh$(u) clockwise by 30 degrees around the axis 134, one curved plate having a double right-angled spherical triangular shape corresponding to the region A1 can be formed. In the upper plate member 2$fh$(u), the plurality of thin plates 210*f* may be connected to each other via a frame or the like. The thin plate 210*f*(1) and the thin plate 210*f*(2) are formed, for example, by dividing the "one curved plate having a double right-angled spherical triangular shape corresponding to one region A1" into two on a plane inclined to the equatorial plane.

As described with reference to FIG. 18, in the lighting device according to the present embodiment, the plurality of thin plates (thin plates 210*f*) included in the upper portion (upper plate member 2$fh$(u)) of the plate member may be formed by dividing one curved plate (for example, "one curved plate having a double right-angled spherical triangular shape corresponding to one region A1") having a double right-angled spherical triangular shape into an equatorial plane and an "inclined" plane.

<4.9> Arrangement Position of Thin Plate

Figure 19:
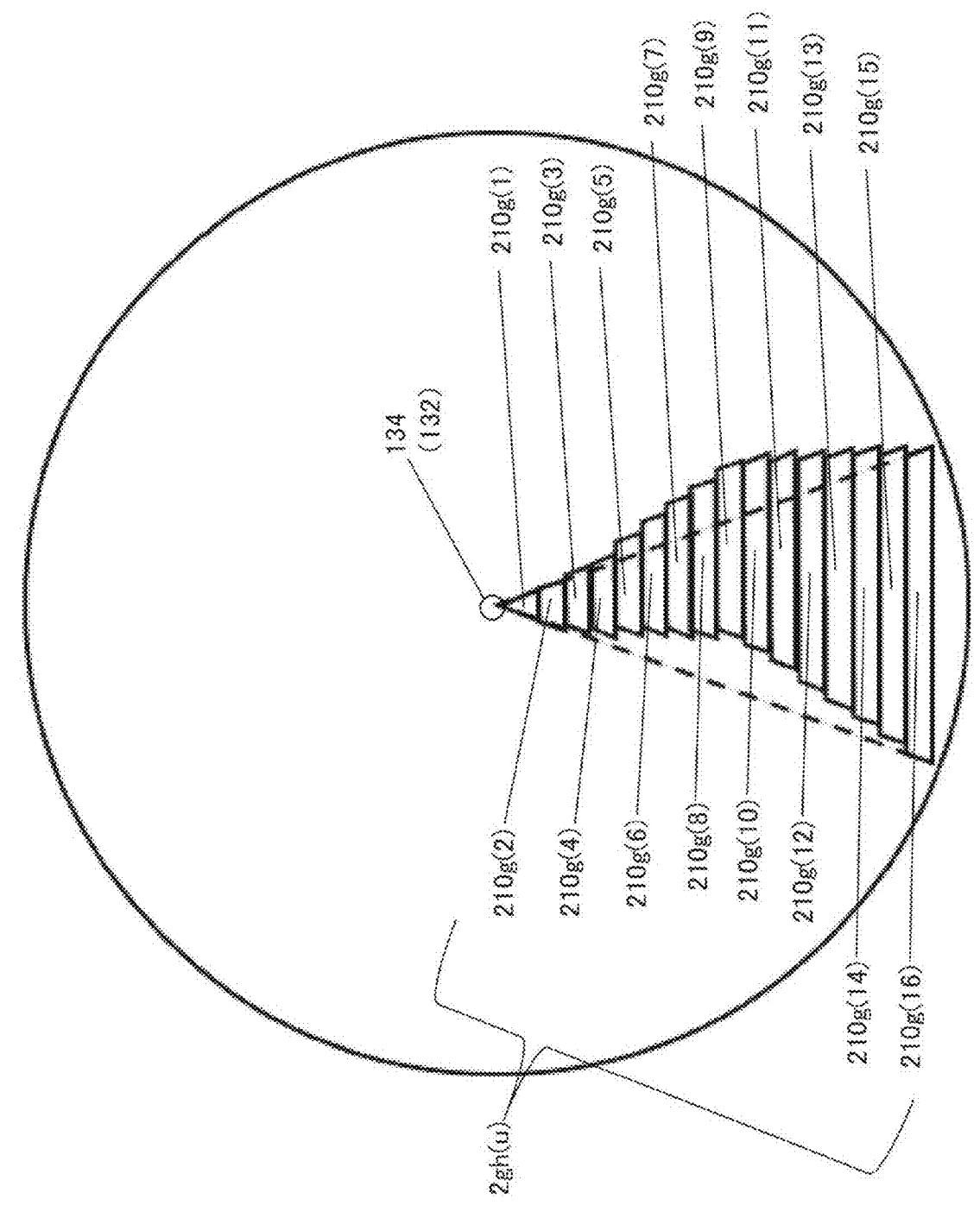
FIG. 19 is a view illustrating a configuration of an upper plate member according to another modification different from that illustrated in FIG. 18.

FIG. 19 is a diagram illustrating a configuration of an upper plate member 2*gh*(u) according to a modification. In other words, FIG. 19 is a view schematically illustrating the relationship between the upper plate member 2*gh*(u) and the hemispherical inner surface 12*h*(u) as viewed from the center 131, and is a view for explaining how the plurality of thin plates 210 (in the example illustrated in FIG. 19, thin plates 210*g*(1) to 210*g*(16)) included in the upper plate member 2*gh*(u) are arranged in the upper plate member 2*gh*(u). The lighting device L1*g* (the entire image is not illustrated) is similar to the lighting device L1 except that an upper plate member 2*gh*(u) is provided instead of the upper plate member 2*h*(u).

As illustrated in FIG. 19, the upper plate member 2*gh*(u) includes a plurality of thin plates 210*g*, and includes thin plates 210*g*(1) to 210*g*(16) in the example illustrated in FIG. 19. In the following description, when the plurality of thin plates 210*g* are collectively referred to without distinction, the term "thin plate 210*g*" is simply used. In distinguishing each of the plurality of thin plates 210*g*, "(1)", "(2)", . . . , "(n)", and the like are added to distinguish each.

Similarly to each of the thin plates 210*a* to 210*e*, the thin plate 210*g* included in the upper plate member 2*gh*(u) is formed by dividing one curved plate (for example, "one curved plate having a double right-angled spherical triangular shape corresponding to one region A1") having a double right-angled spherical triangular shape by a plane parallel to the equatorial plane. As illustrated in FIG. 19, the upper plate member 2*gh*(u) has a spherical isosceles triangle shape including "two sides of equal length to each other, extending in a curved manner from the zenith 132 to the equatorial plane in the spherical plane" as a whole. The thin plate 210*g* included in the upper plate member 2*gh*(u) is similar to the thin plate 210 included in the upper plate member 2*h*(u) except that the upper plate member 2*gh*(u) is arranged to have a spherical isosceles triangle shape including "two sides of equal length to each other, extending in a curved manner from the zenith 132 to the equatorial plane in the spherical plane". For example, the surface of the thin plate 210*g* facing the center 131 (second surface 22*h*(u)) is made of a material that absorbs light, similarly to the second surface 22*h*(u) of the thin plate 210.

As illustrated in FIG. 19, the thin plates 210*g*(1) to 210*g*(16) included in the upper plate member 2*gh*(u) are arranged so as not to overlap each other in the upper plate member 2*gh*(u). In particular, in the upper plate member 2gh(u) exemplified in FIG. 19, each of the thin plates 210g(1) to 210g(16) is disposed such that each of the meridians of the thin plates 210g(1) to 210g(16) has a "curved line extending from the zenith 132 to the equatorial plane in the spherical surface" shape as a whole. By arranging each of the thin plates 210g(1) to 210g(16) as described above, the upper plate member 2gh(u) has a spherical isosceles triangle shape including "two sides of equal length to each other, extending in a curved manner from the zenith 132 to the equatorial plane in the spherical plane".

Regarding the thin plates 210 and 210a to 210e described so far, each of the plurality of thin plates is arranged so as not to overlap each other so as to face only one region A1 in the plurality of regions A1. For example, the thin plate 210(1) and the thin plate 210(2) before the change in arrangement have been arranged so as not to overlap each other so as to face only one region A1 of the plurality of ("two" in the example illustrated in FIG. 4) regions A1. However, in the lighting device according to the present embodiment, it is not essential that the plurality of thin plates included in the upper portion (upper plate member) of the plate member are arranged so as not to overlap each other so as to face only one region A1 of the plurality of regions A1. As illustrated in FIG. 19, a certain thin plate 210g (for example, the thin plate 210g (10)) among the plurality of thin plates 210g may be disposed so as to straddle two adjacent regions A1 in the plurality of regions A1.

By rearranging some thin plates 210g among the plurality of thin plates 210g included in the upper plate member 2gh(u) by moving at an angle smaller than 360 degrees about the axis 134, one "curved plate having a double right-angled spherical triangular shape corresponding to the region A1" can be formed. In the upper plate member 2gh(u), the plurality of thin plates 210g may be connected to each other via a frame or the like.

As described with reference to FIG. 19, in the lighting device according to the present embodiment, the upper portion (upper plate member 2gh(u)) of the plate member may have a spherical isosceles triangle shape including "two sides of equal length to each other, extending in a curved manner from the zenith 132 to the equatorial plane in the spherical plane". In the lighting device according to the present embodiment, the plurality of thin plates included in the upper portion (upper plate member) of the plate member may be arranged so as not to overlap each other, and for example, may be arranged on the same spherical surface. In the lighting device according to the present embodiment, the shape of the upper portion formed by the plurality of thin plates is not particularly limited, and the arrangement of each of the plurality of thin plates can be appropriately determined according to the use form of the lighting device and the like.

Examples

The inventor of the present application verified, by the following experiment, how the light amount (illuminance) of the diffused light reaching the object S is improved by the lighting device according to the above embodiment as compared with the lighting device using the conventional "one curved plate having a double right-angled spherical triangular shape corresponding to the region A1" as the light trap.

Figure 10:
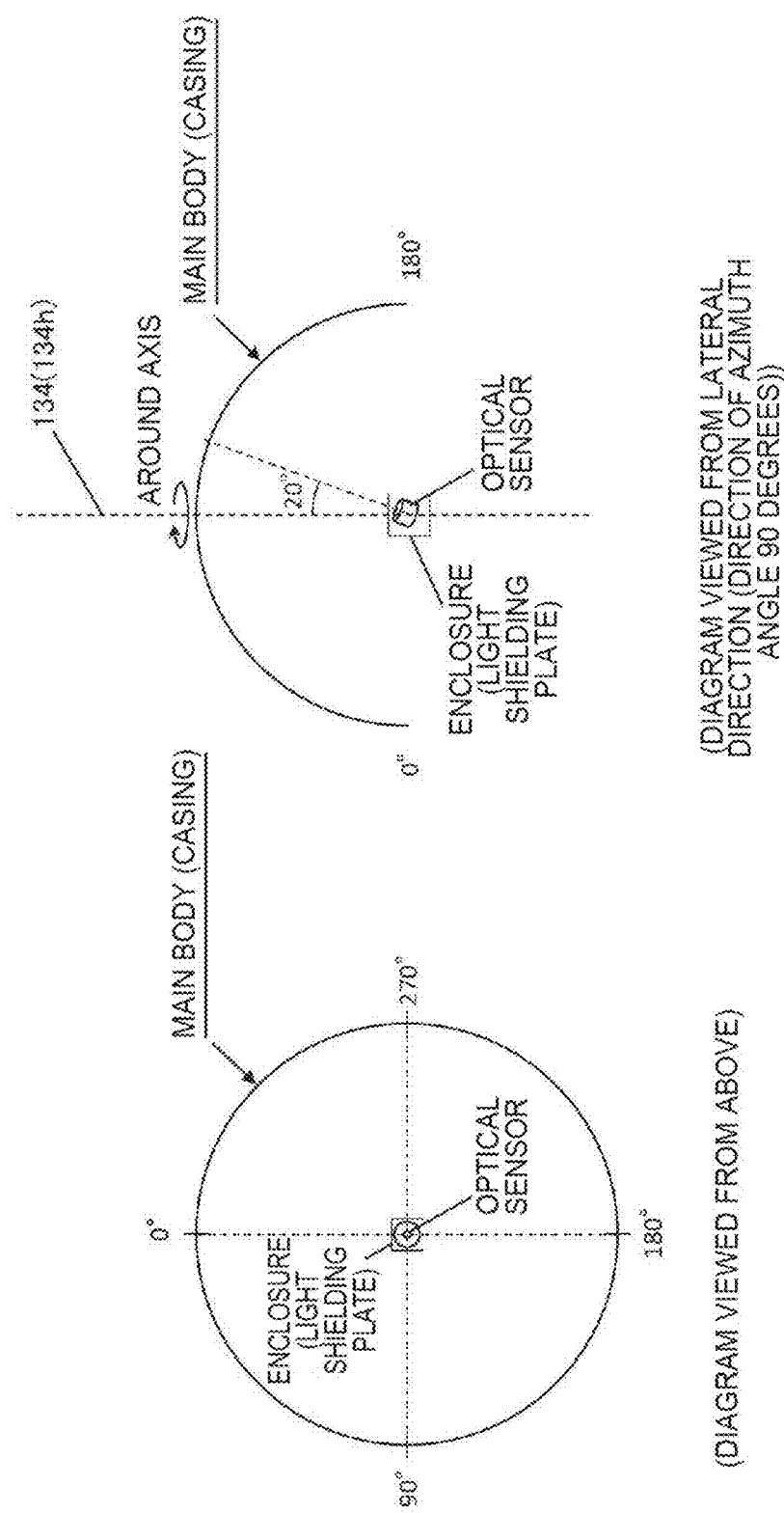
FIG. 10 is a diagram for explaining an outline of an experiment for verifying how much illuminance is improved by the lighting device according to the embodiment as compared with the conventional lighting device.

FIG. 10 is a diagram for describing an outline of an experiment. In the experiment, the illuminance in the vicinity of the center 131 was measured for a case where the upper plate member 2bh(u) described with reference to FIG. 7B was used as the light trap and a case where the conventional "one curved plate having a double right-angled spherical triangular shape corresponding to the region A1" was used as the light trap. Specifically, an optical sensor (illuminometer) was disposed in the vicinity of the center 131, and the illuminance in the vicinity of the center 131 was measured for the case of using "one curved plate having a double right-angled spherical triangular shape corresponding to the region A1" as the light trap and the case of using the upper plate member 2bh(u). In the experiment, as the "one curved plate having a double right-angled spherical triangular shape corresponding to the region A1", one curved plate having a double right-angled spherical triangular shape corresponding to (facing) the region A1 having an apex angle of "30" degrees was used. As the upper plate member 2bh(u), an upper plate member 2bh(u) having an apex angle of "90" degrees was used. That is, in the upper plate member 2bh(u) used in the experiment, each of the plurality of thin plates 210b included in the upper plate member 2bh(u) is disposed so as to face only any one of the three adjacent regions A1 (apex angles of three regions A1 are each "30" degrees).

In the following description, as illustrated on the left side of FIG. 10, the azimuth angle is "0" degrees on the upper side of the page, "90" degrees on the left side of FIG. 10, "180" degrees on the lower side of FIGS. 10, and "270" degrees on the right side of FIG. 10 when viewed from directly above the main body (casing) (from the zenith 132). In addition, on the right side of FIG. 10, the arrangement and the like of the optical sensor as viewed from the lateral direction (specifically, the direction of the azimuth angle "90" degrees) are illustrated.

In the experiment, as illustrated on the left side of FIG. 10, an optical sensor covered on 3 sides by a light shielding plate and opened in a direction of an azimuth angle of "180" degrees was disposed near the center 131 of the main body of the lighting device. Further, as illustrated on the right side of FIG. 10, the optical sensor was installed so as to be inclined by 20 degrees from the vertical direction in the direction of the azimuth angle of "180" degrees.

Then, with this optical sensor, the illuminance in the vicinity of the center 131 was measured for a case where the upper plate member 2bh(u) was used as the light trap and a case where the conventional "one curved plate having a double right-angled spherical triangular shape corresponding to the region A1" was used as the light trap.

Figure 11:
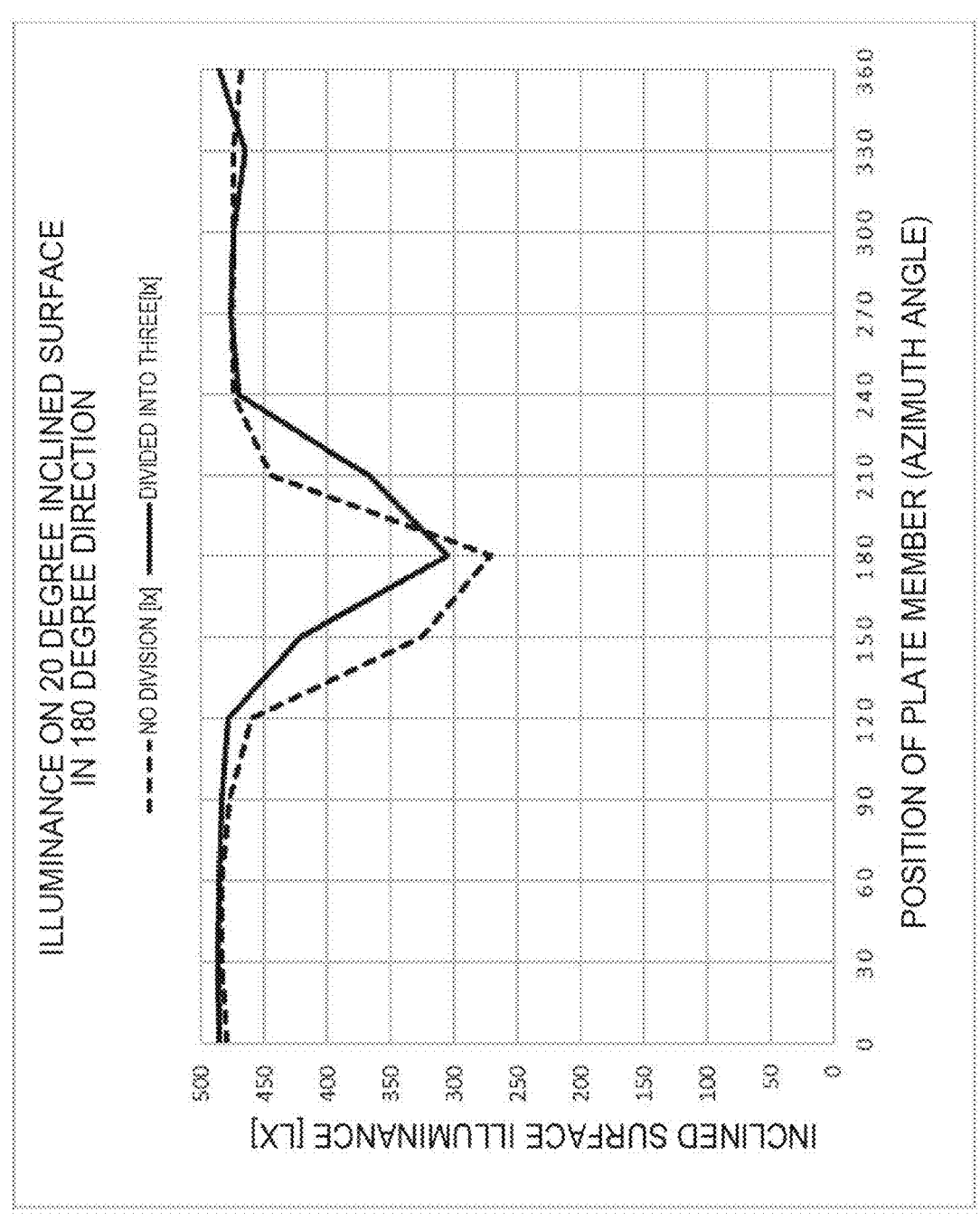
FIG. 11 is a diagram illustrating a result of an experiment outlined with reference to FIG. 10.

FIG. 11 is a diagram illustrating illuminance measured by the above-described optical sensor in a case where the upper plate member 2bh(u) is used as the light trap and in a case where the conventional "one curved plate having a double right-angled spherical triangular shape corresponding to the region A1" is used as the light trap. Note that what is indicated by a dotted line in FIG. 11 is illuminance measured in a case where the conventional "one curved plate having a double right-angled spherical triangular shape corresponding to the region A1" is used as the light trap. Further, what is indicated by a solid line is illuminance measured when the upper plate member 2bh(u) is used as the light trap.

In addition, in FIG. 11, the "azimuth angle (position)" of the "one curved plate having a double right-angled spherical triangular shape corresponding to the region A1" indicates the "azimuth angle (position)" of the center (line bisecting the apex angle ("30" degrees) of this curved plate) of latitude of this curved plate. The "azimuth angle (position)" of the upper plate member 2bh(u) indicates the "azimuth angle (position)" of the center (the line bisecting the apex angle ("90" degrees) of the upper plate member 2*bh*(u)) of the latitude of the upper plate member 2*bh*(u).

As illustrated in FIG. 11, in a case where "one curved plate having a double right-angled spherical triangular shape corresponding to the region A1" is used as the light trap, when the light trap is located near an azimuth angle "180" degrees, the illuminance decreases to "272 [1×]". Meanwhile, when the upper plate member 2*bh*(u) is used as the light trap, the change in illuminance is gentle, and the minimum illuminance is slightly improved. Specifically, when the light trap was located near an azimuth angle of "180" degrees, the illuminance was "305 [1×]".

Here, the decrease in illuminance due to the light trap can suppress the influence on the measurement value by performing brightness correction (illuminance correction) after the measurement. However, the smaller the decrease in illuminance, the smaller the correction amount. In addition, since the measurement error (noise) is also enlarged by performing the correction, it is desirable that the correction amount is small.

As illustrated in FIG. 11, the experiment has confirmed that when the upper plate member 2*bh*(u) is used as the light trap, a decrease in illuminance can be suppressed and a change in illuminance can be made gentle as compared with the case where "one curved plate having a double right-angled spherical triangular shape corresponding to the region A1" is used as the light trap. Therefore, in the lighting device according to the above embodiment, as compared with the lighting device using the conventional "one curved plate having a double right-angled spherical triangular shape corresponding to the region A1" as the light trap, the illuminance reduction can be reduced and the correction amount can be reduced, and as a result, the measurement error can be reduced. That is, the lighting device according to the above embodiment can realize highly accurate measurement while preventing a decrease in measurement accuracy.

Second Embodiment

Hereinafter, a lighting device L2 according to a second embodiment will be described with reference to FIGS. 12 and 13. Note that the lighting device L2 to be described below has components having common actions and functions with the components of the lighting devices L1 to L1*g* described above. Such components are denoted by the same reference numerals as the corresponding components illustrated in FIG. 1 and the like, and detailed description thereof is omitted unless necessary.

§ 1 Configuration Example

Figure 12:
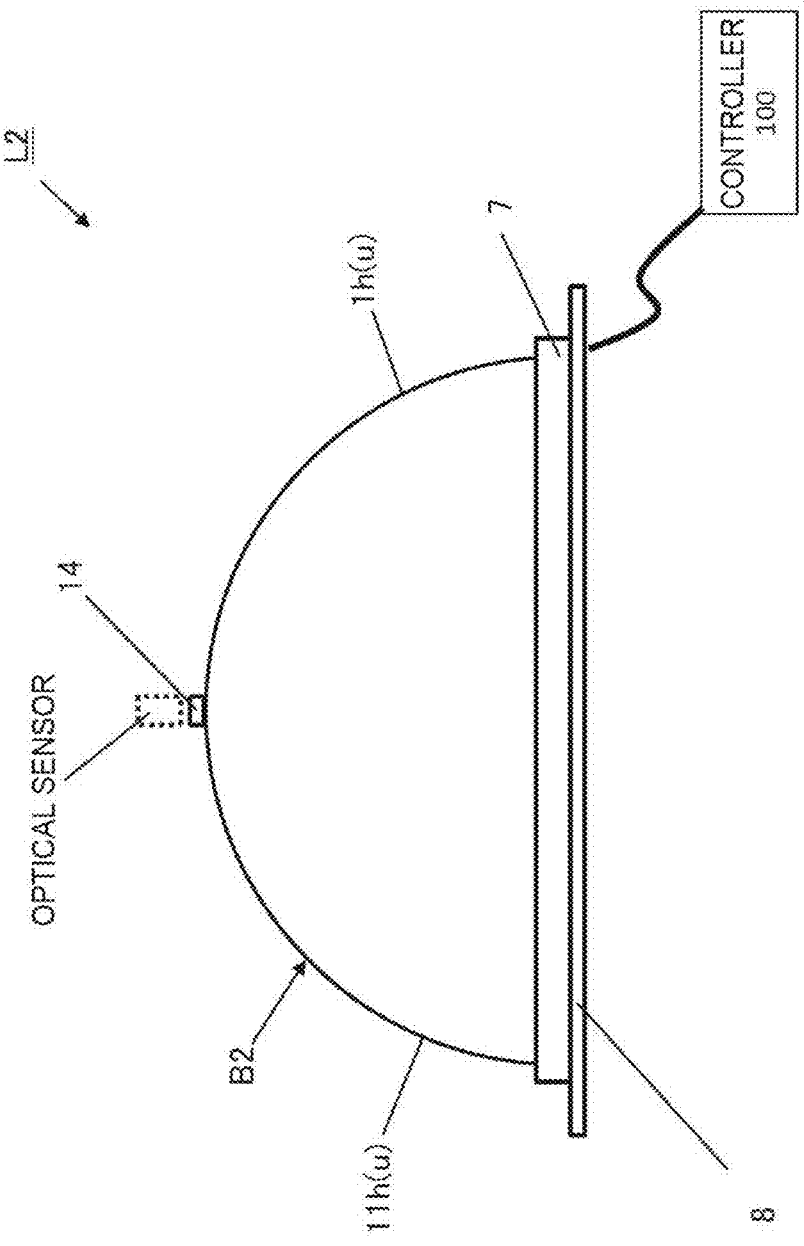
FIG. 12 is a side view schematically illustrating a lighting device according to a second embodiment.

FIG. 12 is a side view schematically illustrating an example of a configuration of the lighting device L2 according to the present embodiment. The lighting device L2 according to the present embodiment is used for colorimetry of the object S similarly to the lighting device L1 and the like described above. As illustrated in FIG. 12, the lighting device L2 includes a hemispherical main body B2 and a controller 100 communicably connected to the main body B2. FIG. 13 is a cross-sectional view schematically illustrating an example of the configuration of the main body B2. As illustrated in each drawing, the main body B2 includes a hemispherical upper casing 1*h*(u), a plate member 2X, a light source 3, a reflecting mirror 6, a frame member 7, and a support member 8.

(Casing)

Since the upper casing 1*h*(u) included in the lighting device L2 (in particular, the main body B2) is similar to the upper casing 1*h*(u) included in the lighting device L1 (in particular, the main body B1), details thereof will be omitted. Further, since the hemispherical internal space 13*h*(u) defined by the hemispherical inner surface 12*h*(u) of the upper casing 1*h*(u) included in the main body B2 is also similar to the hemispherical internal space 13*h*(u) defined by the upper casing 1*h*(u) included in the main body B1, details thereof will be omitted. As illustrated in FIGS. 12 and 13, the upper casing 1*h*(u) includes a light receiving port 14. The light receiving port 14 is provided to observe the object S arranged in the hemispherical internal space 13*h*(u). In other respects, the light receiving port 14 provided in the upper casing 1*h*(u) is similar to the light receiving port 14 provided in the casing 1 of the lighting device L1, and thus details thereof will be omitted.

(Light Source and Frame Member)

Figure 13:
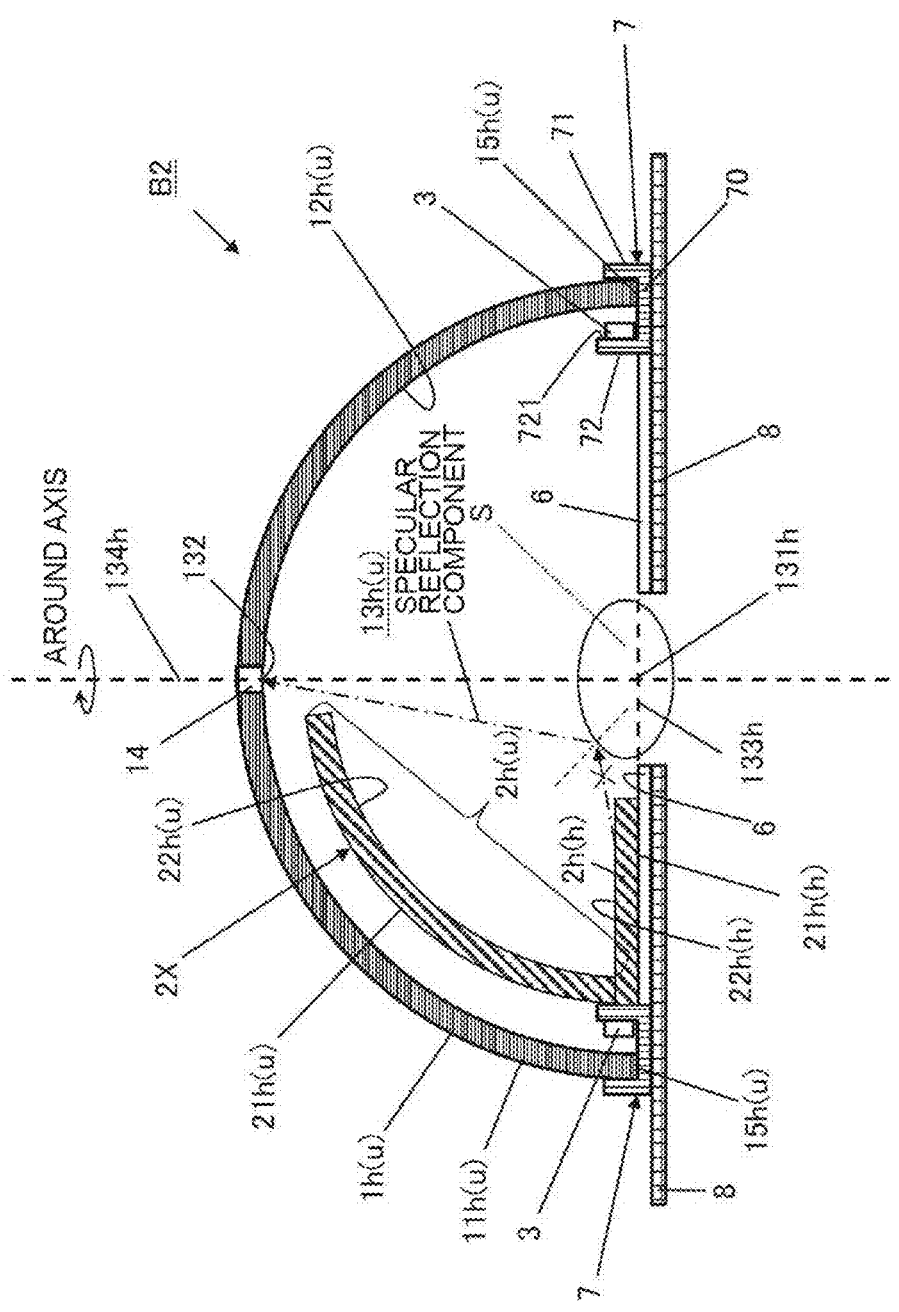
FIG. 13 is a cross-sectional view schematically illustrating a main body according to the second embodiment.

As illustrated in FIG. 13, the light source 3 is disposed so as to irradiate the hemispherical internal space 13*h*(u) with light. In the present embodiment, the light source 3 is attached to the frame member 7. The frame member 7 is formed in an annular shape and is configured to support an open end 15*h*(u) of the upper casing 1*h*(u). In the present embodiment, the frame member 7 includes a main body portion 70, an outer peripheral wall 71, and an inner peripheral wall 72. The main body portion 70 is formed in an annular shape. Since the outer peripheral wall 71 is provided on the outer peripheral side of the main body portion 70, it is disposed outside the upper casing 1*h*(u) (on the hemispherical outer surface 11*h*(u) side). Meanwhile, since the inner peripheral wall 72 is provided on the inner peripheral side of the main body portion 70, the inner peripheral wall is disposed away from the hemispherical inner surface 12*h*(u) of the upper casing 1*h*(u) toward the center 131 (131*h*). The outer peripheral wall 71 and the inner peripheral wall 72 are each formed in a cylindrical shape. The inner peripheral wall 72 has an outer peripheral surface 721 facing the hemispherical inner surface 12*h*(u) of the upper casing 1*h*(u). In the present embodiment, the light source 3 is disposed on the outer peripheral surface 721 of the inner peripheral wall 72 toward the hemispherical inner surface 12*h*(u) of the upper casing 1*h*(u).

The material of the frame member 7 is not particularly limited, and may be appropriately selected according to the embodiment. In the present embodiment, since the light source 3 is attached to the frame member 7, it is desirable to use a material having good thermal conductivity capable of effectively releasing the heat generated from the light source 3 for the frame member 7. From this viewpoint, for example, an aluminum material is desirably used for the frame member 7. In addition, the type and number of the light sources 3 are not particularly limited, and may be appropriately selected according to the embodiment. As the light source 3, for example, a light emitting diode (LED), a fluorescent tube, an organic electro-luminescence (EL), or the like may be used. The plurality of light sources 3 may be disposed on the cylindrical outer peripheral surface 721 at intervals (for example, at equal intervals) around the axis 134.

(Reflecting Mirror and Support Member)

The reflecting mirror 6 is disposed so as to close a part of the bottom surface 133*h* of the hemispherical internal space 13*h*(u). In the example of FIG. 13, the reflecting mirror 6 is formed in a rectangular shape larger than the open end 15*h*(u) of the upper casing 1*h*(u), and is configured to close the bottom surface 133*h* of the hemispherical internal space 13$h$(u) except for the periphery of the center 131$h$. In this case, when performing colorimetry, at least a portion of the object S to be colorimetrically measured is accommodated in the hemispherical internal space 13$h$(u) of the upper casing 1$h$(u). That is, in the example illustrated in FIG. 13, the reflecting mirror 6 is formed such that the hemispherical internal space 13$h$(u) communicates with the outside in the vicinity of the center 131$h$ by removing the portion in the vicinity of the center 131$h$. In this case, when carrying out the colorimetry, the object S is arranged at least partially outside the hemispherical internal space 13$h$(u), and the hemispherical internal space 13$h$(u) can be accessed from the communicating portion.

However, the shape and dimension of the reflecting mirror 6 are not limited to such an example, and may be appropriately determined according to the embodiment. The reflecting mirror 6 may be configured to completely close the bottom surface 133$h$ instead of partially closing the bottom surface 133$h$ of the hemispherical internal space 13$h$(u).

The reflecting mirror 6 has a surface (upper surface) facing the hemispherical internal space 13$h$(u), and this upper surface is configured to specularly reflect light. The material of the reflecting mirror 6 is not particularly limited, and may be appropriately selected according to the embodiment. A resin material on which aluminum is deposited, a stainless steel material, or the like may be used for the reflecting mirror 6. Accordingly, the upper surface of the reflecting mirror 6 may be formed of a surface on which aluminum is deposited, a stainless surface, or the like. Note that the reflecting mirror 6 may be divided into a plurality of portions.

The support member 8 is a member that supports the reflecting mirror 6 from the side of the bottom surface (the surface opposite to the upper surface of the reflecting mirror 6) of the reflecting mirror 6, and for example, supports the reflecting mirror 6 from below in contact with the bottom surface of the reflecting mirror 6. The material of the support member 8 is not particularly limited, and may be appropriately selected according to the embodiment. The support member 8 may be made of a material or a structure having a strength capable of supporting the reflecting mirror 6.

(Plate Member)

As illustrated in FIG. 13, the plate member 2X includes an upper plate member 2$h$(u) disposed in the hemispherical internal space 13$h$(u) and facing the hemispherical inner surface 12$h$(u) of the upper casing 1$h$(u), and a horizontal plate member 2$h$(h) facing at least a part of the upper surface of the reflecting mirror 6. The plate member 2X is arranged to face the hemispherical inner surface 12$h$(u) in the hemispherical internal space 13$h$(u). In particular, the plate member 2X is disposed in the hemispherical internal space 13$h$(u) such that the upper plate member 2$h$(u) faces the hemispherical inner surface 12$h$(u) and the horizontal plate member 2$h$(h) faces at least a part of the upper surface of the reflecting mirror 6.

In the plate member 2X, the horizontal plate member 2$h$(h) and the upper plate member 2$h$(u) are in contact with each other, and for example, a lowermost surface of the upper plate member 2$h$(u) and an upper surface of the horizontal plate member 2$h$(h) on the side closest to the hemispherical inner surface 12$h$(u) are in contact with each other. The lowermost surface of the upper plate member 2$h$(u) is a surface of the upper plate member 2$h$(u) closest to the equatorial plane and parallel to the equatorial plane, and in FIG. 13, the lowermost surface of the upper plate member 2$h$(u) is a surface of the upper plate member 2$h$(u) closest to the upper surface of the reflecting mirror 6 and parallel to the equatorial plane. For example, a length of an arc of the lowermost surface of the upper plate member 2$h$(u) is equal to a length of an arc of the outermost surface (surface closest to the hemispherical inner surface 12$h$(u) and parallel to the hemispherical inner surface 12$h$(u)) of the horizontal plate member 2$h$(h). In the plate member 2X, the upper plate member 2$h$(u) and the horizontal plate member 2$h$(h) are disposed such that the lowermost surface of the upper plate member 2$h$(u) and the upper surface of the horizontal plate member 2$h$(h) on the side closest to the hemispherical inner surface 12$h$(u) face each other. In the plate member 2X, the upper plate member 2$h$(u) and the horizontal plate member 2$h$(h) may be integrally formed, that is, they may be connected to each other. For example, by rotating the upper plate member 2$h$(u) about the axis 134, the horizontal plate member 2$h$(h) also rotates about the axis 134.

In the plate member 2X exemplified in FIG. 13, a "portion extending toward the zenith 132 along the hemispherical inner surface 12$h$(u) from a contact position between the horizontal plate member 2$h$(h) and the upper plate member 2$h$(u)" is the upper plate member 2$h$(u). That is, in the plate member 2X, a "portion which extends from a contact position between the horizontal plate member 2$h$(h) and the upper plate member 2$h$(u) toward a side where the light receiving port 14 is disposed with respect to the equatorial plane so as to face the hemispherical inner surface 12$h$(u)" is the upper plate member 2$h$(u). In the plate member 2X, a "portion extending toward center 131$h$ along the equatorial plane from contact position between horizontal plate member 2$h$(h) and upper plate member 2$h$(u)" is the horizontal plate member 2$h$(h). That is, in the plate member 2X, a "portion extending from a contact position between the horizontal plate member 2$h$(h) and the upper plate member 2$h$(u) toward the center 131$h$ along the upper surface of the reflecting mirror 6" is the horizontal plate member 2$h$(h).

In the following description, when the upper plate member 2$h$(u) and the horizontal plate member 2$h$(h) are collectively referred to without distinction, the term "plate member 2X" is simply used. The plate member 2X covers a part of the hemispherical inner surface 12$h$(u) when viewed from the center 131$h$, and is configured to be capable of adjusting the position around the axis 134$h$. In particular, the plate member 2X is configured such that the upper plate member 2$h$(u) covers a part of the hemispherical inner surface 12$h$(u) when viewed from the center 131$h$, and the horizontal plate member 2$h$(h) covers at least a part of the upper surface of the reflecting mirror 6. The plate member 2X includes a first surface 21$h$(u) facing the hemispherical inner surface 12$h$(u) and a second surface 22$h$(u) facing the center 131$h$. In particular, the plate member 2X includes the upper plate member 2$h$(u) including the first surface 21$h$(u) and the second surface 22$h$(u), and a horizontal plate member 2$h$(h) including the first surface 21$h$(h) facing the upper surface of the reflecting mirror 6 and the second surface 22$h$(h) facing the hemispherical internal space 13$h$(u). That is, in the upper plate member 2$h$(u), the first surface 21$h$(u) and the second surface 22$h$(u) face each other, and face opposite directions (opposite directions) to each other. In the horizontal plate member 2$h$(h), the first surface 21$h$(h) and the second surface 22$h$(h) face each other, and face opposite directions (opposite directions) to each other.

(Upper Plate Member)

The upper plate member 2$h$(u) included in the lighting device L2 (main body B2) is similar to the upper plate member 2$h$(u) included in the lighting device L1 (main body B1). That is, the upper plate member 2$h$(u) included in the main body B2 is configured to cover a part of the hemispherical inner surface $12h$(u) of the upper casing $1h$(u) as viewed from the center $131h$. The upper plate member $2h$(u) includes a plurality of thin plates $210$ each facing the hemispherical inner surface $12h$(u) of the upper casing $1h$(u) and arranged so as not to overlap each other. In particular, in the upper plate member $2h$(u), the plurality of thin plates $210$ are arranged so as not to overlap each other so as to face only one region A1 of the plurality of regions A1 virtually provided on the inner surface $12$ and having the same area. The second surface $22h$(u) (that is, the surface facing the center $131h$) of the thin plate $210$ is configured to absorb light. The configuration of the first surface $21h$(u) (that is, the surface facing the hemispherical inner surface $12h$(u)) of the thin plate $210$ is not particularly limited.

(Horizontal Plate Member)

As illustrated in FIG. 13, in the lighting device L2 (main body B2), the plate member 2X includes the horizontal plate member $2h$(h) (horizontal portion). The horizontal plate member $2h$(h) is a portion that covers a part of the upper surface (surface facing the hemispherical internal space $13h$(u)) of the reflecting mirror 6 and extends along the equatorial plane. As described above, the length of the arc of the lowermost surface of the upper plate member $2h$(u) (in particular, the thin plate $210(2)$) is equal to the length of the arc of the outermost surface of the horizontal plate member $2h$(h). The thin plate $210(2)$ and the horizontal plate member $2h$(h) are disposed such that the lowermost surface of the thin plate $210(2)$ and the upper surface of the horizontal plate member $2h$(h) closest to the hemispherical inner surface $12h$(u) face each other.

Here, in the present embodiment, the bottom surface $133h$ is virtually equally divided into a plurality of fan-shaped regions F1. For example, the bottom surface $133h$ is equally divided into the same number of regions F1 as the number of regions A1 obtained by virtually equally dividing the hemispherical inner surface $12h$(u), and is equally divided into 12 in the present embodiment. However, the number of divisions is not limited to such an example, and may be appropriately determined according to the embodiment.

The horizontal plate member $2h$(h) has a shape corresponding to at least a part of the upper surface of the reflecting mirror 6. For example, the horizontal plate member $2h$(h) is configured as a belt-shaped (substantially trapezoidal) plate member formed by removing a fan-shaped curved plate in a predetermined range from a central angle from a fan-shaped plate member corresponding to the region F1. However, it is not essential that the horizontal plate member $2h$(h) is configured as a belt-shaped plate member, and the horizontal plate member $2h$(h) may be a fan-shaped plate member corresponding to the entire region F1. The horizontal plate member $2h$(h) only needs to have a shape (area) capable of absorbing the "specular reflection component that reaches the object S from the upper surface of the reflecting mirror 6, is reflected by the object S, and reaches the light receiving port 14 (observation unit)" illustrated in FIG. 13. The shape of the horizontal plate member $2h$(h) may be appropriately selected according to the embodiment. The horizontal plate member $2h$(h) may be configured such that the distance to the center $131h$ of the horizontal plate member $2h$(h) extending toward the center $131h$ along the equatorial plane can be adjusted according to the shape and size of the object S.

The horizontal plate member $2h$(h) extends toward the center $131h$ along the equatorial plane on the upper side (side close to the center $131h$) of the reflecting mirror 6. Therefore, the first surface $21h$(h) of the horizontal plate member $2h$(h) faces the upper surface of the reflecting mirror 6, and faces the lower side in the example illustrated in FIG. 13. In addition, the second surface $22h$(h) (surface facing the first surface $21h$(h)) of the horizontal plate member $2h$(h) faces the hemispherical internal space $13h$(u), and faces the upper side in the example illustrated in FIG. 13.

The second surface $22h$(h) of the horizontal plate member $2h$(h) is made of a material that absorbs light. The light absorbing material is not particularly limited as long as it can absorb light, and may be, for example, a member painted black, a member made of a black material, or the like. As a specific example, the material that absorbs light may be, for example, carbon black, a non-reflective raised fabric, or the like. Meanwhile, the configuration of the first surface $21h$(h) of the horizontal plate member $2h$(h) is not particularly limited, and may be appropriately selected according to the embodiment. The first surface $21h$(h) of the horizontal plate member $2h$(h) may be made of a material that diffusely reflects light. Alternatively, the first surface $21h$(h) of the horizontal plate member $2h$(h) may be made of another material.

§ 2 Features

As described above with reference to FIGS. 12 and 13, the lighting device L2 includes the hemispherical upper casing $1h$(u), the plate member 2X, and the light source 3. The upper casing $1h$(u) has the hemispherical outer surface $11h$(u), the hemispherical inner surface $12h$(u), the hemispherical internal space $13h$(u), and the light receiving port 14 (observation unit). The hemispherical inner surface $12h$(u) defines the hemispherical internal space $13h$(u) and is made of a material that reflects light. The hemispherical internal space $13h$(u) has the center $131h$, the zenith $132$ (apex $132h$(u)), and the axis $134h$, and the axis $134h$ passes through the center $131h$ and the zenith $132$. The light receiving port 14 is provided for observing the object S arranged in the hemispherical internal space $13h$(u), and is arranged at a position corresponding to the zenith $132$ or a position spaced apart from the zenith $132$ in the circumferential direction along the hemispherical inner surface $12h$(u).

The light source 3 is disposed so as to irradiate the hemispherical internal space $13h$(u) with light. (At least a part of) the plate member 2X is disposed opposite to the hemispherical inner surface $12h$(u) in the hemispherical internal space $13h$(u). That is, the plate member 2X is disposed in the hemispherical internal space $13h$(u), and the upper portion (upper plate member $2h$(u)) of the plate member 2X faces the hemispherical inner surface $12h$(u). (At least a part of) the plate member 2X covers a part of the hemispherical inner surface $12h$(u) as viewed from the center $131h$. That is, the upper portion (upper plate member $2h$(u)) of the plate member 2X covers a part of the hemispherical inner surface $12h$(u) when viewed from the center $131h$. The plate member 2X is configured to be adjustable in position around the axis $134h$, and includes the first surface $21h$(u) and the second surface $22h$(u). The first surface $21h$(u) of the upper portion (upper plate member $2h$(u)) of the plate member 2X faces the hemispherical inner surface $12h$(u), and the second surface $22h$(u) of the upper portion faces the center $131h$.

The upper plate member $2h$(u) (upper portion), which is a portion of the plate member 2X on the side where the light receiving port 14 is disposed with respect to the equatorial plane, includes the plurality of thin plates $210$ disposed so as not to overlap each other. The plurality of thin plates 210 are configured such that the second surface 22$h$(u) absorbs light.

At least one thin plate 210 among the plurality of thin plates 210 arranged so as not to overlap each other on the upper plate member 2$h$(u) is moved around the axis 134 at an angle smaller than 360 degrees and rearranged, whereby one "curved plate having a double right-angled spherical triangular shape corresponding to the region A1" can be formed by all of the plurality of thin plates 210.

In this configuration, the plurality of thin plates 210 are configured such that the second surface 22$h$(u) absorbs light, and are arranged so as not to overlap each other in the upper plate member 2$h$(u). At least one thin plate 210 among the plurality of thin plates 210 is rearranged by being moved at an angle smaller than 360 degrees about the axis 134$h$, whereby one "curved plate having a double right-angled spherical triangular shape corresponding to the region A1" can be formed by all of the plurality of thin plates 210. That is, the area of each of the plurality of thin plates 210 included in the upper plate member 2$h$(u) and configured such that the second surface 22$h$(u) absorbs light is smaller than the area of the "curved plate having a double right-angled spherical triangular shape corresponding to the region A1". In addition, when the upper plate members 2$h$(u) and the "curved plate having a double right-angled spherical triangular shape corresponding to the region A1" are arranged such that one side (for example, the lower side) of each thereof overlaps with each other, the area of the overlapping portion of both is smaller than the area of the "curved plate having a double right-angled spherical triangular shape corresponding to the region A1".

Therefore, in the upper plate member 2$h$(u), diffused light from the azimuth angle corresponding to the "curved plate having a double right-angled spherical triangular shape corresponding to the region A1" easily reaches the object S, and shadow/shade is less likely to occur in the object S, as compared with the conventional light trap configured to absorb light on the entire second surface (surface facing the center 131 $h$) of the "curved plate having a double right-angled spherical triangular shape corresponding to the region A1". Therefore, the lighting device L2 can realize highly accurate measurement while preventing a decrease in measurement accuracy due to generation of shadow/shade.

In the upper plate member 2$h$(u), the plurality of thin plates 210 may be connected to each other via a frame or the like. In addition, in the upper plate member 2$h$(u), the plurality of thin plates 210 may be connected to each other via a "white plate in which the first surface and the second surface are configured to reflect light" or may be connected to each other via a "transparent plate that transmits light".

The lighting device L2 includes the reflecting mirror 6 whose "surface (upper surface) facing the hemispherical internal space 13$h$(u) is configured to specularly reflect light and which is arranged to block a part of a bottom surface 133$h$ of the hemispherical internal space 13$h$(u)". In the lighting device L2, the plate member 2X further includes a horizontal plate member 2$h$(h) in addition to the upper plate member 2$h$(u). The horizontal plate member 2$h$(h) is a portion which is configured such that the second surface 22$h$(h) (that is, the surface facing the hemispherical internal space 13$h$(u)) absorbs light, covers a part of a surface of the reflecting mirror 6 facing the hemispherical internal space 13$h$(u), and extends along the equatorial plane.

In this configuration, the horizontal plate member 2$h$(h) extends along the equatorial plane so as to cover a part of the surface of the reflecting mirror 6 facing the hemispherical internal space 13$h$(u), and the second surface 22$h$(h) of the horizontal plate member 2$h$(h) is configured to absorb light. Therefore, as illustrated in FIG. 13, the specular reflection component can be removed by the second surface 22$h$(h) of the horizontal plate member 2$h$(h), for example, even when the object S has a convex shape. Therefore, the lighting device L2 can realize highly accurate measurement while preventing a decrease in measurement accuracy due to the residual specular reflection component.

As is clear from the above description, in the case of focusing only on the viewpoint of suppressing the occurrence of shadow/shade in order to prevent the decrease in measurement accuracy, it is not essential that the lighting device L2 according to the present embodiment includes the horizontal plate member 2$h$(h) as the light trap (plate member 2X). That is, in order to suppress the generation of the shadow/shade, the lighting device L2 may include the upper plate member 2$h$(u) as the light trap (plate member 2X). Since the lighting device L2 includes the upper plate member 2$h$(u) as the light trap (plate member 2X), it is possible to suppress the occurrence of shadow/shade, to prevent a decrease in measurement accuracy due to the occurrence of shadow/shade, and to realize highly accurate measurement. In addition, since the lighting device L2 includes the horizontal plate member 2$h$(h) as the light trap (plate member 2X) in addition to the upper plate member 2$h$(u), it is possible to further prevent a decrease in measurement accuracy due to the residual specular reflection component and realize highly accurate measurement.

§ 3 Modifications

<3.1> Configuration of Observation Unit

The configuration of the observation unit included in the lighting device according to the second embodiment may be appropriately selected according to the embodiment as described in <4.1> of the first embodiment, and for example, the observation unit may be configured by the optical sensor itself.

<3.2> Shape of Upper Portion of Plate Member

The lighting device according to the second embodiment may include any one of the upper plate members 2$ah$(u) to 2$dh$(u) instead of the upper plate member 2$h$(u) as described in <4.2> of the first embodiment. In addition, the lighting device according to the second embodiment may include an upper plate member 2$fh$(u) or an upper plate member 2$gh$(u) instead of the upper plate member 2$h$(u). By including any one of the upper plate members 2$ah$(u) to 2$gh$(u) instead of the upper plate member 2$h$(u), the lighting device according to the second embodiment can secure twice or more the amount of diffused light reaching the object S from the azimuth angle corresponding to the "curved plate having a double right-angled spherical triangular shape corresponding to the region A1" as compared with the conventional light trap configured to absorb light on the entire second surface (surface facing the center 131) of the "curved plate having a double right-angled spherical triangular shape corresponding to the region A1".

<3.3> Necessity of Contact between Thin Plates

As described in <4.3> of the first embodiment, the lighting device according to the second embodiment may include an upper plate member 2$eh$(u) including a plurality of thin plates (thin plates 210$e$) that are not in contact with each other instead of the upper plate member 2$h$(u) or together with the upper plate member 2$h$(u).

<3.4> Number of Plate Members

The lighting device according to the second embodiment may include a plurality of plate members 2X as described in <4.4> of the first embodiment. At least one of the plurality of plate members 2X may include any one of the upper plate members 2h(u) to 2dh(u).

<3.5> Controller

The lighting device according to the second embodiment may include a controller 100A or a controller 100B instead of the controller 100 as described in <4.5> of the first embodiment.

<3.6> Relationship between Casing and Plate Member

In the lighting device according to the second embodiment, as described in <4.6> of the first embodiment, the upper casing 1h(u) and the plate member 2X may be integrated by configuring a part of the hemispherical inner surface 12h(u) with a light absorbing material.

<3.7> Frame Member

In the above embodiment, the lighting device L2 includes the frame member 7. However, the configuration of the lighting device according to the second embodiment is not limited to such an example. The frame member 7 may be omitted. The shape of the frame member 7 is not limited to the above example as long as the upper casing 1h(u) can be supported, and may be appropriately determined according to the embodiment.

<3.8> Light Source

In the above embodiment, the light source 3 is disposed on the outer peripheral surface 421 of the inner peripheral wall 42 of the frame member 7 toward the inner surface 12 of the upper casing 1h(u). However, the arrangement of the light sources 3 is not limited to such an example as long as the hemispherical internal space 13h(u) can be irradiated with light, and may be appropriately determined according to the embodiment.

In the above embodiment, the example in which the light source 3 and the plate member 2X are separately provided has been described, but it is not essential for the lighting device according to the second embodiment to separately provide the light source 3 and the plate member 2X. For example, the light source 3 may be integrated with the plate member by disposing the light source 3 on the first surface 21 (in particular, the first surface 21h(u) of the upper plate member 2h(u)) of the plate member 2X. By adopting such a configuration, downsizing can be realized as compared with a lighting device in which the light source 3 and the plate member 2Y are separate members.

<3.9> Shape of Thin Plate

The lighting device according to the second embodiment may include an upper portion (upper plate member) of the plate member including the "a plurality of thin plates formed by dividing one curved plate having a double right-angled spherical triangular shape by a plane parallel or inclined to an equatorial plane" as described in <4.8> of the first embodiment. As described above, by rearranging at least one of the plurality of thin plates by moving the at least one thin plate at an angle smaller than 360 degrees around the axis, it is possible to form one curved plate having a double right-angled spherical triangular shape by all of the plurality of thin plates. Therefore, the plurality of thin plates may be formed by dividing one curved plate having a double right-angled spherical triangular shape by a plane parallel or inclined to the equatorial plane. Therefore, the lighting device according to one aspect of the present invention can easily prepare the plurality of thin plates that can be rearranged to form one curved plate having a double right-angled spherical triangular shape.

<3.10> Arrangement Position of Thin Plate

As described in <4.9> of the first embodiment, the lighting device according to the second embodiment may include the upper plate member (for example, the upper plate member 2gh(u)) having a spherical isosceles triangular shape including "two sides of equal length to each other, extending in a curved manner from the zenith 132 to the equatorial plane in the spherical plane". In the lighting device according to the present embodiment, the plurality of thin plates included in the upper portion (upper plate member) of the plate member may be arranged so as not to overlap each other, and for example, may be arranged on the same spherical surface. In the lighting device according to the present embodiment, the shape of the upper portion formed by the plurality of thin plates is not particularly limited, and the arrangement of each of the plurality of thin plates can be appropriately determined according to the use form of the lighting device and the like.

Third Embodiment

Hereinafter, a lighting device L3 according to a third embodiment will be described with reference to FIGS. 14 to 16. Note that the lighting device L3 described below has components having the same function and function as the components of the lighting device according to each of the above embodiments. Such components are denoted by the same reference numerals as the corresponding components illustrated in FIG. 1 and the like, and detailed description thereof is omitted unless necessary.

§ 1 Configuration Example

Figure 14:
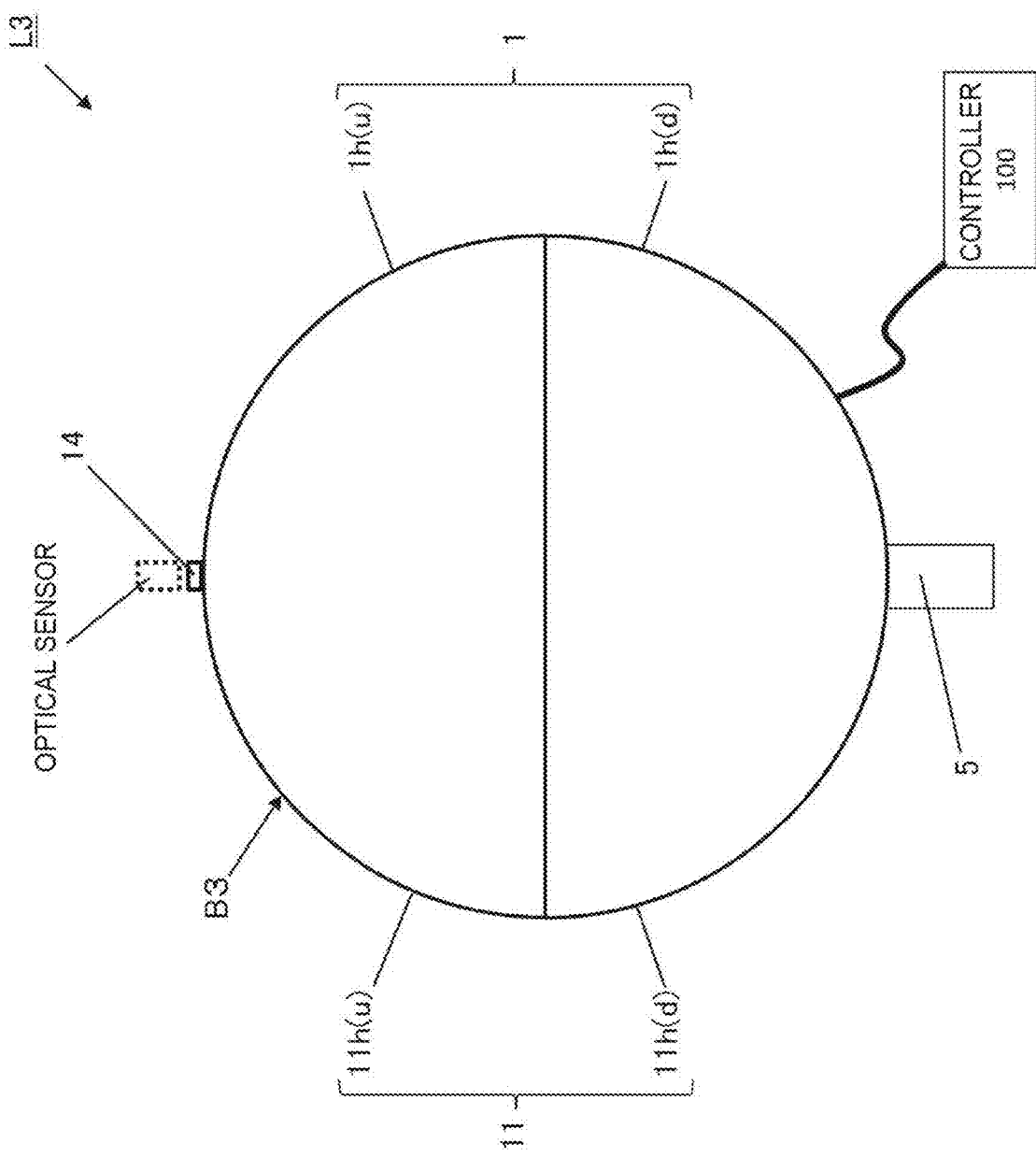
FIG. 14 is a side view schematically illustrating an example of a configuration of a lighting device according to a third embodiment.

FIG. 14 is a side view schematically illustrating an example of the configuration of the lighting device L3. The lighting device L3 is used for colorimetry of the object S. As illustrated in FIG. 14, the lighting device L3 includes a spherical main body B3, a support column 5, and a controller 100 communicably connected to the main body B3. Since the controller 100 included in the lighting device L3 is similar to the controller 100 included in the lighting device L1, details thereof will be omitted. In addition, since the support column 5 included in the lighting device L3 is similar to the support column 5 included in the lighting device L1, details thereof will be omitted. FIG. 15 is a cross-sectional view schematically illustrating an example of the configuration of the main body B3. As illustrated in each drawing, the main body B3 includes a casing 1, a plate member 2Y, a light source 3, and a sample stage 4.

The casing 1, the light source 3, and the sample stage 4 included in the main body B3 are similar to the casing 1, the light source 3, and the sample stage 4 included in the main body B1, respectively, and thus details thereof are omitted.

(Plate Member)

The plate member 2Y is different from the plate member 2 in including an upper plate member 2yh(u) in place of the upper plate member 2h(u), but is the same as the plate member 2 in other points. That is, the plate member 2Y is disposed facing the inner surface 12 in the internal space 13. In particular, as illustrated in FIG. 15, in the lighting device L3 (main body B3), the plate member 2Y includes the upper plate member 2yh(u) facing the hemispherical inner surface 12h(u) of the upper casing 1h(u), and a lower plate member 2h(d) facing the hemispherical inner surface 12h(d) of the lower casing 1h(d).

Figure 15:
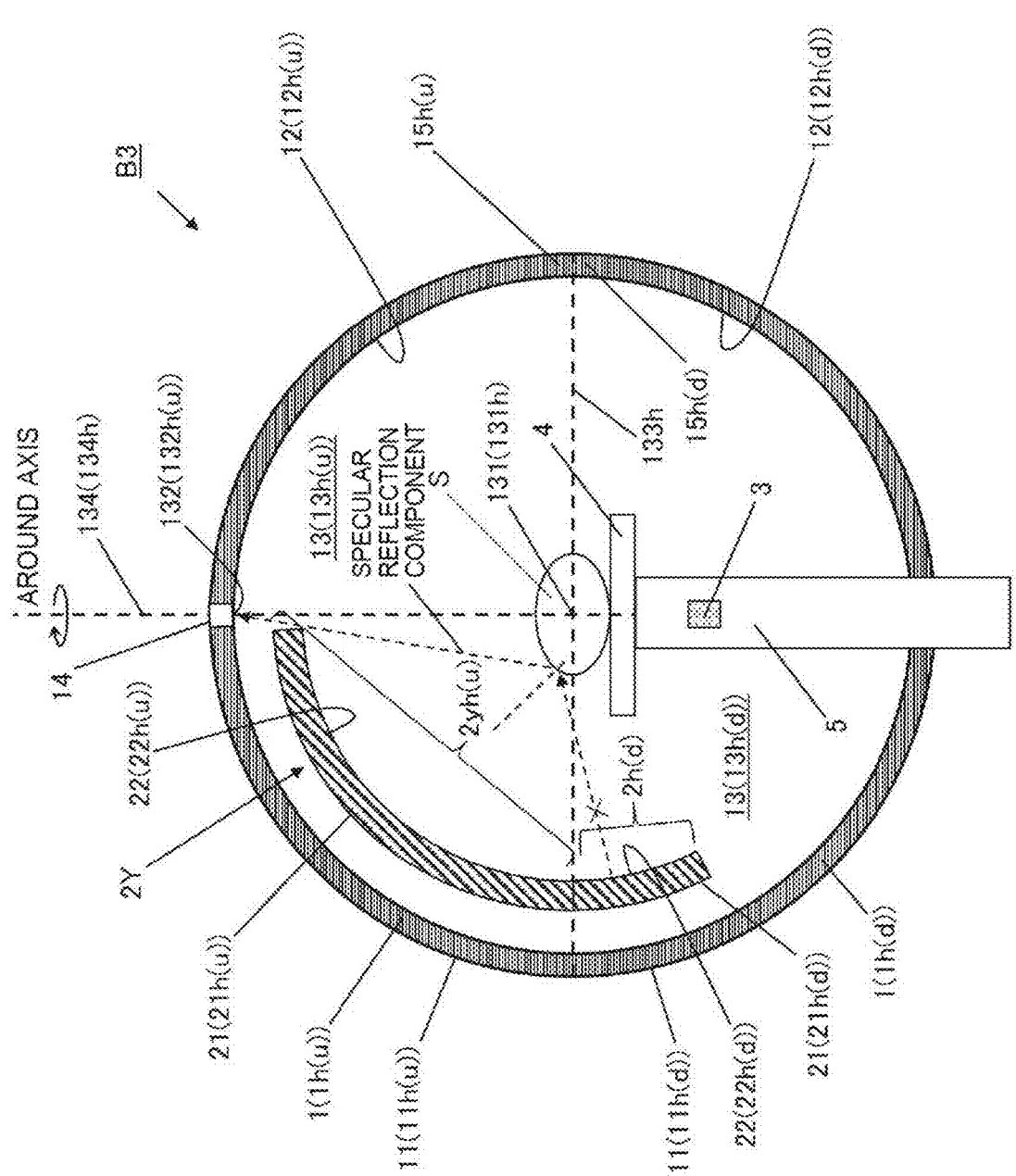
FIG. 15 is a cross-sectional view schematically illustrating an example of a configuration of a main body according to the third embodiment.

In the plate member 2Y exemplified in FIG. 15, the upper plate member 2yh(u) and the lower plate member 2h(d) are in contact with each other in the equatorial plane. That is, in the plate member 2Y, a portion extending from the equatorial plane to the side where the light receiving port 14 is disposed with respect to the equatorial plane is the upper plate member $2yh$(u), and a portion extending from the equatorial plane to the side opposite to the side where the light receiving port 14 is disposed with respect to the equatorial plane is the lower plate member $2h$(d). For example, the upper plate member $2yh$(u) and the lower plate member $2h$(d) have the same length in contact with the equatorial plane (the length of the arc on the equatorial plane), and are disposed such that a surface of the upper plate member $2yh$(u) in contact with the equatorial plane and a surface of the lower plate member $2h$(d) in contact with the equatorial plane face each other. In the plate member 2Y, the upper plate member $2yh$(u) and the lower plate member $2h$(d) may be integrally formed, that is, they may be connected to each other. For example, by rotating the upper plate member $2yh$(u) about the axis 134, the lower plate member $2h$(d) also rotates about the axis 134.

In the following description, when the upper plate member $2yh$(u) and the lower plate member $2h$(d) are collectively referred to without distinction, the term "plate member 2Y" is simply used. The plate member 2Y covers a part of the inner surface 12 when viewed from the center 131, and is configured to be adjustable in position around the axis 134. The plate member 2Y includes a first surface 21 facing the inner surface 12 and a second surface 22 facing the center 131. Hereinafter, first, the upper plate member $2yh$(u) will be described with reference to FIG. 16.

(Upper Plate Member)

Figure 16:
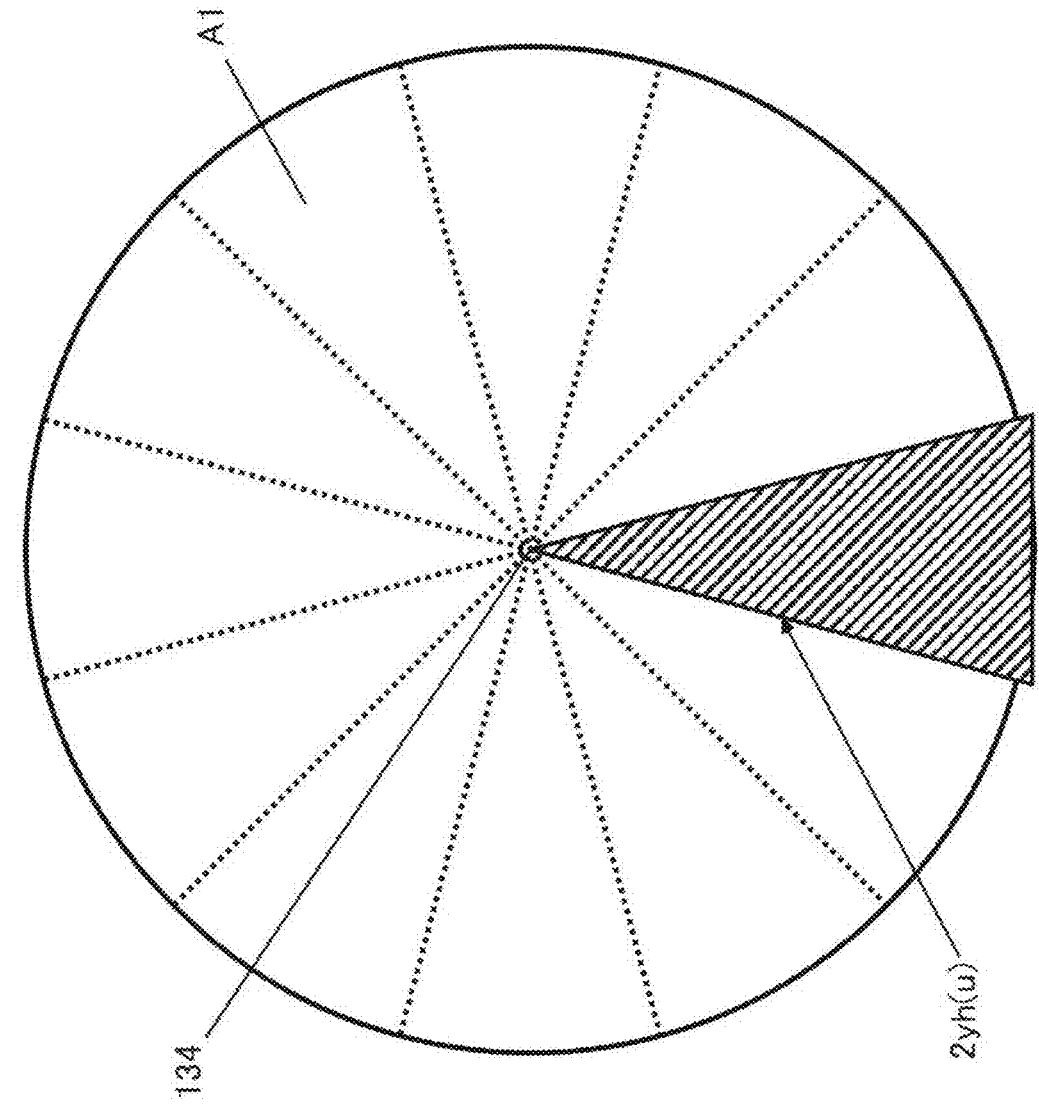
FIG. 16 is a view for explaining a shape of an upper plate member according to the third embodiment.
Figure 17:
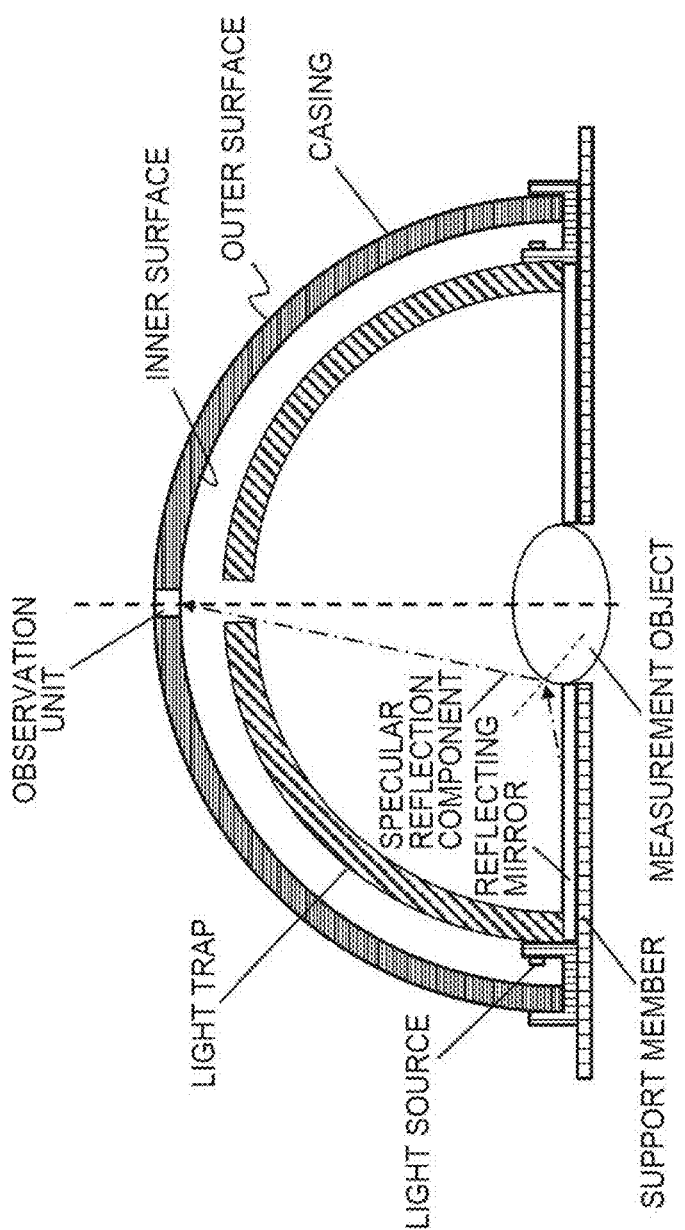
FIG. 17 is a view illustrating an example in which a portion from which a specular reflection component cannot be removed occurs in a case where a part of a bottom surface of a hemispherical internal space is blocked with a reflecting mirror in the conventional lighting device.

FIG. 16 is a diagram for explaining the shape of the upper plate member $2yh$(u). In particular, FIG. 16 schematically illustrates the relationship between the upper plate member $2yh$(u) and the hemispherical inner surface $12h$(u) as viewed from the center 131. The upper plate member $2yh$(u) includes a first surface $21h$(u) facing the hemispherical inner surface $12h$(u) and a second surface $22h$(u) facing the center 131. The second surface $22h$(u) of the upper plate member $2yh$(u) is made of a material that absorbs light. As a result, the upper plate member $2yh$(u) functions as a light trap. Note that the material that absorbs light is not particularly limited as long as it can absorb light, and may be, for example, a member painted black, a member made of a black material, or the like. As a specific example, the material that absorbs light may be, for example, carbon black, a non-reflective raised fabric, or the like. Meanwhile, the configuration of the first surface $21h$(u) is not particularly limited, and may be appropriately selected according to the embodiment. The first surface $21h$(u) may be made of a material that diffusely reflects light. Alternatively, the first surface $21h$(u) may be made of another material.

As illustrated in FIG. 16, in the present embodiment, the hemispherical inner surface $12h$(u) is virtually equally divided into a plurality of regions A1 around the axis 134 in a plane passing through the apex 132 and the center 131. The upper plate member $2yh$(u) has a shape corresponding to one region A1 of the inner surface 12. The shape corresponding to one region A1 may be any shape that shields the target region A1 when viewed from the object S, and may be, for example, a double right-angled spherical triangular shape. In the example of FIG. 16, the inner surface 12 is divided into 12 equal parts. However, the number of divisions is not limited to such an example, and may be appropriately determined according to the embodiment.

The material of the upper plate member $2yh$(u) is not particularly limited, and may be appropriately selected according to the embodiment. For the upper plate member $2yh$(u), for example, an acrylic resin, a stainless material, or the like may be used. As the material of the upper plate member $2yh$(u), a material having excellent workability and capable of securing strength is desirable.

(Lower Plate Member)

As illustrated in FIG. 15, in the lighting device L3 (main body B3), the plate member 2Y includes the lower plate member $2h$(d) facing a hemispherical inner surface $12h$(d) of the lower casing $1h$(d). That is, the plate member 2Y includes the lower plate member $2h$(d) (lower portion) which is a portion extending to the side opposite to the side where the light receiving port 14 is disposed with respect to the equatorial plane (that is, a plane passing through the center 131 and orthogonal to the axis 134).

The lower plate member $2h$(d) has a shape corresponding to (facing) at least a part of one region A1 among the plurality of regions A1 having equal areas virtually provided on the hemispherical inner surface $12h$(d) of the lower casing $1h$(d). For example, the lower plate member $2h$(d) is configured as a belt-shaped (substantially trapezoidal) plate member (curved plate) formed by removing the curved plate having a double right-angled spherical triangular shape in a predetermined range from the apex angle from the curved plate having a double right-angled spherical triangular shape corresponding to (facing) the entire region A1. That is, the lower plate member $2h$(d) is configured as a belt-shaped curved plate formed by removing a curved plate having a double right-angled spherical triangular shape below a predetermined latitude (a predetermined surface parallel to the equatorial plane) from a curved plate having a double right-angled spherical triangular shape corresponding to the entire region A1.

However, it is not essential that the lower plate member $2h$(d) is configured as a belt-shaped plate member, and the lower plate member $2h$(d) may be a plate member (curved plate) having a double right-angled spherical triangular shape corresponding to the entire region A1. The lower plate member $2h$(d) only needs to have a shape (area) capable of absorbing the "specular reflection component that reaches the object S from the inner surface 12 (in particular, the hemispherical inner surface $12h$(d)), is reflected by the object S, and reaches the light receiving port 14 (observation unit)" illustrated in FIG. 15. The shape of the lower plate member $2h$(d) may be appropriately selected according to the embodiment. The lower plate member $2h$(d) may be configured such that the latitude of the lower end of the lower plate member $2h$(d) extending toward the apex $132h$(d) along the hemispherical inner surface $12h$(d) can be adjusted according to the shape and size of the object S.

The surface (second surface $22h$(d)) of the lower plate member $2h$(d) facing the center 131 is made of a material that absorbs light. The light absorbing material is not particularly limited as long as it can absorb light, and may be, for example, a member painted black, a member made of a black material, or the like. As a specific example, the material that absorbs light may be, for example, carbon black, a non-reflective raised fabric, or the like. Meanwhile, the configuration of the surface (first surface $21h$(d)) of the lower plate member $2h$(d) facing the inner surface 12 is not particularly limited, and may be appropriately selected according to the embodiment. Similarly to the inner surface 12 (hemispherical inner surface $12h$), the first surface $21h$(d) of the lower plate member $2h$(d) may be made of a material that diffusely reflects light. Alternatively, the first surface $21h$(d) of the lower plate member $2h$(d) may be made of another material.

In this configuration, the second surface $22h$(d) of the lower plate member $2h$(d) is configured to absorb light. Therefore, as illustrated in FIG. 15, the specular reflection component can be removed by the second surface $22h$(d) of the lower plate member $2h$(d), for example, even when the object S has a convex shape. Therefore, the lighting device L3 can realize highly accurate measurement while preventing a decrease in measurement accuracy due to the residual specular reflection component.

Similarly to the upper plate member $2yh$(u), the material of the lower plate member $2h$(d) is not particularly limited, and may be appropriately selected according to the embodiment. For example, an acrylic resin, a stainless material, or the like may be used for the lower plate member $2h$(d). The material of the lower plate member $2h$(d) is desirably a material having excellent workability and capable of securing strength.

§ 2 Features

As described above, the lighting device L3 according to the present embodiment includes the casing 1, the plate member 2Y, and the light source 3. The casing 1 has the outer surface 11, the inner surface 12, the spherical internal space 13, and the light receiving port 14 (observation unit). The inner surface 12 defines the internal space 13 and is formed of a material that reflects light. The internal space 13 has the center 131, the zenith 132, and the axis 134, with the axis 134 passing through the center 131 and the zenith 132. The light receiving port 14 is provided for observing the object S arranged in the internal space 13, and is arranged at a position corresponding to the zenith 132 or a position spaced apart from the zenith 132 in the circumferential direction along the inner surface 12.

The light source 3 is disposed so as to irradiate the internal space 13 with light. The plate member 2Y is disposed facing the inner surface 12 in the internal space 13, covers a part of the inner surface 12 when viewed from the center 131, and is configured to be adjustable in position around the axis 134. The plate member 2Y includes a first surface 21 facing the inner surface 12 and a second surface 22 facing the center 131.

The plate member 2Y includes an upper plate member $2yh$(u) (upper portion) and a lower plate member $2h$(d) (lower portion). The upper plate member $2yh$(u) is a portion extending toward the side where the light receiving port 14 is disposed with respect to the equatorial plane. The lower plate member $2h$(d) is a portion extending to the side opposite to the side where the light receiving port 14 is disposed with respect to the equatorial plane. The second surface $22h$(d) of the lower plate member $2h$(d) is configured to absorb light.

In this configuration, the second surface $22h$(d) of the lower plate member $2h$(d) configured to absorb light can remove the specular reflection component even when the object S has a convex shape as illustrated in FIG. 15. Therefore, the lighting device L3 can realize highly accurate measurement while preventing a decrease in measurement accuracy due to the residual specular reflection component.

§ 3 Modifications

<3.1> Configuration of Observation Unit

The configuration of the observation unit included in the lighting device according to the third embodiment may be appropriately selected according to the embodiment as described in <4.1> of the first embodiment, and for example, the observation unit may be configured by the optical sensor itself.

<3.2> Number of Plate Members

The lighting device according to the third embodiment may include a plurality of plate members 2Y as described in <4.4> of the first embodiment.

<3.3> Controller

The lighting device according to the third embodiment may include the controller 100A or the controller 100B instead of the controller 100 as described in <4.5> of the first embodiment.

<3.4> Relationship between Casing and Plate Member

In the lighting device according to the third embodiment, similarly to <4.6> of the first embodiment, the casing 1 and the plate member 2Y may be integrated by configuring a part of the inner surface 12 with a light absorbing material.

<3.5> Light Source

In the above embodiment, the light source 3 is attached to the support column 5. However, the arrangement of the light source 3 is not limited to such an example as long as the internal space 13 can be irradiated with light, and may be appropriately determined according to the embodiment.

In the above embodiment, the example in which the light source 3 and the plate member 2Y are separately provided has been described, but it is not essential for the lighting device according to the third embodiment to separately provide the light source 3 and the plate member 2Y. For example, the light source 3 may be integrated with the plate member by disposing the light source 3 on the first surface 21 (surface facing the inner surface 12) of the plate member 2Y. By adopting such a configuration, downsizing can be realized as compared with a lighting device in which the light source 3 and the plate member 2Y are separate members.

REFERENCE SIGNS LIST 1 casing
$1h$(u) upper casing (casing)
2, 2a, 2b, 2c, 2d, 2e, 2X, 2Y plate member
$2h$(u), $2ah$(u), $2bh$(u), $2ch$(u), $2dh$(u), $2eh$(u), $2fh$(u), $2gh$(u), $2yh$ (h) upper plate member (upper portion)
$2h$(d) lower plate member (lower portion)
$2h$(h) horizontal plate member (horizontal portion)
3 light source
6 reflecting mirror
11 outer surface
$11h$ hemispherical outer surface (outer surface)
12 inner surface
$12h$ hemispherical inner surface (inner surface)
13 internal space
$13h$ hemispherical internal space (internal space)
14 light receiving port (observation unit)
131, $131h$ center
132 zenith
$132h$ apex
$133h$ bottom surface
134, $134h$ axis
21, $21h$ first surface
22, $22h$ second surface
142 brightest measurement data (measurement data in which object in brightest state is observed) 143 darkest measurement data (measurement data in which object in darkest state is observed)
144 reference measurement data
160 data extraction unit (extraction unit)
170 data update unit (storage unit)
180 data correction unit (correction unit)
210, 210a, 210b, 210c, 210d, 210e, 210f, 210g thin plate A1 region L1, L1a, L1b, L1c, L1d, L1e, L1f, L1g, L2, L3 lighting device S object

The invention claimed is:

1. A lighting device comprising:

a casing having an outer surface, an inner surface, a spherical or hemispherical internal space, and an observation unit, the inner surface being made of a material configured to define the internal space and reflect light, the internal space having a center located at a center of the internal space, a zenith positioned vertically above the center, and an axis passing through the center and the zenith, the observation unit being provided for observing an object arranged in the internal space, and being arranged at the zenith or at a position spaced apart from the zenith in a circumferential direction along the inner surface;

a plate member arranged to face the inner surface in the internal space, the plate member covering a part of the inner surface as viewed from the center and being configured to be adjustable in position around the axis, the plate member including a first surface facing the inner surface and a second surface facing the center; and a light source arranged to irradiate the internal space with light, wherein an upper portion of the plate member which is a portion on a side where the observation unit is disposed with respect to an equatorial plane passing through the center and orthogonal to the axis includes a plurality of thin plates disposed so as not to overlap each other, the plurality of thin plates are configured such that the second surface absorbs light, and by rearranging at least one of the plurality of thin plates disposed so as not to overlap each other in the upper portion by moving the at least one thin plate at an angle smaller than 360 degrees about the axis, it is possible to form one curved plate having a double right-angled spherical triangular shape corresponding to a region of the inner surface connecting three points including a point corresponding to the zenith of the inner surface and two points on an intersection line between the equatorial plane and the inner surface by the plurality of thin plates.

2. The lighting device according to claim 1, wherein an area of each of the plurality of thin plates is less than or equal to half of an area of the curved plate.

3. The lighting device according to claim 1, wherein the plurality of thin plates are not in contact with each other.

4. The lighting device according to claim 1, further comprising:

an extraction unit configured to extract, from among a plurality of pieces of measurement data each indicating the object observed while the plate member is moved around the axis in the observation unit, measurement data in which the object in a brightest state is observed and measurement data in which the object in a darkest state is observed; and a storage unit configured to store the two pieces of measurement data extracted by the extraction unit as an observation result of the object.

5. The lighting device according to claim 1, wherein the internal space is spherical, the plate member includes the upper portion, and a lower portion that is a portion extending to a side opposite to a side where the observation unit is disposed with respect to the equatorial plane, and the second surface of the lower portion is configured to absorb light.

6. The lighting device according to claim 1, further comprising a reflecting mirror having a surface facing the internal space, the surface being configured to specularly reflect light, the internal space being hemispherical, the reflecting mirror being arranged to close a part of a bottom surface of the internal space, wherein the plate member includes the upper portion, and a horizontal portion that is a portion extending along the equatorial plane so that the second surface is configured to absorb light and covers a part of a surface of the reflecting mirror facing the internal space.

7. The lighting device according to claim 1, further comprising a correction unit configured to correct measurement data acquired by observing the object by the observation unit, using reference measurement data that is measurement data acquired in advance by observing a white diffusion object having a shape identical to the object in the observation unit.

8. The lighting device according to claim 1, wherein the casing and the plate member are integrated by forming a part of the inner surface with a material configured to absorb light.

9. The lighting device according to claim 1, wherein the plurality of thin plates are formed by dividing one curved plate having a double right-angled spherical triangular shape by a plane parallel or inclined to the equatorial plane.

10. A lighting device comprising:

a casing having an outer surface, an inner surface, a spherical internal space, and an observation unit, the inner surface being made of a material configured to define the internal space and reflect light, the internal space having a center located at a center of the internal space, a zenith positioned vertically above the center, and an axis passing through the center and the zenith, the observation unit being provided for observing an object arranged in the internal space, and being arranged at the zenith or at a position spaced apart from the zenith in a circumferential direction along the inner surface;

a plate member arranged to face the inner surface in the internal space, the plate member covering a part of the inner surface as viewed from the center and being configured to be adjustable in position around the axis, the plate member including a first surface facing the inner surface and a second surface facing the center, the plate member including an upper portion which is a portion on a side where the observation unit is disposed with respect to an equatorial plane passing through the center and orthogonal to the axis and a lower portion which is a portion extending to a side opposite to a side where the observation unit is disposed with respect to the equatorial plane; and a light source arranged to irradiate the internal space with light, wherein the second surface of the lower portion is configured to absorb light.

11. The lighting device according to claim 10, further comprising:

an extraction unit configured to extract, from among a plurality of pieces of measurement data each indicating the object observed while the plate member is moved around the axis in the observation unit, measurement data in which the object in a brightest state is observed and measurement data in which the object in a darkest state is observed; and a storage unit configured to store the two pieces of measurement data extracted by the extraction unit as an observation result of the object.

12. The lighting device according to claim 10, further comprising a correction unit configured to correct measurement data acquired by observing the object by the observation unit, using reference measurement data that is measurement data acquired in advance by observing a white diffusion object having a shape identical to the object in the observation unit.

13. The lighting device according to claim 10, wherein the casing and the plate member are integrated by forming a part of the inner surface with a material configured to absorb light.

14. The lighting device according to claim 10, wherein the upper portion includes a plurality of thin plates disposed so as not to overlap each other, the plurality of thin plates are configured such that the second surface absorbs light, and by rearranging at least one of the plurality of thin plates disposed so as not to overlap each other in the upper portion by moving the at least one thin plate at an angle smaller than 360 degrees about the axis, it is possible to form one curved plate having a double right-angled spherical triangular shape corresponding to a region of the inner surface connecting three points including a point corresponding to the zenith of the inner surface and two points on an intersection line between the equatorial plane and the inner surface by the plurality of thin plates.

15. The lighting device according to claim 14, wherein the plurality of thin plates are formed by dividing one curved plate having a double right-angled spherical triangular shape by a plane parallel or inclined to the equatorial plane.

\* \* \* \* \*